(12) United States Patent
Kleinberger et al.

(10) Patent No.: US 7,190,518 B1
(45) Date of Patent: Mar. 13, 2007

(54) SYSTEMS FOR AND METHODS OF THREE DIMENSIONAL VIEWING

(75) Inventors: Paul Kleinberger, Jerusalem (IL); Ilan Kleinberger, Jerusalem (IL); Jack Y. Mantinband, Efrat (IL); Hillel Goldberg, Bet Shemesh (IL); Eli Kleinberger, Jerusalem (IL)

(73) Assignee: 3ality, Inc., New York, NY (US)

( * ) Notice: Subject to any disclaimer, the term of this patent is extended or adjusted under 35 U.S.C. 154(b) by 0 days.

(21) Appl. No.: 10/070,355

(22) PCT Filed: Sep. 5, 2000

(86) PCT No.: PCT/IL00/00534

§ 371 (c)(1),
(2), (4) Date: Mar. 6, 2002

(87) PCT Pub. No.: WO01/18589

PCT Pub. Date: Mar. 15, 2001

Related U.S. Application Data

(63) Continuation-in-part of application No. 09/987,793, filed on Nov. 16, 2001, now abandoned, which is a continuation of application No. 09/750,702, filed on Jan. 2, 2001, now abandoned, which is a continuation of application No. 09/101,984, filed on Jul. 21, 1998, now Pat. No. 6,252,707, which is a continuation of application No. 08/657,227, filed on Jun. 3, 1996, now Pat. No. 5,822,117, which is a continuation of application No. 08/589,510, filed on Jan. 22, 1996, now Pat. No. 5,973,831.

(60) Provisional application No. 60/218,387, filed on Jul. 14, 2000, provisional application No. 60/185,764, filed on Feb. 29, 2000, provisional application No. 60/178,390, filed on Jan. 27, 2000, provisional application No. 60/175,026, filed on Jan. 7, 2000, provisional application No. 60/168,351, filed on Dec. 1, 1999, provisional application No. 60/152,133, filed on Sep. 7, 1999.

(51) Int. Cl.
G02B 27/26 (2006.01)

(52) U.S. Cl. .......................... 359/465; 348/57; 348/58

(58) Field of Classification Search ................ 359/462, 359/465; 348/57–58
See application file for complete search history.

(56) References Cited

U.S. PATENT DOCUMENTS 2,631,496 A * 3/1953 Rehorn ........................ 359/465

(Continued)

FOREIGN PATENT DOCUMENTS

WO WO 9825414 A1 * 6/1998

*Primary Examiner*—Mark A. Robinson
*Assistant Examiner*—Lee Fineman

(57) ABSTRACT

The present invention relates in general to systems for and methods of three-dimensional viewing of displays and projections. One embodiment two layers (50, 90) are uniform polarizing filters and a birefringent layer with individually switchable elements (60) is sandwiched between them. Together these layers (50, 60, 90) constitute a parallax layer (40). This parallax layer (40) is located at a certain distance from a display (10). This placement, and the existence of opaque areas on the parallax layer (40) which permits to a viewer see a three-dimensional image. The individual elements (601–615) of the birefringent layer (60) are controlled by a control element (80), which is in communication with a head-tracking sensor (85). This allows the individual elements (601–615) of the birefringent layer (60) to be selectively turned on and off according to the position of the viewer's head.

26 Claims, 24 Drawing Sheets

U.S. PATENT DOCUMENTS 2,883,906 A * 4/1959 Rehorn ................. 359/463
5,264,964 A * 11/1993 Faris .................... 359/465
5,822,117 A * 10/1998 Kleinberger et al. ..... 359/465
5,875,055 A * 2/1999 Morishima et al. ...... 359/465
5,993,004 A    11/1999 Moseley et al.
6,181,303 B1    1/2001 Johnson et al.
6,449,090 B1 * 9/2002 Omar et al. ............ 359/465

* cited by examiner

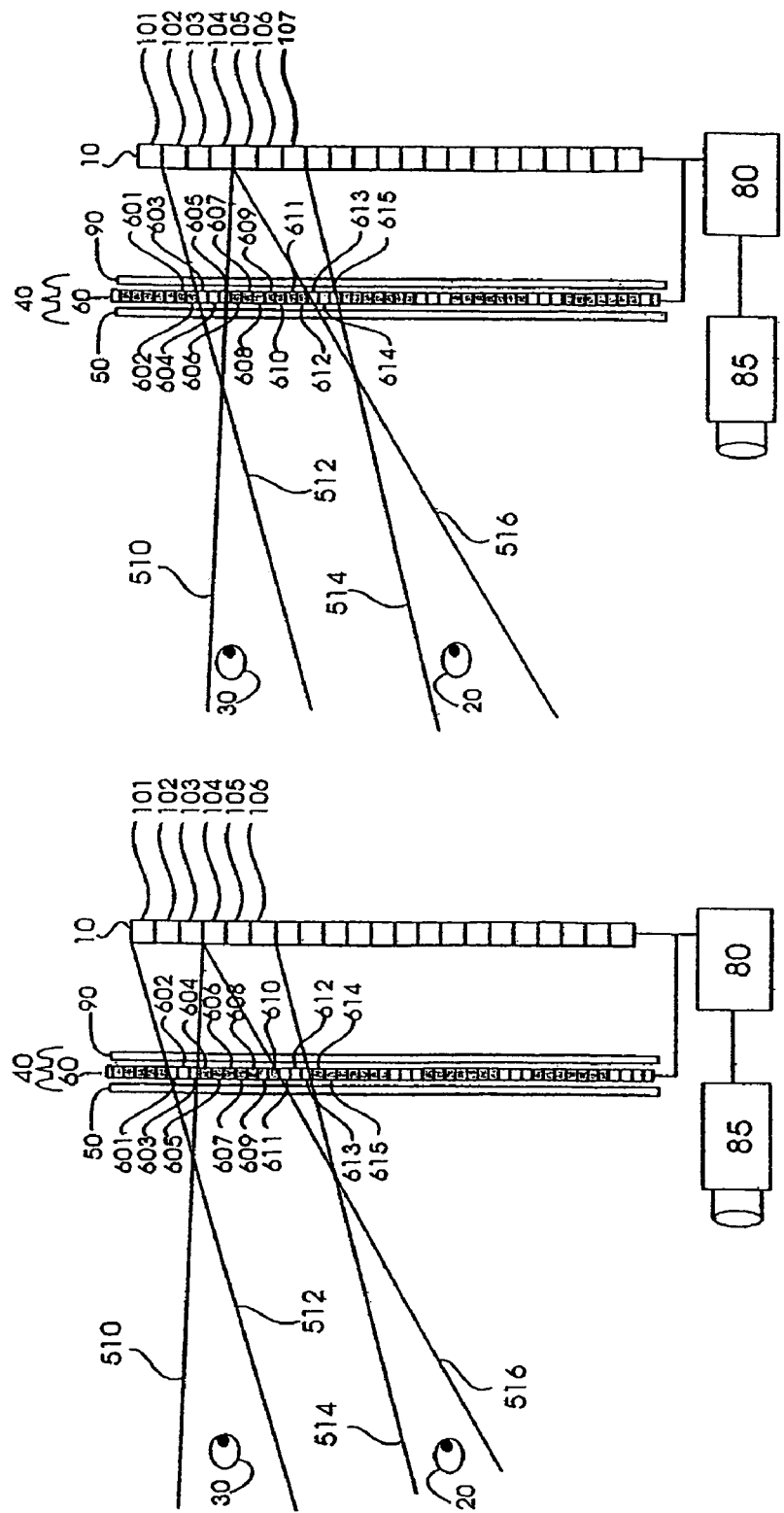

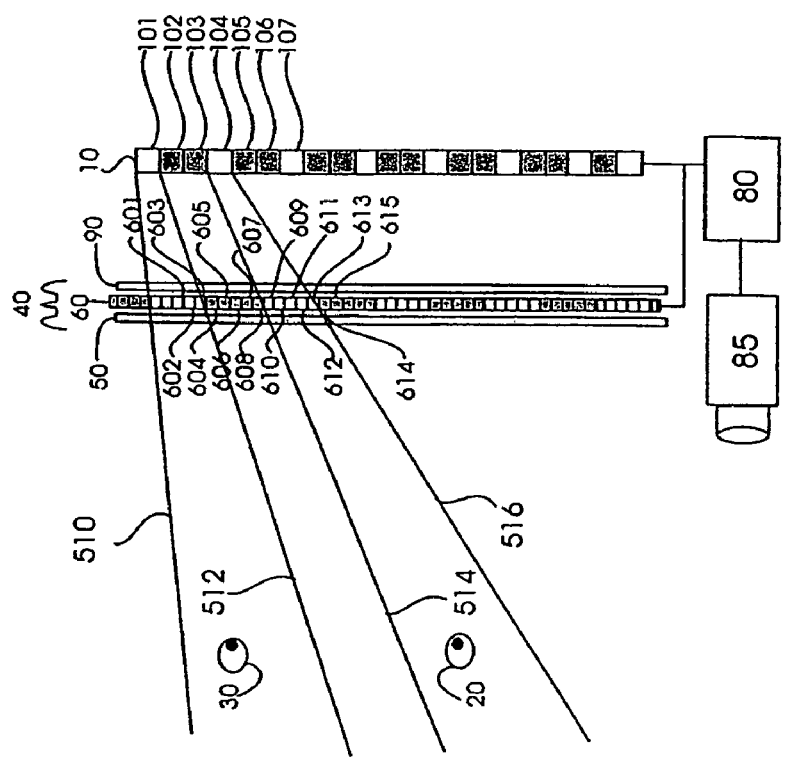
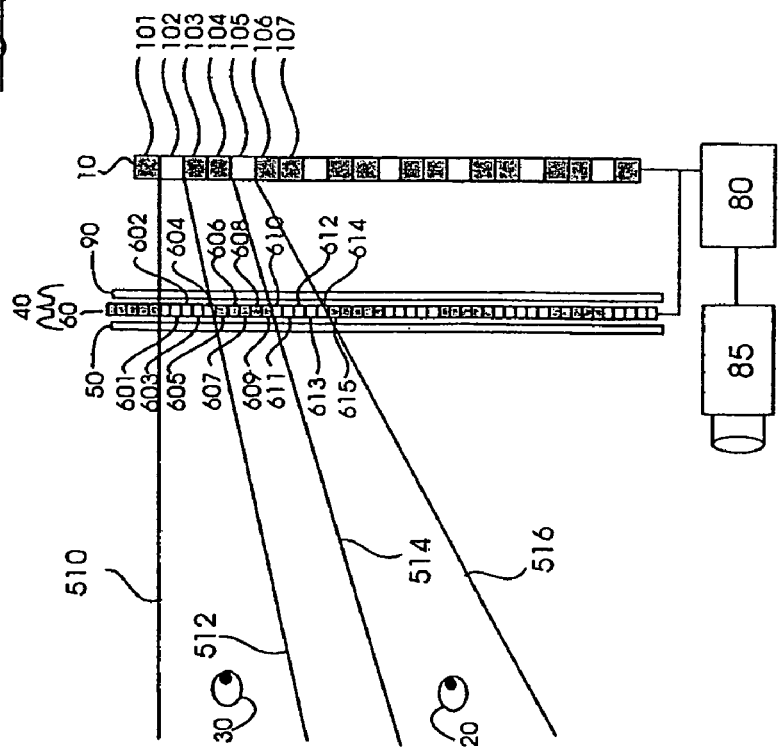

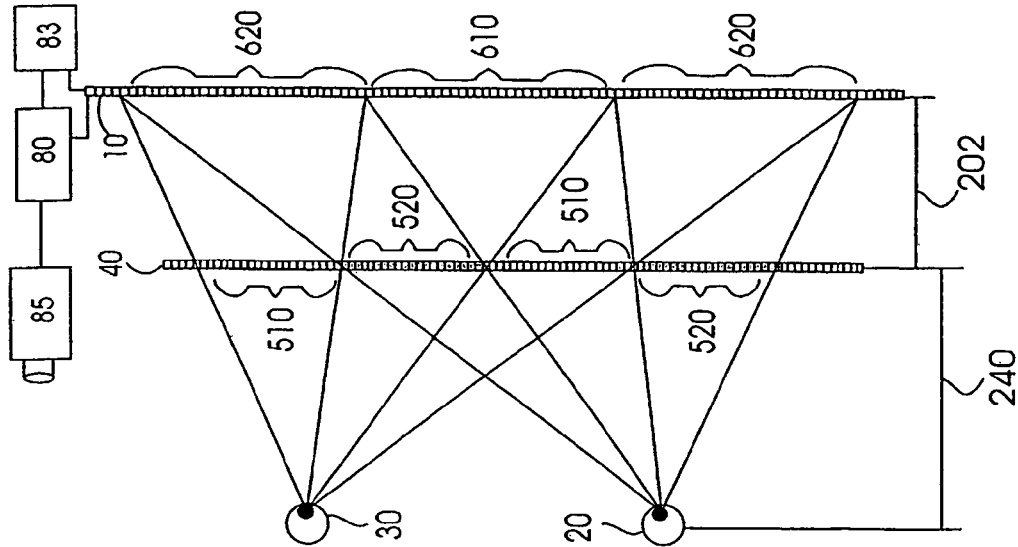
Figure 4b
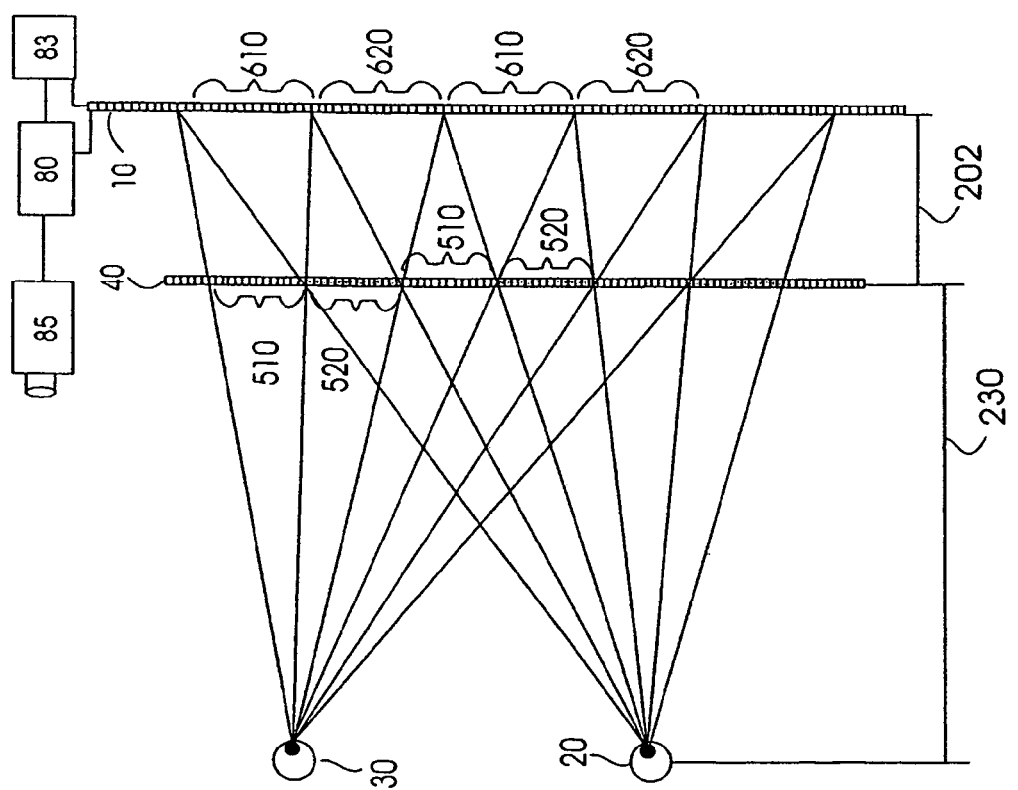
Figure 4a
Figure 4

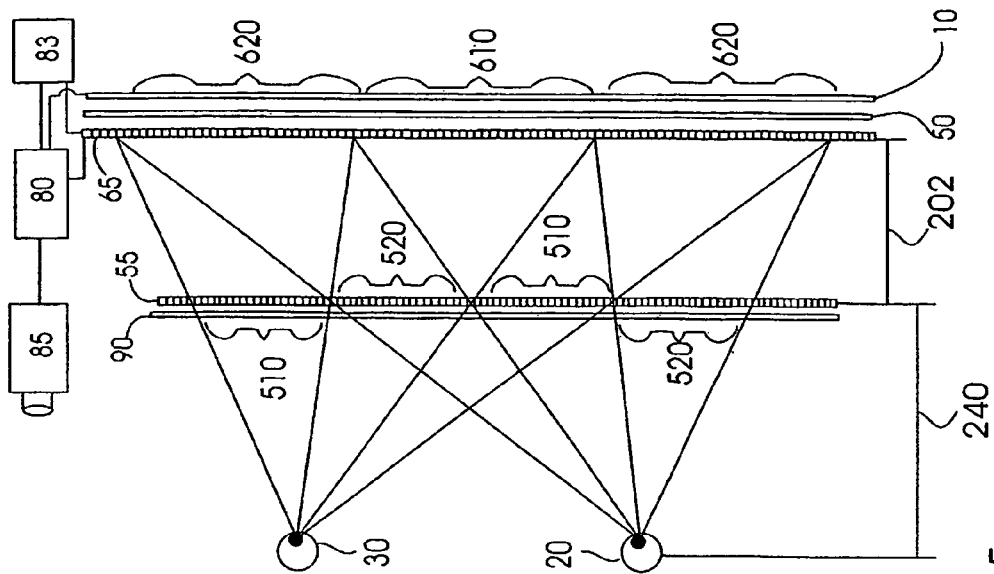
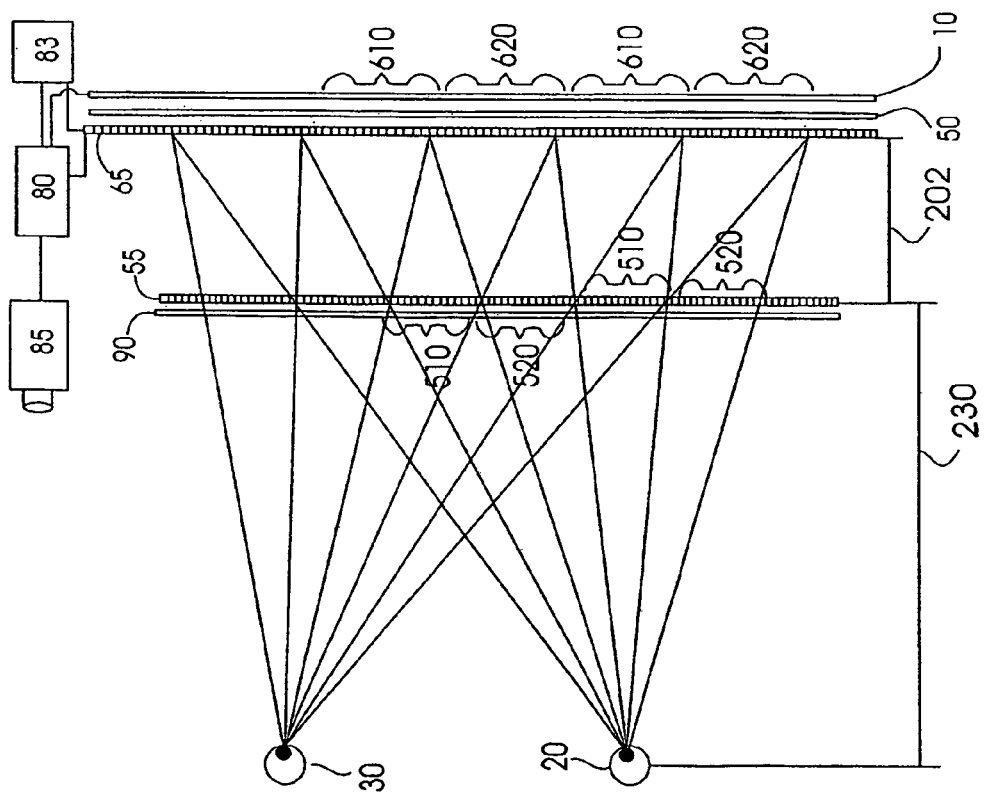
Figure 5b
Figure 5a
Figure 5

Figure 16
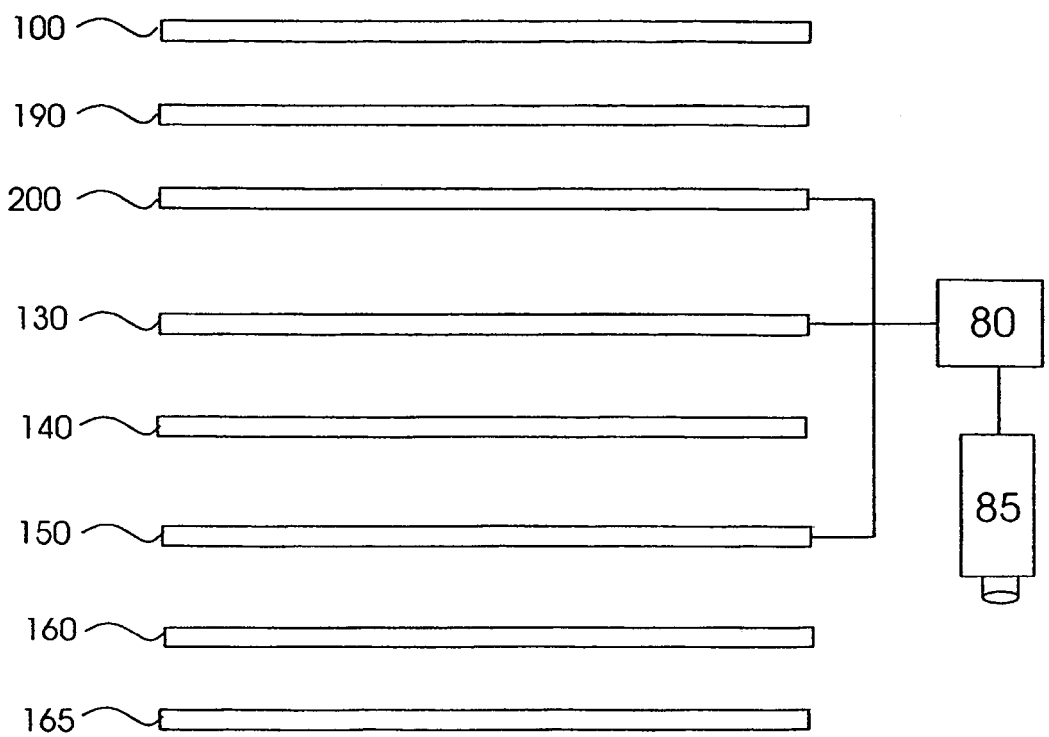
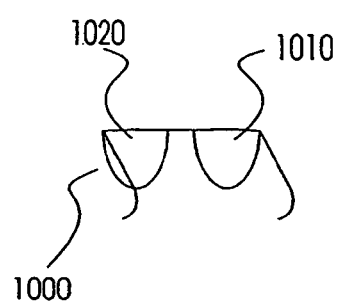

SYSTEMS FOR AND METHODS OF THREE DIMENSIONAL VIEWING

RELATED APPLICATIONS

This application is a Continuation-In-Part (CIP) of U.S. patent application Ser. No. 09/987,793 filed on Nov. 16, 2001, now abandoned, which is a continuation of U.S. patent application Ser. No. 09/750,702, filed on Jan. 2, 2001, now abandoned, which is a continuation of U.S. patent application Ser. No. 09/101,984, filed on Jul. 21, 1998, now U.S. Pat. No. 6,252,707, issued on Jun. 26, 2001, which is a National Phase of PCT Patent Application No. PCT/US97/00778, filed on Jan. 21, 1997, now expired, which is a Continuation of U.S. patent application Ser. No. 08/657,227, filed on Jun. 3, 1996, now U.S. Pat. No. 5,822,117, issued on Oct. 13, 1998, which is a Continuation of U.S. patent application Ser. No. 08/589,510, filed on Jan. 22, 1996, now U.S. Pat. No. 5,973,831, issued on Oct. 26, 1999. PCT Patent Application No. PCT/US97/00778 also claims the benefit of Israel Patent Application No. 119437, filed Oct. 16, 1996, now abandoned.

This Application is also a National Phase of PCT Patent Application No. PCT/IL00/00534, filed on Sep. 5, 2000, now expired, which claims the benefit of U.S. Provisional Patent Application Nos. 60/218,387, filed on Jul. 14, 2000, 60/185,764, filed on Feb. 29, 2000, 60/178,390, filed on Jan. 27, 2000, 60/175,026, filed on Jan. 7, 2000, 60/168,351, filed on Dec. 1, 1999 and 60/152,133, filed on Sep. 7, 1992, all now expired.

The contents of all of the above applications are incorporated herein by reference.

FIELD AND BACKGROUND OF THE INVENTION

The present invention relates in general to systems for and methods of three-dimensional viewing, including three dimensional displays and projectors. More particularly, the present invention relates to three-dimensional displays and projectors which can be used by one or more viewers to obtain a perception of depth while viewing still or motion pictures.

Various attempts have been made over the years to develop and implement methods and apparatuses to represent scenes and objects in a manner which produces a sense of depth perception, known in the art as three dimensionality.

Aside from methods involving rotating objects, rotating mirrors, and the like (usually classified as 'depth illusion' in the American patent classification scheme), and methods involving holographic techniques or using coherent light sources, the methods used involve a variety of schemes for transporting two different images to a viewer's left and right eyes. The two different images are typically produced by two cameras placed side by side in a manner which in turn simulates the vision of two human eyes.

The mammalian vision system, as well known, employs the differences between a given scene as perceived by the right eye and the same scene as perceived by the left eye, to extract information regarding the distance of objects within the scene relative to the viewer. Since objects close to the viewer appear displaced to the right in the view seen by the left eye, and the very same objects appear displaced to the left in the view seen by the right eye, while more distant objects show less such displacement and most distant objects show essentially no such displacement at all, it is possible to calculate the distance of objects within the scene as a function of the amount of lateral displacement observed, and this, apparently, is what the human visual system does in our normal binocular (i.e., three-dimensional) vision of the world.

When a pair of images containing appropriate parallax information is presented, one image to the left eye and the other to the right eye, a similar experience of apparent depth perception results. In the following, an image-intended for the left eye is referred to as a 'left image', and an image intended for the right as a 'right image'.

The prior art of three-dimensional viewing may be broken into categories as follows.

The first category includes hand-held viewing apparatuses (known in the art as 'viewers') of various sorts, based on lenses, prisms, mirrors, or combinations thereof, which viewers are held close to the eyes and deliver an appropriate image to each of the eyes.

The second category includes methods aimed at viewing images without any optical apparatus held next to the eye (i.e., without eyeglasses and/or viewers), which methods are based on interposing a plurality of lenticular elements in the display.

The third category includes systems involving eyeglasses worn by the viewer, which eyeglasses filter light according to its polarization.

The fourth category includes systems involving eyeglasses worn by the viewer, which eyeglasses filter light according to wavelength (i.e., color).

The fifth category includes systems involving eyeglasses worn by the viewer and employing switching mechanisms capable of rapid on/off switching (i.e., shutter systems) of optical elements.

The sixth category includes side-by-side implementations such as random-dot stereograms.

And finally, the seventh category includes methods employing flat screens for viewing images without a need for optical apparatus to be held next to the eye (i.e., without eyeglasses and/or viewers) and not involving lenticular surfaces. These methods are based primarily on interposing physical impediments arranged in a flat screen placed between the viewer and the image to be viewed, which impediments hide part of an image from one eye while allowing it to be seen by the other eye.

Each of the above listed categories has its associated inherent disadvantages as follows.

With respect to the first category, viewing apparatuses of the kind which require lenses, prisms, or mirrors held in proximity with the viewer's eyes, are generally less convenient than alternatives which do not require special eyeware and do not require the viewer using them to hold the apparatus or to approach his eyes to special eyepieces. As the invention here disclosed involves no necessary use of lenses, prisms, or mirrors, and does nor require the viewer to look through a viewing apparatus placed or held near the eyes, it is basically dissimilar and advantageous over apparatuses thus categorized.

With respect to the second category, lenticular systems will always present images having a lower resolution than the resolution of which the display device to which the lenticular array is attached to is inherently capable. Lenticular systems which can be viewed from a large variety of viewing positions typically reduce the resolution of the display to a very large extent. For this reason they are not well adapted for viewing systems such as computer displays and television and are therefore not in wide use. U.S. Pat. No. 4,957,351 to Shioji discloses an example of the second category, describing the use of a lenticular system, in which alternating lines representing parts of left and right images are refracted, each line through an associated lens, which directs it selectively to the right or left eyes.

With respect to the third through fifth categories, they all require the use of eyeglasses or an equivalent by the viewer. The term 'eyeglasses' is referred to herein in a general sense of an optical apparatus having left and right eyepieces held close to the eyes of the viewer in such a way that substantially all the light entering the left eye is subject to an influence imposed by the left eyepiece, and all the light entering the right eye is subject to an influence imposed by the right eyepiece. As mentioned, three-dimensional systems thus categorized all require the use of eyeglasses, which select, whether by color (wavelength), timing (shutter), or polarization, the images reaching each of the eyes. These categories include apparatuses having a form of conventional eyeglasses (e.g., ones used for reading), but also include devices such as, but not limited to, pilot helmets having head-up displays (HUD), virtual-reality headgears and similar designs. As mentioned above, systems falling into these categories share a common disadvantage; they all require an inherent use of special eyeglasses or headgear. The necessity for optical apparatus held near the eyes subtracts from the pleasure, comfort and naturalness of the experience of viewing the display, and may, depending on the system used, add significantly to the expense.

With respect to the third category, polarizing eyeglasses deal with arrangements in which a display system polarizes light derived from the left image in a given particular orientation and polarizes light derived from the right image in another particular orientation. Accordingly, the viewer wears a set of polarizing filters one for each eye. The filter of the left eye passes light polarized in the particular orientation in which the left image was polarized, whereas the filter of the right eye passes only light polarized in the particular other orientation in which the right image was polarized. Consequently each eye sees only the image appropriate to it and does not see the image which is inappropriate to it; thus a three-dimensional image is viewed by the viewer. U.S. Pat. No. 5,113,285 to Franklin discloses a system using polarizing eyeglasses to provide the left and right images to the appropriate eyes. U.S. Pat. No. 4,719,507 to Bos discloses a system employing polarizing eyeglasses to distinguish between the left and right images, and also uses switchable rotating means to determine, in a temporal sequence, which image receives which polarization. These and similar systems have the disadvantage of requiring use of polarizing eyeglasses. Certain further disadvantages characterize systems which use polarizing glasses yet do not use switching means (c.f., fifth category). U.S. Pat. No. 5,050,961 to Venolia, provides an example, and is representative of various others. According to the invention of Venolia, the display area is divided into subregions with left image and right image segments. Further according to Venolia, small polarizing subunits process the light emanating from each subregion of the display, and the division of the image into left and right image areas coincides with the orientation of the polarizing means employed in a first layer, such that all the light emanating from the right image is polarized in a first orientation, while light emanating from the left image is polarized in a second orientation perpendicular to the first orientation. The user wears polarizing eyeglasses, so that each eye sees the appropriate image segments and only those. An inherent disadvantage associated with such schemes is that part of the display surface is blocked from the view of each eye. In better cases where the image segments are small the blockage is experienced not as holes in the picture but as a graininess or low resolution of the three-dimensional image viewed. On the other hand, systems aimed at ensuring that all areas of the display space will be used in representing each of the left and right images (sequentially if not simultaneously) tend to be somewhat complex and are potentially relatively expensive to manufacture. U.S. Pat. No. 5,083,851 to MacDonald provides an example of a system with undoubted qualities but which might be expensive to implement. Yet, a system which could provide similar services in a comparatively simple and inexpensive manner would be of service in many applications.

For sake of completeness it is worth mentioning the artificial three-dimensional experience best known to the public. This is the traditional three-dimensional movie (i.e., 3D-movie), in which a projection system projects full images of the right and left images simultaneously onto a common display (typically a reflective movie screen). Such traditional 3D-movies are presently displayed in for example Disneyland. This projection system has the advantage that each eye sees a continuous and uninterrupted image. Yet, this projection system has the disadvantages of (i) requiring the viewer to wear eyeglasses, and (ii) requiring special projection devices which involve two projectors (or a specially designed single projector having the effect of two projectors) simultaneously projecting related pairs of images onto the screen. Thus, this method calls for special projection equipment and, since it requires two separate light sources, it is not adaptable to standard computer displays nor to television displays.

With respect to the fourth category, optical filters result in a right image made up of and substantially limited to particular wavelengths passed by a filter covering the right eye, and in a left image made up of and substantially limited to particular different wavelengths passed by the filter covering the left eye. Thus, in addition to the disadvantage of requiring the use of eye glasses, these systems prevent the use of natural color images.

With respect to the fifth category, shutter systems are mechanisms consisting of elements capable of either blocking light or passing light, or of elements capable of rotating the orientation of polarized light (collectively referred to herein as switchable means). In both cases the mechanisms are capable of being switched on/off rapidly. In use, the switching of the mechanisms is coordinated with changes in the images being displayed, usually in such manner that the left image is displayed when the left eye's vision of the screen is enabled and the right eye's vision is blocked, and at a later time the right image is displayed when the right eye's vision is enabled and the left eye is blocked, wherein switching is intentionally rapid enough so that the persistence of human vision leaves the viewer with an impression of a continuous image. It should be noted that if switching had been slower, an impression of flickering would have resulted. Accordingly, U.S. Pat. No. 5,002,387 to Baljet; U.S. Pat. No. 5,083,851 to MacDonald; and U.S. Pat. No. 5,245,319 to Kilian, provide examples of systems characterized by alternating eye 3D-glasses, alternating between left and right lens transmissiveness and synchronizing the left lens transmissiveness to left images and right lens transmissiveness to right images. Yet, these methods involve eyeglasses obligatorily worn by the viewer. This inherent obligation however is a primary disadvantage. Additional disadvantages of these systems include the complexity and thus expense of the shutter eyeglasses which must be connected to the display apparatus and simultaneously controlled, or alternatively (e.g. MacDonald) the increased complexity and expense of the display hardware itself. To avoid the use of complex eyeglasses U.S. Pat. No. 4,719,507 to Bos discloses an arrangement which allows use of passive polarizing filters in the eyeglasses, putting the more complex and high-voltage apparatus into the display device. U.S. Pat. No. 4,792,850 to Liptoh discloses a similar arrangement using circular light polarization. Nevertheless, these solutions have the disadvantage of making the entire screen appear and disappear to each eye during each cycle, which tends to increase the impression of flickering of the screen. As before, the principle disadvantage of the systems described by Bos and Liptoh is their dependence on eyeglasses worn by the viewer.

With respect to the sixth category, side-by-side implementations such as for example random dot stereograms are essentially methods for utilizing parallax information, are difficult to see for many viewers, convey only simplified images, and cannot convey color. According to these methods a simple colorless image is combined with a complex background pattern, the background pattern substantially repeating itself at an interval less than the interpupillary distance of human observers, and the pattern being modified by the simplified image in such a way that elements of the simple image intended to be seen as being closer to the viewer cause corresponding areas of the repeating pattern of the complex background to be displaced towards each other. That is, if for example the background pattern would in large part repeat itself every inch, then an area representing a close object repeats itself at a distance of $^{19}/_{20}$ inch, and an area intended to appear further away repeats itself at a distance of $^{21}/_{20}$ inch. The viewer, often with some difficulty, views the stereogram by directing his right eye to some given area of the repeating pattern, and his left eye to an adjacent area of the repeating pattern, to the left of the point seen by the right eye. Since the patterns substantially repeat themselves, the viewer is (usually) able to coalesce the images. Thus the left eye is provided with a left image which is different (since it originates e.g. an inch away on the stereogram) from the right image. The eyes then have the ability to extract the information based on the consistent differences between the two images, and understand it in terms of the simplified scene which is in fact included in the stereogram only as modifications in the position of elements of the background pattern. Normal images have also been included in published stereograms, for example in the "Magic Eye" series of books published by Michael Joseph Ltd., London. In this case sets of normal full-color images with differing parallax information are included in the published image in such a way that they can be viewed by the viewer's directing his eyes in the same manner as he directs them for viewing a stereogram, namely by directing his right eye to a given image, and directing his left eye to a similar neighboring image which is physically next to the first, and differs from it in that it contains a different parallax view of the same scene.

With respect to the seventh category, flat screens for three-dimensional viewing are disclosed in several recent patents. These patents disclose systems in which grids consisting of transparent sections interspersed with opaque sections are placed in various relationships to the image being seen or projected, the image is an interspersed composition of regions taken from the left image (i.e., to be eventually seen only by the left eye of the viewer) and regions taken from the right image (i.e., to be eventually seen only by the right eye of the viewer), the grid or grids being placed in positions which hide regions of the right image from the left eye and hide regions of the left image from the right eye, while allowing each eye to see sections of the display which are showing regions originating from its appropriate image. For example, U.S. Pat. No. 4,671,632 to August, discloses a system for using a "line screen"; August's system includes vertical blocking portions alternating with vertical transparent portions, and a second blocking screen parallel to the first line screen, also composed of blocking portions and transparent portions. However, August's embodiments (as described in FIGS. 11, 12, and 13 therein) suffer from a major drawback that large percentages of the field of view of each eye (well more than half, according to August's drawings) are hidden from the eye at any given time, yielding a grainy low-resolution image. U.S. Pat. No. 5,264,964 to Faris, discloses a method for creating a parallax barrier by placing pairs of small polarizing regions one immediately above the other and of opposite polarization orientation, thus creating opaque regions, and also describes an embodiment in which simple opaque regions are used in place of the pairs of polarizing regions. In both cases a barrier is created with transparent regions alternating with opaque regions, with size and spacing adjusted such that the left and right eyes looking through the transparent regions of the barrier each sees a different pixel on the display layer, thus creating the possibility for supplying each eye with elements of the left and right image which are appropriate to it. However, Faris' invention is limited to a fixed position of the viewer with respect to the display during the whole time of viewing. The images viewed in an eyeglassesless mode in accordance with Faris' invention are inevitably grainy, since they always include at least 50% of areas which have no image, corresponding to the areas in which each eye's vision is blocked by the opaque parts of the barrier. U.S. Pat. No. 5,146,246 to Marks, discloses a method in which a raster grid is used to block narrow strips of image from one eye and show them to the other eye, while distributing the images in such a way that portions of the right image are visible to the right eye and portions of the left image are visible to the left eye. This is basically a projection system using a diffusion screen between two raster structures alternating opaque and transparent sections, and as such, is similar to some of the embodiments described by Faris. It, however, shares the limitations noted above, i.e., a significant percentage of the field of view is occupied by opaque regions which do not transmit either image, thereby limiting the resolution of the visible image and producing graininess.

U.S. Pat. No. 5,822,117 to Kleinberger et al. and PCT Publication WO97/26577, which are incorporated herein by reference, teach a variety of systems and methods for three dimensional viewing, including displays and projectors. As is further explained hereinbelow, some of the systems and methods described in U.S. Pat. No. 5,822,117 and PCT Publication WO97/26577 suffer one or more limitations. It is one object of the present invention to provide solutions to these limitations. It is, however, another object of the present invention to provide yet novel systems and method to three dimensional viewing.

There is thus a widely recognized need for, and it would be highly advantageous to have, systems for three-dimensional viewing and projection which can be used by a viewer to obtain a perception of depth while viewing still or motion pictures needless of use of eyeglasses, which systems devoid the above mentioned limitations.

DEFINITIONS OF TERMS

For the sake of clarity terms to be used herein in this document are defined as follows.

As used herein the term "frame" refers to a display or projection or a part of a display or projection to be three-dimensionally viewed.

As used herein the phrase "left image" refers to the image to be seen by the left eye of the viewer. In embodiments of the present invention used for producing the illusion of depth, this would correspond to the image seen by the left eye, captured for example by a camera playing the role of the left eye and placed near (typically to the left of) a second camera playing the role of the right eye, or to an image created by drawing, computer graphics, or other non-photographic means, which image contains parallax information appropriate to the left-hand position of a pair of images which, when viewed together and combined by the human perceptual system into a single image, give the illusion of depth. Note that this description is given for clarity only, and is not intended to limit the scope of the invention to the display of left and right images of any particular origin. The left image may be a still image, or one of a sequence of images displayed one after another to constitute a motion picture.

As used herein the phrase "right image" refers to the image intended to be seen by the right eye. The right image may be a still image, or one of a sequence of images displayed one after another to constitute a motion picture.

Thus, a "left image" and a "right image" refer to the pair of images which together constitute a stereoscopic display pair, the former presenting a scene as it would appear to the left eye of an observer, the latter to the scene as it would appear to the right eye of an observer. Stereoscopic and autostereoscopic display systems generally seek to present a left image to a viewer's left eye and a right image to a viewer's right eye, and to prevent light from the left image from reaching the right eye and light from the right image from reaching the left eye.

As used herein the phrase "3D-image" refers to a three-dimensional image as viewed by a viewer according to any of the embodiments of the present invention.

As used herein the term "display" refers to a medium by which an image as defined hereinabove is initially presented. Suitable displays include but are not limited to display screens such as light reflecting means, a translucent screen, or light-emitting means, such as a CRT screen or an LCD screen. The nature of the "display" as used herein is not limited to these examples, nor is the invention described herein limited to the use of any particular technology of display. In particular, the meaning of "display" is not limited to means traditionally used for displaying three-dimensional images and motion pictures. Thus, for example, outdoor advertising displays and pictures such as those printed on cards or in books or magazines, are all additional examples of "display" relevant to certain embodiments of the invention described hereinbelow.

As used herein the term "projection" refers to an image as defined hereinabove that is initially projected so as to form a display.

As used herein the phrase "polarizing means" includes any linear polarizing means which block light whose angle of vibration is in one direction (i.e., orientation) while passing light whose angle of vibration is in another direction. The term also includes means which convert linearly polarized light into circularly polarized light, means which convert circularly polarized light into linearly polarized light and means which pass light which is circularly polarized in one sense but do not pass light which is circularly polarized in the other sense.

As used herein the phrase "Light rotating means", also known in the art as "light retarding means" and as "phase retarding means" refers, in particular, to means which change by some degrees, in most cases 90 degrees, the orientation of linearly polarized light, or which change the sense of circularly polarized light, converting right-handed polarized light into left-handed polarized light or left-handed polarized light into right-handed polarized light. When the concept 'active or inactive in light rotation' is used herein in this document and especially in the claims section below it also refers to a situation where in the inactive state the light is rotated m degrees and in the active state it is rotated m+90 degrees.

As used herein the phrase "switchable light rotating means" refers to light rotating means whose light rotating effect can be turned on/off under electronic control, as under the Kerr effect. Thus light rotating means is defined 'on' when it rotates light and 'off' when it does not rotate light. Thus, 'on' and 'off' as used herein refers to the presence or absence of the optical phenomenon of light rotating effect, not to the presence or absence of an electrical field which controls the effect. When the phrases 'active/inactive in light rotation' are used herein in this document and especially in the claims section below it also refers to a situation where in the inactive state the light is rotated m degrees and in the active state it is rotated m+90 degrees.

In most cases, the present invention is couched in terms of linear light polarization. However, it would be clear to one ordinarily skilled in the art that various aspects of the embodiments of the invention described hereinbelow can be effected using circular light polarization. Thus, for example, referring to embodiments of the invention wherein a light polarizing layer is placed close to a display, the layer may in fact include a linear polarizing layer coupled with a suitably aligned quarter-wave light retarding means, converting the linear polarized light into circular polarized light. Reference to light linearly polarized in a particular orientation can then be taken to refer to light circularly polarized in a particular sense (i.e., left-handedness or right-handedness). Referring to embodiments wherein an analyzing filter is positioned nearest to the eyes of a viewer, which analyzing filter is a linear light polarizing filter, the filter may in fact further include a suitably aligned quarter-wave light retarding means which converts circularly polarized light into linearly polarized light. Alternatively, the linear light polarizing filter might be replaced by circular polarizing means which pass light with circular polarization in one particular sense (i.e., left-handedness or right-handedness) while absorbing, diffusing or reflecting light circularly polarized in the other sense. For embodiments in which on/off switchable light rotating means are employed for rotating the orientation of linearly polarized light, reference to those means also refers to on/off switchable light rotating means for changing the sense of circularly polarized light. Thus, considering the uses of light polarization and polarization based filtering which are hereinafter described, the essential characteristics of the invention are unaffected by substitutions of the kind described above. Consequently, and for sake of simplicity, the embodiments of the present invention are hereinafter described, in most cases, in terms of linear light polarization, yet this description by no means is to be taken as limiting the scope of the invention to any particular method of light polarization. Thus when the term 'orientation' is used to describe the direction of light polarization herein in this document and especially in the claims below, it refers both to linear and circular light polarization.

As used herein the phrase "shutter means" refers to any means by which particular portions of a screen or layer of material can be made to be substantially transparent, and at other times can be made to be substantially opaque, under the control of switchable means. This might, for example, be accomplished by a unit of switchable light rotating means (as defined above) sandwiched between two-layers of linear polarizing means, both layers oriented in a given same direction. Such an arrangement is opaque or transparent depending on whether the light rotating means is on or off. This example, however, is given for the sake of clarity, yet the nature of the "shutter means" as used herein is not limited to this example nor to any particular technology of shutter means. Thus a solid material having transparent holes which is translated relative to the image as defined hereinabove can also be used as suitable shutter means in some of the embodiments of the present invention.

As used herein the term "eyeglasses" refers to any arrangement which provides for optical means which are physically close to the viewer's eyes, and particularly those which are such that most or all of the light emanating or reflected from the display and directed towards the left eye, enters optical means located in front of the left eye, before reaching it, whereas most or all of the light emanating or reflected from the display and directed towards the right eye enters optical means located in front of the right eye before reaching it. Thus, eyeglasses as used herein includes the polarizing glasses and color-filter glasses traditionally employed in the field of stereoscopy, yet the term also includes headsets, arrangements which place mirrors or lenses or prisms in close proximity with the eyes, and so forth.

As used herein the term "viewer" refers to an individual facing and viewing the display.

As used herein the phrase "appropriate image" refers to the following: for the viewer's left eye the "appropriate image" is the left image as defined above, whereas the "appropriate image" for the viewer's right eye is the right image as defined above. "Inappropriate images" are the right image with respect to the left eye and the left image with respect to the right eye. "Appropriate eye" and "inappropriate eye" are terms derived from the above definitions.

As used herein the phrase "viewing stereoscopically" means, in particular, the viewing of pairs of left and right images containing appropriate parallax information, such that when the viewer views the images simultaneously or nearly simultaneously, and in the process of his viewing coalesces the two images into a single image gestalt in the manner well known in the art of stereoscopy, the result is a single perceived image giving the illusion of depth, as defined hereinabove a 3D-image. However, the term viewing stereoscopically as used herein is not limited to pairs of images containing such parallax information, it is intended to apply to any pair of images which can be so coalesced and give the viewer the impression of a single image containing information from two sources.

As used herein the phrase "color filters" refers to elements which are transparent to light within a certain range or ranges of wavelengths, but block light within other range(s) of wavelengths, whether by absorbing the light of the blocked range(s) of wavelengths, or by reflecting it, or in some other manner.

As used herein the phrase "parallax-barrier" generally refers to the well-known system for autostereoscopy by which an optical barrier including transparent and opaque vertical strips is interposed at a particular distance from a display, and the display presents side-by-side pixels from alternating sources, pixels from a left image alternating with pixels from a right image.

As used herein the phrase "optical construction" refers to an optical element which, is designed by itself and/or in combination of other optical elements to redirect some of the light of a display or filter/block some of the light of a display, so as to result in stereoscopic or autostereoscopic viewing. Examples include, but are not limited to, a composite color filter, a parallax barrier, a composite light retarding means or a lenticular array.

As used herein, the phrase "two polarizers based system" or "two polarizers system" refers to systems similar to those described in FIGS. 6–12 of U.S. Pat. No. 5,822,117

As used herein the phrase "movement-permissive system" refers to a system described in FIGS. 32–33 of both U.S. Pat. No. 5,822,117 and PCT Publication WO97/26577, and in FIG. 33a of PCT Publication WO97/26577. This system allows for a certain amount of movement of the viewer's head and eyes, without said movement causing degradation of the autostereoscopic effect nor of the quality of the display as it appears to the viewer. The movement-permissive system can be used in the two polarizing layers based systems described in FIGS. 6–12 of U.S. Pat. No. 5,822,117, in a classical parallax-barrier system as defined above, and in various other contexts. An additional advantage of the movement-permissive system is that systems in which it is incorporated are relatively indifferent to minor variations in the exact placement of, and optical qualities of the edges of, the various optical elements of which the systems are composed. For example, a parallax-barrier system including the movement-permissive system would be somewhat insensitive to minor errors of placement of the lines of division between the transparent and the opaque segments of the parallax barrier.

As used herein the phrase "birefringent layer with individually switchable elements" refers to a layer with a plurality of individually controllable elements of "switchable light rotating means", (as that term is defined hereinabove). In other words, it refers to any arrangement, such as that described in FIG. 19 of U.S. Pat. No. 5,822,117, in which a device such as a liquid crystal with individually addressable areas is used in connection with a control system in such a way that at any given time, any particular configuration of all, some, or none of the individually switchable elements will turn the polarization orientation of light passing through them. As a common example, a birefringent layer with individually switchable elements sandwiched between two flat polarizing layers, constitutes a popular form of notebook computer screen. For simplicity, the birefringent layers with individually switchable elements referred to in the following descriptions are drawn as if the individually addressable elements are parallel vertical strips, and this is indeed a convenient configuration for most of the embodiments described herein, but it should be understood that this definition, and the embodiments incorporating birefringent layers with individually switchable elements as described in the following, are not limited to that particular configuration. Standard LCDs with two-dimensional arrays of addressable elements could be used, as well as other configurations.

As used herein the phrase a "head-tracking system" refers to systems which adapt an autostereoscopic display to the positions of eyes of a viewer, so as to enable the viewer to view a stereoscopic image. Such a system typically includes a head-tracking sensor as is defined below and a control element.

As used herein the phrase a "mechanical head-tracking system" refers to head-tracking systems which accomplish the adaptation to the positions of the eyes of the viewer by mechanically moving the apparatus, or parts thereof.

As used herein the phrase a "electronic head-tracking system" refers to head-tracking systems which accomplish the adaptation to the positions of the eyes of the viewer using without physically moving parts of the apparatus, and without moving the apparatus as a whole.

As used herein the phrase "head-tracking sensor" refers to a device capable of detecting and reporting information about the position of a viewer's eyes with respect to a display and an autostereoscopic apparatus. A head-tracking sensor is preferably a detector of the position of the eyes of the viewer(s), but it may also be a detector of the position of the head of the viewer, or a detector of the position of an object worn on the head of the viewer, from which an estimate of the position of the eyes may be derived. Such detectors are available from various commercial sources. It may also be any other device capable of supplying information relevant to the viewers' eye positions. For example, a device in the style of a television 'remote control' unit, through which a user might supply information about his head position by pressing buttons on a hand-held control device, would be included in the definition of a head-tracking sensor as that term is used herein.

As used herein the phrase "sweet spot" refers to that position or positions from which a viewer can see the stereoscopic image displayed by an autostereoscopic display. In a classical parallax-barrier system the sweet spot is intrinsically rather small. When that system is enhanced using a movement-permissive system, the sweet spot is enlarged.

As used herein the phrase "display pixels" refers to the physical pixel elements of display devices such as LCD display devices.

As used herein the phrase "image picture elements" refers to picture elements of the left and right images, each of which may be displayed by zero, one, or several display pixels on a display device, or by a part of a pixel (for example a single color sub-pixel which is one of the elements (such as red) from an RGB triplet), or may be displayed, or not displayed, in some area of a display device which is not itself intrinsically divided into physical pixels.

SUMMARY OF INVENTION

The present invention relates in general to systems for and methods of three-dimensional viewing of displays and projections of still or motion pictures. Most of the embodiments here presented relate to autostereoscopic systems, in which a viewer sees a stereoscopic image without need of special eyeglasses or other headgear.

In one embodiment a classic "parallax barrier" is combined with time multiplexing of the barrier and with moving the barrier rapidly from one position to another in front of a display, the position of the images displayed on the display being altered in coordination with changes in the barrier. The result of this combination is to allow for full-resolution displays, while using large barrier elements, providing lower requirements for precision in a head-tracking system, and greater ease of construction.

A modification in the use of parallax barrier and other "sweet spot" technologies is presented, in which adaptation of the display apparatus to the changing position of a viewer is accomplished not by modifying the position of a barrier layer, but by modifying the size and position of elements of a displayed image.

Modification of both the size and position of elements of a barrier layer and the size and position of elements of the displayed images is shown to allow a barrier system to adapt to changes in the distance of a viewer from an autostereoscopic display, as well as to changes in the viewer's lateral position with respect to the display.

With respect to the system presented in PCT Publication WO97/26577 which teaches the use of a pair of polarizing arrays to create an autostereoscopic system, a method for using the pair of arrays is presented which allows for high-speed switching of images on the display, using only relatively low-speed liquid crystals to create the arrays. With respect to that system it is further shown that modification of the size and position of elements on both polarizing arrays allows the system to adapt to changes in the distance of a viewer from the autostereoscopic display, as well as to changes in the viewer's lateral position with respect to the display.

PCT Publication WO97/26577 also presents methods for producing "movement-permissiveness" in an autostereoscopic display, that is, for allowing viewers to move somewhat with respect to the display without degrading the display's autostereoscopic qualities. Herein, methods are presented for enhancing the "movement-permissiveness" of autostereoscopic systems based on a pair of polarizing arrays such as those taught in PCT Publication WO97/26577. In particular, the enhancement allows for movement-permissiveness in systems used for distance bead-tracking as well as lateral head-tracking.

Improvements are presented in systems utilizing a pair of polarizing layers, so as to produce an autostereoscopic display without time multiplexing, and consequently without flickering. Examples are presented in which this is accomplished using two displays and a beam splitter such as a half-silvered mirror, and using a pair of projectors in a back projection system.

Improvements are presented in systems for discerning the position of the eyes of a viewer with respect to a display, and in systems for helping a viewer of an autostereoscopic display without head-tracking to place himself successfully in the appropriate position for viewing the display.

With respect to systems which use polarizing eyeglasses to present stereoscopic displays, an improvement is presented to reduce the impression of flickering in such displays, or alternately to reduce the speed at which such displays must alternate between left and right images, if the impression of flickering is to be avoided.

An additional method for producing a full-resolution autostereoscopic display is presented, which method avoids the disadvantages both of spatial multiplexing and of time multiplexing, and presents full resolution left and right images across the entire breadth of a display at all times, rather than in alternation, as in some other systems. This system has the additional advantage that it can be produced both as a flat display and as a projection system, and can be easily adapted to autostereoscopic viewing by an individual, or for use with eyeglasses for viewing by multiple viewers. Several approaches to constructing this apparatus are presented.

A method based on color filtration is presented, which method has the advantage of producing a highly movement-permissive display with little loss of light, when compared to a parallax barrier based system. The color filtration method can be adapted to flat displays, CRT displays, and to both front and back projection systems, including a projection system in which an autostereoscopic display is projected using a single projector. This system can also be adapted to printing on paper and similar materials, and to back-lit static display applications such as advertising signs and stereoscopic works of art.

Methods are presented in which movement-permissive autostereoscopic systems such as the color filtration system are combined with methods for altering an autostereoscopic display arrangement, thereby creating systems which can adapt to the changing positions of a viewer, yet which are simpler and less expensive to construct than are the head-tracking systems currently in use. Systems with a high degree of movement permissiveness allow significant movement of the viewer without degradation of the autostereoscopic image, and this fact allows the use of head-tracking adaptations with a limited number of necessary positions or states of the apparatus. Thus head-tracking can be accomplished with simple modifications to the apparatus. The required modifications can be accomplished by modifying the position of elements of the images on a display (this method may be applied to a variety of systems, including barrier displays, the color filtration displays, and lenticular displays.) These modifications may also accomplished by changing a barrier or filter layer, either mechanically, by shifting a barrier physically between only two alternative positions, or electronically, by manipulating the polarization of the light from a display and utilizing barrier layers or filter layers which behave differently when exposed to light of different polarization orientations.

The methods of shifting a barrier physically between two alternative positions, and of manipulating the polarization of the light from a display and utilizing barrier layers or filter layers which behave differently when exposed to light of different polarization orientations, are also used to produce full-resolution displays in a color filtration system.

Additional techniques are presented for adapting a display to the changing position of a viewer by moving an image with respect to a barrier or filter, this time by moving elements of the image on a sub-pixel basis. One method uses four sub-pixels rather than the traditional three sub-pixels to present an image element from a left or right image. Another method uses a CRT with continuous phosphor strips of a particular color, where those strips are arrayed horizontally rather than in the classical vertical orientation. Another set of methods uses displays capable of presenting any color on any part of the display surface, yet causes them to separate the colors on the display surface, thus enabling the use of the color filtration system.

Combinations of the methods presented for making simplified head-tracking systems and of the methods presented for making full-resolution displays are shown to be capable of producing systems which present full-resolution autostereoscopic displays with simplified head-tracking capabilities. A mechanical version of such a system is first presented, followed by a similar system with the added advantage of having no moving parts.

A system for generating, from standard input such as a pair of television signals, a display combining a left and a right input image into an image format appropriate for use with the color filtration system is presented.

Particular adaptations of the head-tracking techniques for use in projection systems, with the aim of producing autostereoscopic systems at low cost, are presented.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Except as otherwise noted, all the Figures refer to systems as seen from above. Thus, elements of the Figures represented by rectangles (such as element 101 in FIG. 1a) generally represent vertical strips or similar objects in a plane understood to be perpendicular to the plane of the Figure. FIGS. 1a–b, 2a–b, 4a–b, and 5a–b present pairs of drawings (a and b) contrasting two states of the same apparatus.

In the drawings:

FIGS. 1a–b are top views of a system for autostereoscopic viewing in accordance with one embodiment of the present invention which allows for greater head movement combined with higher resolution;

FIGS. 2a–b are top views of a system for autostereoscopic viewing in accordance with another embodiment of the present invention which allows for greater head movement and higher resolution;

FIGS. 4a–b and 5a–b are top views of two embodiments of the present invention providing for adaptation of the display to varying distances of the viewer;

FIG. 16 is a top view of optional systems according to the present invention employing a liquid crystal array for stereoscopic viewing, autostereoscopic viewing and/or normal (non-stereoscopic) viewing;

DETAILED DESCRIPTION OF PREFERRED EMBODIMENT

Figure 3:
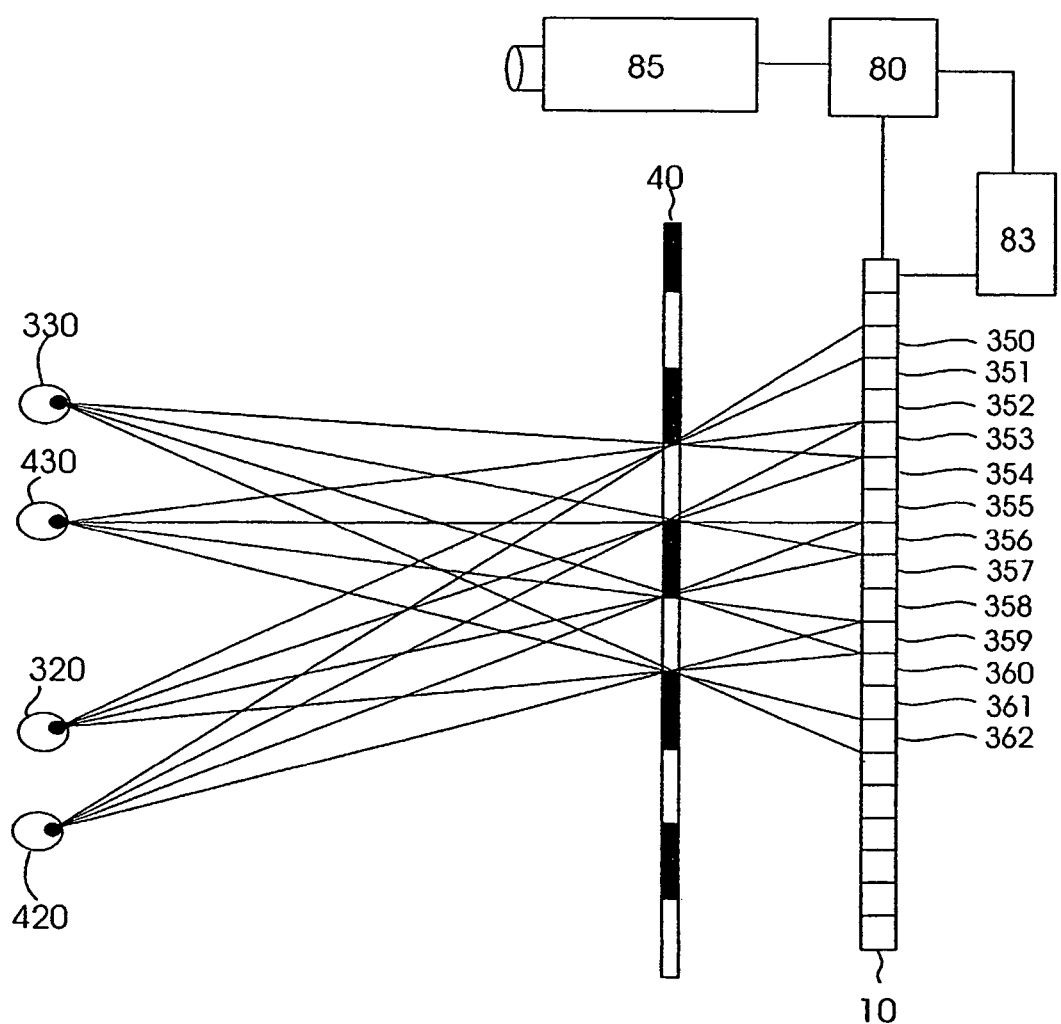
FIG. 3 is a top view of one embodiment of the present invention of using a system for an autostereoscopic display adaptable to changing positions of a viewer, by adjusting the position of the image on the display, and incorporating a feed-back device for monitoring positions of imagery data displayed on a display and feeding that information to a control element which controls the display and/or a parallax barrier.

The present invention is of systems and methods which can be used for three-dimensional viewing, including three dimensional displays and projectors. In particular, the present invention provides improvements over prior art designs for three-dimensional viewing, such as the designs described in U.S. Pat. No. 5,822,117 to Kleinberger et al. and PCT Publication WO97/26577, as well as other prior art designs, as is specifically indicated below.

Improvements in Parallax Barrier Technology: Time-multiplexing of Elements of the Images Classical parallax barrier systems have intrinsically low resolution, since 50% of the display surface is unavailable to each eye. They also have an intrinsically small sweet spot, since they depend on the left and right eyes being in particular positions with respect to the parallax barrier and the display, and if the eyes deviate from their expected positions a degradation of the perceived stereoscopic image is experienced. The movement-permissive system, described in U.S. Pat. No. 5,822,117 and PCT Publication WO97/26577 enables enlarging the sweet spot; however, it requires the sacrifice of even more display area. Thus, a classical parallax barrier system might incorporate the movement-permissive system described in U.S. Pat. No. 5,822,117 and PCT Publication WO97/26577 to allow some freedom of head movement and/or variability in interpupillary distances among viewers, yet it might show each of the left and right images in as little as e.g., 30% of the display space. This would result in a very rough and low-resolution picture.

The problem of the inherently low resolution of parallax barrier systems is partly solved by the system described in U.S. Pat. No. 5,822,117 in the discussion of FIGS. 14, 14b and 15 therein, which system is designed for time-multiplexing image elements, while using a parallax barrier. According to the method described, through time-multiplexing, each part of the surface of the display can be used to show image picture elements of both the left image and of the right image, each at different times. Thus, through persistence of vision, the impression is created that both left and right images are continuous across the display. Similar systems are also described by U.S. Pat. No. 5,875,055 to Morishima, and by U.S. Pat. No. 5,825,541 to Imai.

Such systems can be integrated with the movement-permissive system either by adding opaque areas to the barrier layer (as is described in PCT Publication WO97/26577, FIG. 33a therein), or by leaving certain areas of the display surface dark at all times (as is described in U.S. Pat. No. 5,822,117 and PCT Publication WO97/26577, FIGS. 32 therein). This combination allows for some freedom of movement of the head of the viewer, and would give less of an impression of low resolution than would the classical parallax barrier system.

However, the combined systems would still have two distinct disadvantages. First, the size of the subdivisions of the barrier layer would need to be quite small, otherwise the opaque areas of the blocking layer (or alternatively the non-displaying areas of the display surface) would be visible to the viewer and disrupt his view of the display. Second, even if the opaque (or non-displaying) areas were small enough so that the eye could not resolve them as discreet obstacles to the view of the display, nevertheless they would cause a lower-resolution than could be achieved were they are not in use.

It is, however, possible to combine time-multiplexing of elements of the left and right images with parallax-barrier technology in a way which avoids these disadvantages.

The approach for doing so is made explicit in FIGS. 1a–b. FIG. 1a shows an arrangement similar to that described in FIG. 33a of PCT Publication WO97/26577. Layers 50 and 90 are uniform polarizing filters, and layer 60 is a birefringent layer with individually switchable elements. Layers 50, 60, and 90 together constitute layer 40, which is a parallax barrier layer. Layer 40 is located at a certain distance from display 10, in a manner well known in the art. It is this placement, and the existence of opaque areas on layer 40 which permits left eye 30 to see left image picture elements in areas 101, 102, and 103 of display 10, and permits right eye 20 to see right image picture elements in areas 104, 105, and 106 of display 10, while preventing each eye from seeing any light from the inappropriate image. The individual elements (601–615, etc.) of layer 60 are controlled by a control element 80. Control element 80 also controls display 10, in that it chooses whether a left image picture element or a right image picture element will be displayed at a given time in each particular area of display 10. As is described in U.S. Pat. No. 5,822,117 and PCT Publication WO97/26577 with respect to FIGS. 14–15 and 18–23 therein, the birefringent effect of the individual elements of layer 60 are switched on and off selectively in order to line up the transparent portions with layer 40 with the position of the viewer's eyes, using information provided by sensor 85 which can be a head-tracking sensor, a source of information about the position of the viewer. If, for example, viewer's eye 30 was to move to the right (towards the bottom of the Figure), sensor 85 will provide this information to control element 80 which will cause area 604 to switch its birefringence, causing that portion of layer 40 to become transparent, and will cause area 601 to switch its birefringence causing its portion of layer 40 to become opaque. Thus the arrangement described in FIG. 1a can be used, as described in U.S. Pat. No. 5,822,117 and PCT Publication WO97/26577, to adapt the apparatus for autostereoscopic viewing while the viewer moves from left to right with respect to the display.

It may further be seen that the selection of opaque and transparent areas on layer 40 may optionally be made in such a way so as to implement a movement-permissive system: if the opaque areas on layer 40 are somewhat larger than the transparent areas (as is specifically shown in FIG. 1a), then the effect obtained is that described in context of FIG. 33a of PCT Publication WO97/26577. Lines 510, 512, 514, and 516 here recall the lines similarly numbered in FIG. 32 of PCT Publication WO97/26577; they delimit the area within which the viewer's eyes may move without causing the eyes to see less light from their appropriate images, nor any light from their inappropriate images.

Comparison of FIG. 1a to FIG. 1b reveals yet another advantage of this arrangement. In both Figures the viewer's eyes 20 and 30 have identical positions and distances with respect to the display. The difference between FIGS. 1a and 1b is that control element 80 has used its capacities for switching the transparent areas of display 40 and its capacity for determining the position of the left and right image picture elements on display 10 in such a manner as to change the opaque areas of 40 and the display areas of 10 without requiring movement on the part of the viewer. In FIG. 1a, the areas of layer 40 which include 601, 602, 603, and 611, 612, and 613 are transparent, and a left image picture element is displayed on areas 101,102, and 103 of display 10 while a right image picture element is displayed in areas 104, 105, and 106 of display 10. In FIG. 1b, the areas of layer 40 which include 603, 604, 605 and 613, 614 and 615 are transparent, and a left image picture element is displayed on areas 102,103, and 104 of display 10 while a right image picture element is displayed in areas 105, 106, and 107.

Taken together, FIGS. 1a and 1b demonstrate that the arrangement depicted is capable of altering the presentation of the autostereoscopic image, at electronic speeds, in such a manner that all areas of display 10 can be used both for left image picture elements and for right image picture elements, at different times, and further that while the arrangement provides for large opaque areas of layer 40, as required by the movement-permissive system, those areas may be shifted around layer 40 rather than be permanently fixed in any particular position.

These arrangements, together with the well-known phenomenon of persistence of vision, have several beneficial effects.

First, switching the display in such a way that all areas of the display will sometimes display elements from the left image, and sometimes display elements from the right image, will, by persistence of vision, create the impression of a continuous, full-resolution display.

Second, using blocking areas of layer 40 which are wider than the transparent areas of layer 40 creates a movement-permissive system. Use of that system relaxes the requirements for complete accuracy on the part of head-tracking sensor 85; approximately accurate reporting of the viewer's eye positions will be good enough, since the movement-permissive system makes the arrangement as a whole tolerant of a certain margin of error. There is an additional advantage to the incorporation of the movement-permissive system in this context: were complete accuracy required, the individually addressable elements on layer 60 would need to be extremely small, since they must be turned on and off as discrete units, yet must approximate the motion of the viewer's eyes, which is continuous. Use of the movement-permissive system in this context allows the individually addressable elements of layer 60 to be larger, since minor errors in placement of the end-points of the switched areas on layer 60 will also be covered by the margin of error allowed by the movement-permissive system. Thus use of that system allows layer 60 to be less fine-grained, and consequently less expensive.

Third, the fact that the opaque areas used to create the movement-permissive effect are not fixed but variable makes it possible to use larger opaque areas than would otherwise be the case, without thereby (because of persistence of vision) producing the impression of a low-resolution image.

Another embodiment of this invention is presented in FIGS. 2a–b. Elements of FIGS. 2a–b with the same numeral references as elements in FIGS. 1a–b have the same functions as those described in the discussion of FIGS. 1a–b above. The difference between the embodiment described by FIGS. 1a–b and that described by FIGS. 2a–b is simply that the choices imposed by control element 80 are different, with the result that, whereas FIGS. 1a–b show implementation of the movement-permissive system according to the method described in PCT Publication WO97/26577, FIG. 33a therein (i.e., extra opaque areas on parallax blocking layer 40), FIGS. 2a–b show implementation of the movement-permissive system according to the method described in U.S. Pat. No. 5,822,117 and PCT Publication WO97/26577, FIG. 32, with non-displaying areas on display 10. In FIG. 2a, for example, control element 80 has chosen to create on layer 40 opaque areas which are approximately equal in width to the transparent areas it creates on layer 40 (as indicated by the shading, the shaded areas being the opaque areas), but control element 80 has also chosen to display a left image picture element in area 102 of display 10, and a right image in area 105 in display 10, but to leave areas 101, 103, 104, 106, 107, etc. dark, that is, those areas display neither the left image picture elements nor right image picture elements. The effect is as described in PCT Publication WO97/26577, that the viewer's eye 30 can move anywhere within the area between lines 510 and 512, and eye 20 can move anywhere in the area between lines 514 and 516, without that movement affecting the quality of the viewer's experience of the autostereoscopic view.

FIG. 2b depicts the same apparatus as is depicted by FIG. 2a, but at a different time. Comparison of FIGS. 2a and 2b serves to show that for a given position of the apparatus and of the viewer there exists a plurality of different combinations of transparent and opaque elements on layer 60, and of areas of display 10 displaying left image picture elements, right image picture elements, or not displaying anything, such that the principle described in the preceding paragraph is nevertheless observed. In practice, the apparatus, under the control of control element 80, can switch rapidly among two or more such alternative arrangements. As noted with respect to FIGS. 1*a–b*, such rapid alternation of arrangements will provide the advantages of permitting simultaneous use of the electronic head-tracking system and the movement permissive system, and of allowing relatively large areas of the display to be used as non-display areas, and yet will create, due to persistence of vision, the impression of a continuous high-resolution display.

Adapting an Autostereoscopic System with a "Sweet Spot" to the Position of a Viewer by Modifying the Display FIG. 3 shows yet another way of enabling an autostereoscopic display system with a "sweet spot", such as a system using an optical construction, such as a classical parallax barrier system, to adjust itself to the changing position of the viewer with respect to the display. The following discussion is couched in terms of systems using parallax barriers to achieve autostereoscopic vision, but it should be understood that the essential characteristics of this embodiment are independent of the particular structure interposed between a display and a viewer, so long as that structure has the effect of creating viewing zones from which a viewer's eye will see a particular left or right image, and other zones from which a viewer's eye will see the other image. Thus, this embodiment can be applied to parallax barrier systems, to lenticular systems, to the color filtration systems presented hereinbelow, as well as to other systems. Nevertheless, for simplicity of exposition, reference is made to parallax barrier systems in the following.

The classical parallax barrier system, various adaptations thereof, and various similar systems, require that the viewer view the apparatus from a "sweet spot"; only from particular positions can the autostereoscopic effect be seen. PCT Publication WO97/26577, in FIGS. 13–15 and 19 therein, describe methods of moving and of modifying the parallax barrier in ways which adapt the device to movement of the viewer with respect to the device, whereas additional uses and advantages of such an arrangement are discussed in the description of FIGS. 1*a–b* and 2*a–b*, above.

FIG. 3 presents another method by which the configuration of a parallax-barrier system may be modified so as to adapt itself to changes in the position of the viewer. In this system the effect is achieved by modifying not the parallax barrier, but the displayed image.

As before, the viewer's left eye (330 or 430) and right eye (320 or 420) see light from the images displayed on display 10 after that light passes through parallax barrier layer 40. For simplicity the Figure represents the classical parallax barrier system, with fixed transparent segments alternating with fixed opaque segments, but it is clear that the system described in the following will apply also to various adaptations of the parallax barrier system, including those described in U.S. Pat. No. 5,822,117 and PCT Publication WO97/26577, those described in FIGS. 1*a–b* and 2*a–b* above, those described in FIG. 11 below, and others.

Head-tracking sensor 85 supplies information to the system about the position from which the viewer (or viewers) is/are viewing the display.

Positions 330 and 320 represent one possible position of the viewer with respect to the display, with left eye at 330 and right eye 320. Positions 430 and 420 represent a second possible position of viewer with respect to the display, with left eye at 430 and right eye at 420. These two positions (430/420 and 330/320) represent two arbitrary positions of the viewer, at approximately equal distances from display 10. Note that for the sake of clarity of FIG. 3, the size of the individual subdivisions (which may be permanent or individually addressable elements) of layer 40 and of the marked areas of display 10 have been exaggerated. In the preferred embodiment these would be relatively much smaller than the scale on which they are drawn in the Figure, and hence would be capable of much finer adjustments of position than their scale in the Figure would otherwise imply.

Considering first the situation when the viewer's left and right eyes are in positions 330 and 320 respectively, areas 354–356 and 360–362 of display 10 will display left image picture elements and areas 351–353 and 357–359 of display 10 will display right image picture elements, according to the classical parallax-barrier method. This will allow the viewer, when in that position, to view the autostereoscopic image, with each eye seeing its appropriate image and not seeing any part of the inappropriate image.

When head-tracking sensor 85 detects that the viewer's left eye has moved, say, from position 330 to position 430, and his right eye has moved from position 320 to position 420, that information is transmitted to control element 80, which causes display 10 to change the manner in which the left and right images are displayed. The viewer having moved to his right, the display image moves to the viewer's left. Areas 353–355 and 359–361 of display 10 will now display left image picture elements, and areas 350–352 and 356–358 will display right image picture elements. As a result the autostereoscopic effect is preserved, in that each eye continues to see light from its appropriate image, and not to see light from its inappropriate image. Of course, the fact that FIG. 3 assigns three numbered areas for each "image picture element" is arbitrary, and is not intended to imply that the set is limited to that particular number of display pixels, nor that the display is necessarily subdivided into physically distinct display pixels altogether.

There are a variety of manners in which this transformation of the position of the image picture elements might be accomplished.

In one implementation control element 80 controls a mechanical motor-driven device which simply moves the display a specified amount, or which moves the display until a feed-back device 83 indicates that the display is in the desired position.

In another implementation display 10 is a display with discrete addressable display pixel elements (such as a standard LCD display) under control of control element 80. In this case control element 80, using information provided by head-tracking sensor 85, calculates which images should be made visible in which physical positions, and simply directs left and right image picture elements to the appropriate physical display pixels of display 10.

In yet another implementation, display 10 is a display such as a laser light display, in which individual picture elements may be directed to any part of the display surface, and they are simply directed as determined by control element 80.

Yet another implementation is appropriate for display technologies in which some general characteristics of the display, such as the horizontal positioning of the display as a whole, and the width of the display as a whole, are subject to central electronic or mechanical control. This is the case, for example, in standard CRT technology such as is used in most personal computer displays and many CRT-based televisions. In many such systems analog or digital controls are provided which allow the user to adjust the horizontal positioning of the image on the screen, the width of the display as a whole, etc. In an embodiment appropriate to displays of this type, control element 80 exercises just such control, controlling the horizontal positioning of the image in such a manner that the image elements appear in the appropriate physical areas of the display, as shown in FIG. 3.

CRT displays may be somewhat unstable in that the size and position of the display may vary with changes in line voltages, temperature of the apparatus, and so on. This is one of the reasons for which analog controls of image size and position are typically provided. Consequently this embodiment may also include a feed-back device 83 which detects the display's actual position on the display device and modifies the input parameters of the display device appropriately so that the displayed image will appear, and remain, in the position determined for it by control element 80.

It is clear that the technique described above and in FIG. 3 is compatible with the movement-permissive systems and the head-tracking systems as described in PCT Publication WO97/26577 and U.S. Pat. No. 5,822,117, as well as the various systems specifically described herein, and various other autostereoscopic techniques, and that it can be used in a manner independent of these other systems, or in conjunction with them.

Adapting Parallax Barrier Autostereoscopic Displays to Variable Distances of the Viewer from the Display FIG. 4 describes a system for adapting autostereoscopic displays to movement of a viewer towards and away from the display.

In U.S. Pat. No. 5,822,117 and PCT Publication WO97/26577 and in the discussion of FIGS. 1a–b, 2a–b and 3 above, various methods for configuring an autostereoscopic display apparatus so that the autostereoscopic effect will be preserved while a viewer moves with respect to the apparatus are described. While the movement-permissive system can tolerate some movement towards and away from the display, the various discussions of the head-tracking systems, including those of U.S. Pat. No. 5,822,117, PCT Publication WO97/26577, and of FIGS. 1a–b, 2a–b and 3 above, related primarily to movement of a viewer sideways (left to right, or right to left) with respect to the apparatus. Although some of the mechanisms described are inherently capable of adapting to movement of the viewer in the direction perpendicular to the plane of the display (i.e., towards the display and away from the display), this fact was not everywhere made explicit.

One exception to this is in U.S. Pat. No. 5,822,117 and PCT Publication WO97/26577 FIGS. 18–23, where a system is presented for adapting an autostereoscopic display to movement of the viewer in the direction perpendicular to the plane of the display (towards it or away from it). However, the system there described has the disadvantage of requiring a plurality of liquid crystals at various distances from the display, a relatively expensive solution.

FIG. 4, then, makes explicit capabilities implicit in the U.S. Pat. No. 5,822,117 and PCT Publication WO97/26577 systems, in that it shows a relatively more simple method by which a autostereoscopic system may adapt to movement of a viewer towards or away from the display, using an optical construction requiring only one liquid crystal layer in the case of a parallax barrier system, or only two liquid crystal layers in the case of the two polarizing layers based system.

Numbered elements carried over into FIGS. 4a–b from FIGS. 1a–b, 2a–b and 3 have the same definition and function as described with respect to FIGS. 1a–b, 2a–b and 3.

In one embodiment shown in FIG. 4, layer 40 is a parallax barrier based on a birefringent layer with individually switchable elements, as was described above in the discussion of FIGS. 1a–b and elsewhere. Element 10 is a display on which areas have been marked; the meaning of these areas is the same as that of the areas marked on display 10 in FIG. 3.

Images may be moved left and right on the display surface, as was discussed above in connection with FIG. 3. It is also clear that the same various methods that can be used to shift the images left and right can also be used to expand and contract both the image as a whole, and the image picture elements of which it is composed. In the present embodiment, the image picture elements (610, 620) displayed by display 10 are capable of being so expanded and contracted.

Figure 24:
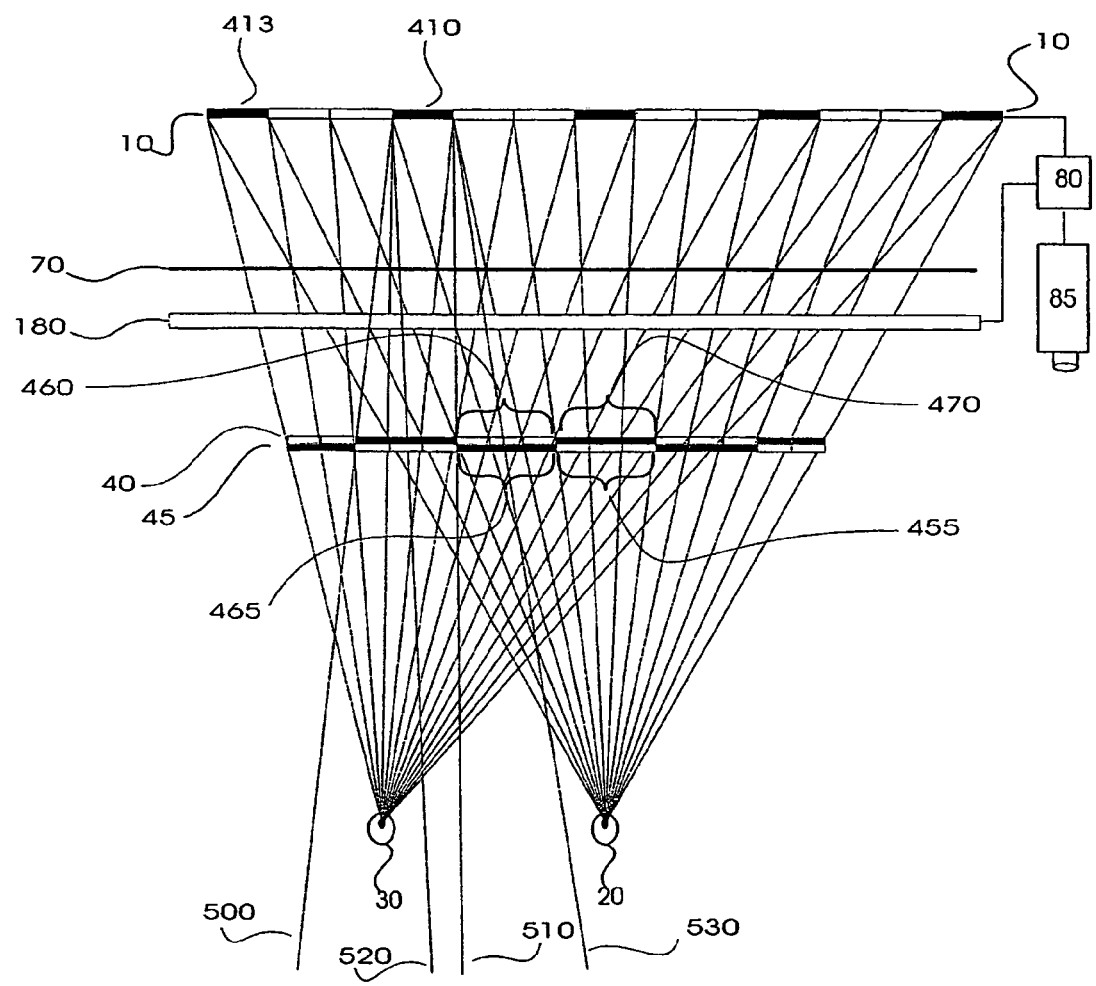
FIG. 24 is a top view of an autostereoscopic display system with head-tracking using a barrier with elements whose position can be changed electronically according to the present invention.

Examination of the mathematical relationships expressed in FIG. 24 of U.S. Pat. No. 5,822,117 and in the discussion thereof will show that if positions of the viewers eyes and the positions of layer 40 and of display 10 are given, then if the starting position of a single image picture element on display 10 is given, the size and position both of all the opaque and transparent areas of layer 40, and the size and position of all the image picture elements on display 10 are uniquely determined. Consequently, if layer 40 is capable of being subdivided into opaque and transparent sections of approximately the desired size, and the left and right image picture elements on display 10 can be placed appropriately, then it is possible for the display apparatus to adapt itself to the viewer's position with respect to the display, and to maintain that adaptation while varying the configuration of the apparatus while the viewer moves both left and right and towards and away from the display.

The contrast between FIGS. 4a and 4b graphically demonstrates this phenomenon. The distance between the eyes is the same, their sideways position with respect to display 10 is the same, and the distance 202 separating barrier layer 40 from display 10 is identical. FIGS. 4a and 4b differ only in that the distance 230 of eyes 30 and 20 from barrier 40 in FIG. 4a is considerably greater than is the distance 240 of eyes 30 and 20 from barrier 40 in FIG. 4b.

Thus FIGS. 4a and 4b can represent the same apparatus at different times, the viewer having viewed the display from distance 230 at a first time T1, and then moved closer to the display to view it at distance 240 at a later time T2. The changes in the configuration of the apparatus from T1 to T2 constitute the adaptation of the apparatus to changes in the distance of the viewer to the display.

As may be seen from inspection of FIGS. 4a–b, and taking into account the previous discussions of the functioning of layer 40 and the constellation of display 10, head-tracking sensor 85, control element 80, and feed-back device 83, the device can easily adapt to this change in the viewer's position by creating appropriate transparent areas on layer 40, e.g., at areas 510, appropriate opaque areas on layer 40, e.g., at areas 520, and causing display 10 to display left image picture elements at areas 610 and right image picture elements at areas 620.

It is noteworthy that the apparatus as described can also adapt itself to changes in the position of the viewer's eyes when the viewer tilts his head sideways. The net effect of his doing so, so far as the autostereoscopic device is concerned, is to reduce the angular distance between the eyes. The system as described is capable of adapting its geometry to this change in angular distance between the eyes, just as it is capable of adjusting to variations in interpupillary distance between one viewer and another.

FIGS. 5a–b show a similar implementation of this embodiment of the present invention, this time based, not on a parallax barrier, but, on a two polarizing layers system as described in U.S. Pat. No. 5,822,117 and in PCT Publication WO97/26577 (see, FIGS. 6, 18 and 19 therein). In this case, 50 is a polarizing layer, 55 is a birefringent layer with individually switchable elements, 65 is yet another birefringent layer with individually switchable elements, 90 is a polarizing layer, and 10 is a display. The reader familiar with the discussion of the two polarizing layers based autostereoscopic systems in U.S. Pat. No. 5,822,117 and PCT Publication WO97/26577 will recognize that the apparatus here described fulfills the definition of such a system. Here it is merely pointed out that the above discussion of the adaptability of the apparatus to changing distances of the viewer is equally applicable to the two polarizing layers based system.

Yet another embodiment is described by FIGS. 5a–b if display 10 is a display emitting polarized light, such as an LCD display. In this case layer 50 is unnecessary as its function is inherently provided within display 10. Other considerations regarding the adaptation of the apparatus to movement of the viewer are identical to those discussed above.

In both of the embodiments represented by FIGS. 5a–b, control element 80 controls both the switching of the switchable elements of birefringent layers 55 and 65, and also coordinates the appearance of the left image and the right image in the appropriate areas of display 10.

To summarize the embodiments described by FIGS. 4a–b and 5a–b, one has seen that as the viewer changes his distance from the display, the apparatus can adapt to his changing position by altering the size of areas marked as 510, 520, 610, and 620 on the Figures. If the position of the layers remains constant and the viewer approaches more closely, the overall geometry of the apparatus can be maintained if the size of areas 510 and 520 of layer 40 (or layer 55) grow smaller in proportion to areas 610 and 620 of display 10 (or of layer 65), and conversely as the viewer moves further away, elements 510 and 520 must grow somewhat larger in proportion to the size of the elements 610 and 620.

A Novel Construction of a Pair of Liquid Crystal Arrays for Autostereoscopic Viewing PCT Publication WO97/26577 teaches the use of a pair of polarizing arrays without an intervening shutter layer in an autostereoscopic display system capable of head-tracking (aiming the left and right images at the user's left and right eyes). This embodiment of the present invention improves on that construction, with advantages of cost and simplicity. One of the more expensive aspects of creating the system as is described in FIG. 11 of PCT Publication WO97/26577 is that it requires a shutter layer (e.g., layer 80 in FIG. 11) that switches at fast enough speed to avoid the impression of flickering to the viewer. Speeds such as 120 Hz are typical in this use.

However large liquid crystal shutters switching at such speeds are relatively expensive. The discussion in PCT Publication WO97/26577 contemplates eliminating shutter layer 80 by using liquid crystal arrays in the place of layers 56 and 57 in FIG. 11 therein. Yet large liquid crystal arrays capable of switching at such speeds are even more expensive.

PCT Publication WO97/26577 describes the use of that system in the displaying of either whole images (the left image followed by the right image followed by the left image in a time-sharing sequence), or else the displaying of parts of both images, followed by the other parts of both images. For simplicity, the following relates to the former case, the displaying of whole images, but can clearly be extended to the other alternative.

The solution now proposed is to use the liquid crystal arrays as described in PCT Publication WO97/26577, with a significant addition. Assume that the pair of arrays is set up in such a way so as to be adjusted to the viewer's eye position. From that situation, switching all cells for one of the arrays to the opposite function, that is, turning off every cell that was on, and turning on every cell that was off, would accomplish the same thing as using a shutter between the two layers. This is described in detail in PCT Publication WO97/26577. This switching process can be undertaken on either of the liquid crystal arrays, with equivalent results. In the following, switching one of the arrays so that all the cells that were on are now turned off, and all the cells that were off are now turned on, will be called switching the array to it's "opposite configuration".

The new construction herein described implies that switching of the liquid crystal arrays be undertaken as stated, but that both arrays be switched for that purpose, and that an electronic control element be used to cause the liquid crystal arrays to switch alternately, in a timed pattern.

The following is an example and is not intended to limit the scope of the invention. Imagine that one starts with a left image presented on the display, and both liquid crystal arrays with areas on and off in a manner appropriate for the aiming of the system at the eyes of the viewer. Call that "state A". Now one has a first array (either of the two) switch to the opposite state. This causes (as explained in PCT Publication WO97/26577) the system to become opaque to the left eye and visible to the right eye. In conjunction with this change, one causes the right image to be displayed on the display device. Call this "state B".

One now causes the second array to switch to its opposite configuration. This causes the apparatus to again be transparent to the left eye and opaque to the right eye, and the system again displays the left image. This is "state C".

One then causes the first array to switch back to its initial state, and display the right image, "state D".

We then cause the second array to switch back to its initial state, and display the left image. This is a return to state A.

The overall result is that the image has switched through two full cycles (left image, right image, left image, right image), and each of the liquid crystal arrays has gone through only once cycle (initial configuration, opposite configuration, initial configuration). This means that, assuming that an appropriate control element is used to coordinate the switching of the liquid crystal arrays and the presentation of the appropriate image on the display, that a high speed switching of the image (e.g., 120 Hz) can be accomplished by the coordinated switching of two slower-speed liquid crystal arrays (e.g. two arrays operating at 60 Hz). This arrangement has the advantage of lower cost as is compared to the use of a high-speed shutter, and is also more practical than switching a single liquid crystal array to accomplish the purpose, as liquid crystal arrays capable of switching at high speeds (e.g., 120 Hz) are not generally available at this time.

Additional Blocking Layer for a Two Polarizing Layers Based System

The head-tracking system described in U.S. Pat. No. 5,822,117 can easily be used together with the movement-permissive system described in U.S. Pat. No. 5,822,117 and in PCT Publication WO97/26577 when the system as a whole is constituted by one fixed polarizing layer and one variable polarizing layer. Opaque elements, as required by the movement-permissive system, would be easy to integrate into the manufacture of a fixed polarizing layer.

When the system is modified, as we have done for example in the embodiment described above, and is based on an optical construction having two birefringent layers with individually switchable elements, then it is no longer useful to manufacture fixed opaque elements as part of any one of the polarizing layers.

One method of introducing movement-permissiveness into such a system is to arrange (according to the principle shown by FIG. 32 of PCT Publication WO97/26577) for appropriate regions of the display to not emit any light from either image, and for the display to be controlled by the same control element which controls the variable elements of the polarizing layers. Yet in some applications (particularly applications where the autostereoscopic apparatus is not manufactured together with the display but is an "add-on") it is convenient for the system allowing for autostereoscopic viewing to be self-contained and to be installable without requiring exact registration with the display equipment. In that case, areas on layers 55 and 65 need to be opaque according to the principles of the movement-permissive system as shown in FIG. 33a of PCT Publication WO97/26577. These areas are the areas around the points of transition from elements with one polarization orientation to elements of the other polarization orientation. However, as is explained above in reference to the embodiment described by FIG. 5, those points of transition are not fixed, but moveable. Consequently to integrate the movement-permissive system into an embodiment such as that described by FIG. 5, or into any embodiment containing a birefringent layer with individually switchable elements in which the opaque areas are to be integrated into such a layer, one must provide a moveable set of opaque areas whose placement is also controlled by the control element 80. Control element 80 can then cause opaque areas to appear and to move in conjunction and coordination with the switching of the individual elements of the birefringent layer controlling the polarization elements, in such a manner as to obtain and to maintain over time the effect described in PCT Publication WO97/26577 FIGS. 32–33a.

Figure 6:
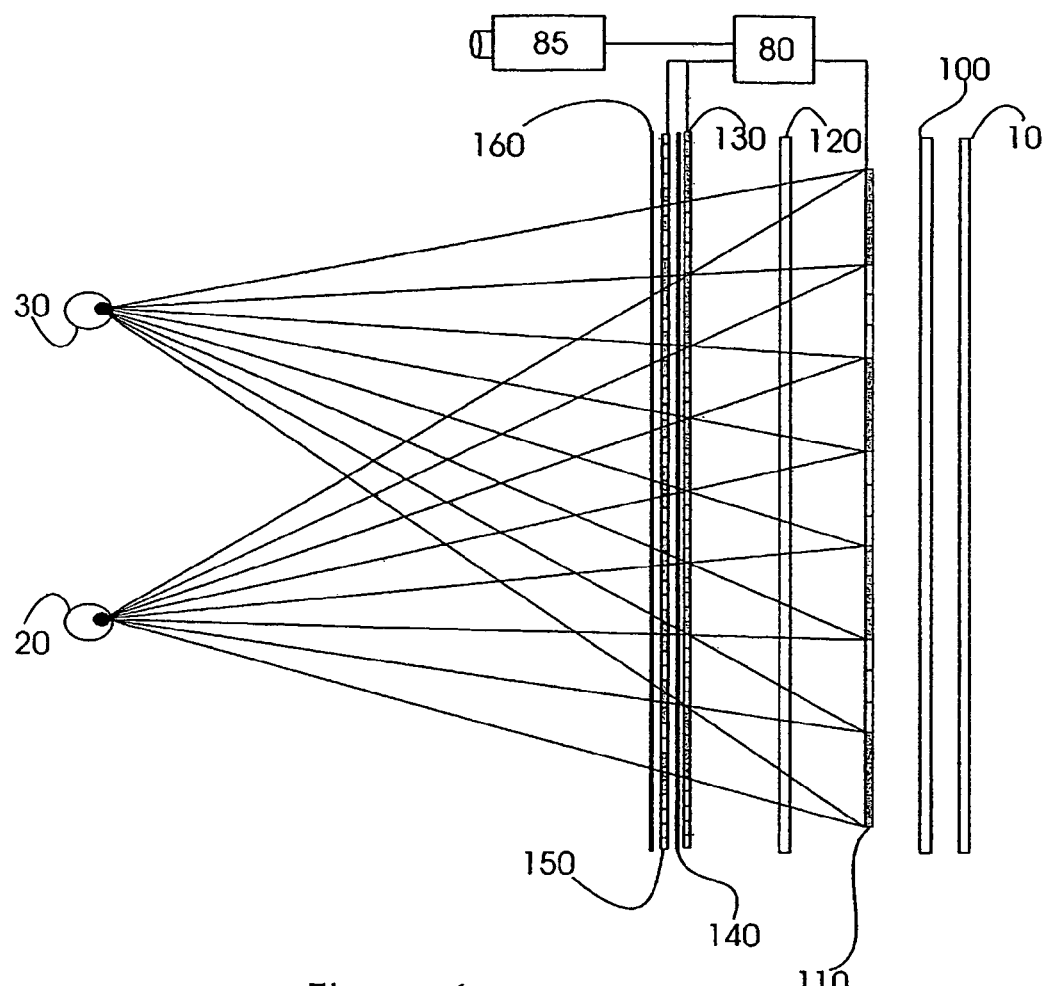
FIG. 6 is a top view of one embodiment of the present invention for providing a dynamic movement-permissive system.

FIG. 6 summarizes this embodiment. 10 is a display. Optional layer 100 is a fixed uniform polarizing layer. Layer 110 may be either a fixed polarizing layer such as is described in U.S. Pat. No. 5,822,117 (layer 56 of FIG. 6 therein), or else a birefringent layer with individually switchable elements. In the former case, layer 100 is unnecessary, since layer 110 polarizes light passing through it. In the latter case layer 100 is included; it polarizes light from display 10, some of which may or not be turned by the switchable birefringent areas of layer 110.

Note also that if 10 is a display generating polarized light, such as for example an LCD display as is popular in notebook computers, then in this case also, layer 100 would be unnecessary as the light from display 10 would already be polarized.

120 is an optional birefringent layer without individually switchable elements: this layer can be used but is unnecessary if 110 is a birefringent layer with individually switchable elements, since the effect of reversing the birefringent status of layer 120 would be similar or identical to the effect of reversing the birefringent status of each of the switchable elements of layer 110.

130 is a birefringent layer with individually switchable elements, and 140 is a uniform polarizing layer.

The cumulative effect of using layers 10, 100, 110, 120, 130, and 140, assuming that the individual birefringent elements of layers 110 and 130 are switched in the manner described in U.S. Pat. No. 5,822,117 and PCT Publication WO97/26577, and above, is an autostereoscopic system without the movement-permissive system, but which incorporates an electronic head-tracking system as herein described.

The addition of layers 150 and 160 adds the movement-permissive system to the apparatus.

150 is a birefringent layer with individually switchable elements. 160 is a uniform polarizing layer. The combination of the uniform polarizing layers 140 and 160 with birefringent layer with individually switchable elements 150 constitutes a system well known in the art, and used to e.g. create opaque areas in the displays of most notebook computers and digital watches. Thus, layers 140, 150, and 160 taken together can produce opaque areas wherever is desired along the width of the apparatus. Layers 150, 130, 120 (if used), and 110 (if it incorporates individually switchable elements) can all be connected to a common control element 80 which controls the placement of image picture elements on display 10 and the switching of birefringent elements of layers 150, 130, and (optionally) 110, and which in turn may respond to information provided by a head-tracking sensor 85.

It will be evident to the reader normally skilled in the art that the arrangement described by FIG. 6 could optionally be constructed in such a way that light would transverse it from the opposite direction, that is, in such a way that the combination of layers 160, 150, 140, and 130 is placed close to display 10, followed by (optional) layer 120, then layer 110, and then with layer 100 closest to the eyes of the viewer.

In other words, the addition of layers 150 and 160 to systems such as that described above in reference to FIG. 5, allows for opaque elements (required by the movement-permissive system) to be placed electronically at the points where those blocking elements would be appropriate as described in PCT Publication WO97/26577 (FIGS. 32 and 33a therein), yet allows it to continuously conform to the variable geometry, potentially undergoing rapid switching under electronic control, of the birefringent layers with individually switchable elements incorporated in the system. Thus the system has the benefits of electronic head-tracking and also movement-permissiveness, is capable of adapting both to sideways movement of the viewer and to forward and back movement of the viewer, and even to a large extent to tilting of the head of the viewer, all at electronic speeds and with no moving parts.

Autostereoscopic System Using a Two Polarizing Layers Based System Without Temporal Multiplexing One of the problems of many of the stereoscopic and autostereoscopic systems known in the art is the problem of flickering, when the pair of stereoscopic images are time-multiplexed in whole or in part, that is, when the apparatus causes the viewer's eyes to alternate in their viewing of the display or of parts of the display. Many stereoscopic and autostereoscopic displays tend to flicker, which flickering is distressing to viewers and hence constitutes a serious disadvantage of such systems.

On the other hand, of those stereoscopic systems and autostereoscopic systems known in the art which do not involve time-multiplexing and consequently do not flicker, many suffer the disadvantage that they use some portions of the screen to display the left image and other portions of the screen to display the right image, consequently both images appear at relatively low resolution, because the view presented to each eye includes large areas of the display surface which are not displaying that eye's appropriate image.

Figure 7:
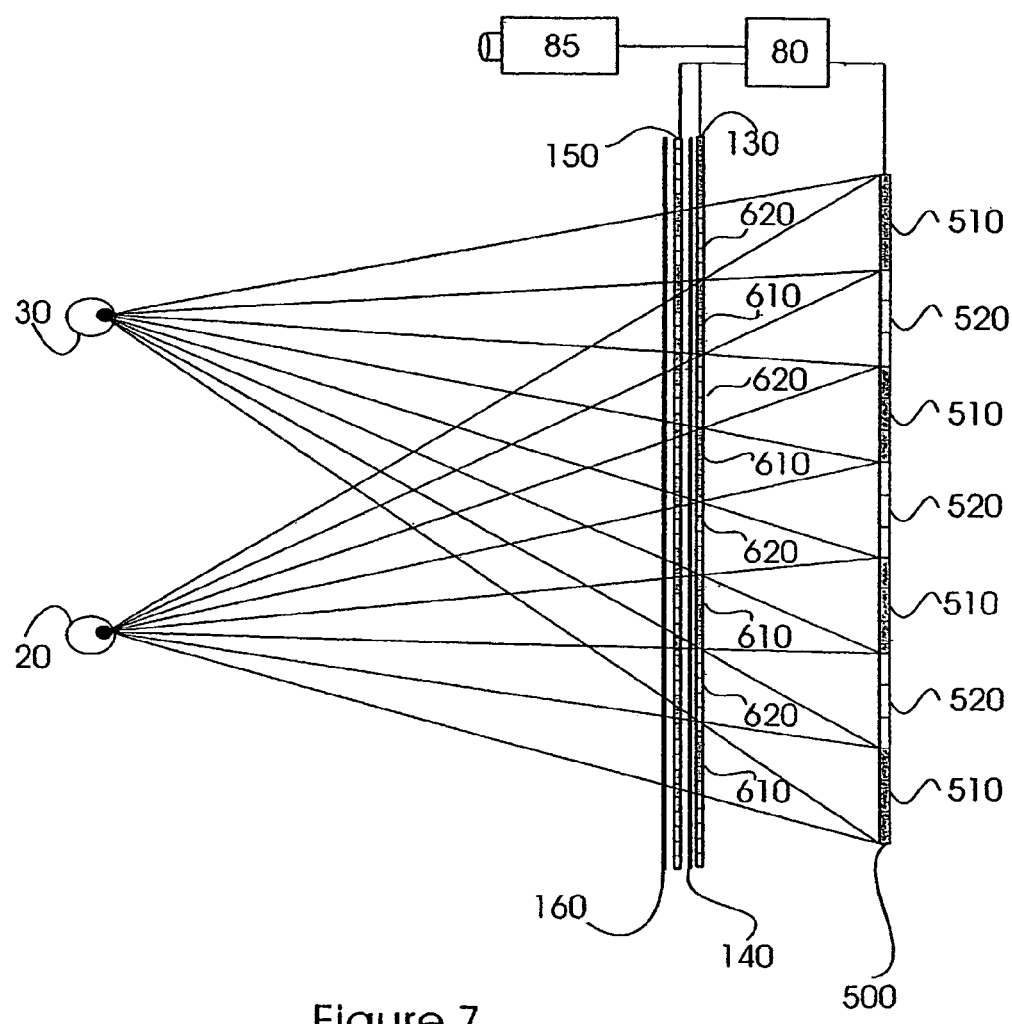
FIG. 7 is a top view of one embodiment of the present invention for providing an autostereoscopic system which does not use time multiplexing, hence does not flicker, yet also presents both eye's images at full resolution.

FIG. 7 presents a manner in which the techniques described in PCT Publication WO97/26577 and U.S. Pat. No. 5,822,117 and in the preceding Figures described herein can be used to create an autostereoscopic system which does not use time multiplexing, hence does not flicker, yet also presents both eye's images at substantially full resolution.

U.S. Pat. No. 2,631,496 to Rehorn, which is incorporated herein by reference, describes an "image B" which is an image display with particular characteristics (see FIG. 1 therein). For a full definition the reader is referred to Rehorn's text and drawings, but the form of "image B" may be summarized as follows: a display presents two sets of areas distributed across the display with areas from one set alternating with areas from the second set, the areas are in the form of strips of approximately equal width, the first set of which presents the left image with a first polarization orientation A and also the right image with a second polarization orientation B orthogonal to A, and a second set which presents the right image with orientation A and the left image with orientation B.

Referring now to FIG. 7. Display layer 500 is a display surface displaying left and right images as described by Rehorn in his description of his "image B", and in the preceding paragraph. The shaded portions 510 of layer 500 represent areas of the first set, as defined above, and the unshaded portions 520 represent areas of the second set. Layer 130 is a birefringent layer with individually switchable elements, and layer 140 is a uniform polarizing layer. Layers 150 and 160 are optional; their definition and function is the same in this FIG. 7 as is described for FIG. 6.

Assume that the orientation of layer 140 is such that it is transparent to light of orientation B and opaque to light of orientation A. Further assume that in the unshaded areas 620 of layer 130 the birefringent effect of layer 130 is inactive, while shaded areas 610 of layer 130 turn light by 90 degrees.

The reader can see by inspection of FIG. 7 that right eye 20 sees each shaded area 510 of layer 500 through a shaded area 610 of layer 130, and sees each unshaded area 520 of layer 500 through an unshaded area 620 of layer 130. According to the definitions provided herein, light from the right image arriving from areas 510 comes from the first set of areas, consequently is in orientation B. When it passes through shaded areas 620 of layer 130 it is turned 90 degrees into orientation A. Layer 140 is by assumption transparent to light of orientation A, so in areas 510 the right image is visible to the right eye.

Similarly, the right image displayed in areas 520 is in orientation A, and passes through unshaded portions 610 of layer 130, which are inactive in birefringence and do not affect the orientation of light passing through them. Consequently light from the right image from areas 520 also reaches layer 140 in orientation A and pass through to eye 20. Thus right eye 20 can see the right image on all areas of display 500. At the same time, light from the left image was oriented orthogonal to light from the right image in each of those areas. Consequently, such light, passing through the same areas of layer 130, will arrive at layer 140 with Orientation B, and be blocked. Thus the right eye sees the right image everywhere on display 500, and does not see any light from the left image.

The reader can again see by inspection of FIG. 7 that left eye 30 sees each shaded area 510 of layer 500 through an unshaded area 620 of layer 130, and sees each unshaded area 520 of layer 500 through a shaded area 610 of layer 130. Light from areas 510 from the left image is in Orientation A. On its way to left eye 30 it is unchanged by the unshaded areas 620 of layer 30, and so can pass through layer 140 to left eye 30. However light from the right image, being in Orientation B and unchanged by layer 130 will arrive at 140 in Orientation B and be blocked from left eye 30. Meanwhile from areas 520 light from the left image is in Orientation B, and passes through areas 610 of layer 130, which turn it 90 degrees into the Orientation A, consequently light from the left image from areas 520 also passes through filter 140 to the left eye. Light from the right image from areas 520 is in Orientation A, is turned by areas 610 and arrives at 140 in Orientation B and is blocked.

Consequently the left eye sees the left image but not the right image through the whole width of display 500, and the right eye sees the right image and not the left image through the whole width of the display. Element 130 is a birefringent layer with individually switchable elements and elements 80 and 85 are the same as was defined in previous Figures, consequently the apparatus includes the head-tracking system. Optional layers 150 and 160 provide for a movement-permissive system. If display 500 is capable of altering the placement and size of areas 510 and 520, then the apparatus can use the technology described above in the context of FIG. 4, and the apparatus is consequently capable of adapting to viewers' movements as they move closer to and further from the display as well, and to adapt also to their movement when they tilt their heads. Note also that if instead of using the uniform polarizer 140 and the active element 130, one substitutes in the position of element 130 a static element of orthogonal polarizing strips such as is described in U.S. Pat. No. 5,822,117 in reference to layer 56 of FIG. 6 therein, or else if elements 130 and 140 are unchanged from their previous description but display 500 is not capable of altering the placement and size of areas 510 and 520, then the apparatus would not be capable of adapting to viewers' movements as they move closer to and further from the display, yet it would nonetheless present the advantages of lateral head-tracking in a full-resolution non-flickering autostereoscopic system. If display 500 is not capable of altering the placement and size of areas 510 and 520, and also a static polarizing strip layer is substituted for polarizer 140 and active element 130, then the apparatus would not be capable of head-tracking, yet it would still present the advantages of a full-resolution non-flickering autostereoscopic display.

Autostereoscopic Apparatus Using a Beam Splitter

Figure 8:
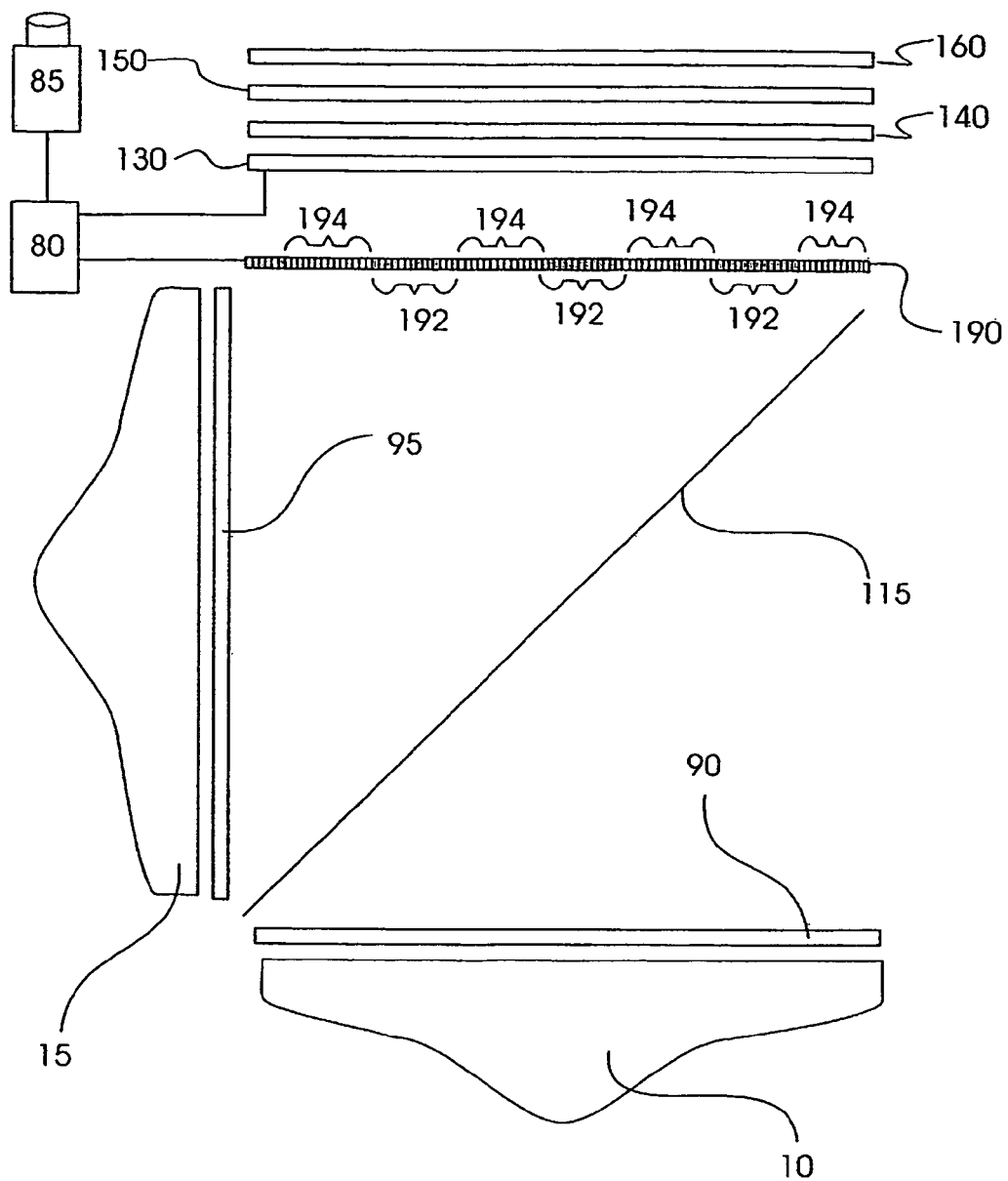
FIG. 8 is a top view of an embodiment of the present invention employing a beam splitter and a pair of displays for generating a full-resolution, non-flickering, autostereoscopic display.

In the discussion of FIG. 7 it is assumed that display layer 500 is a display surface displaying left and right images as described by Rehorn in his description of his "image B". FIG. 8 describes a novel way of producing such a display.

Figure 10:
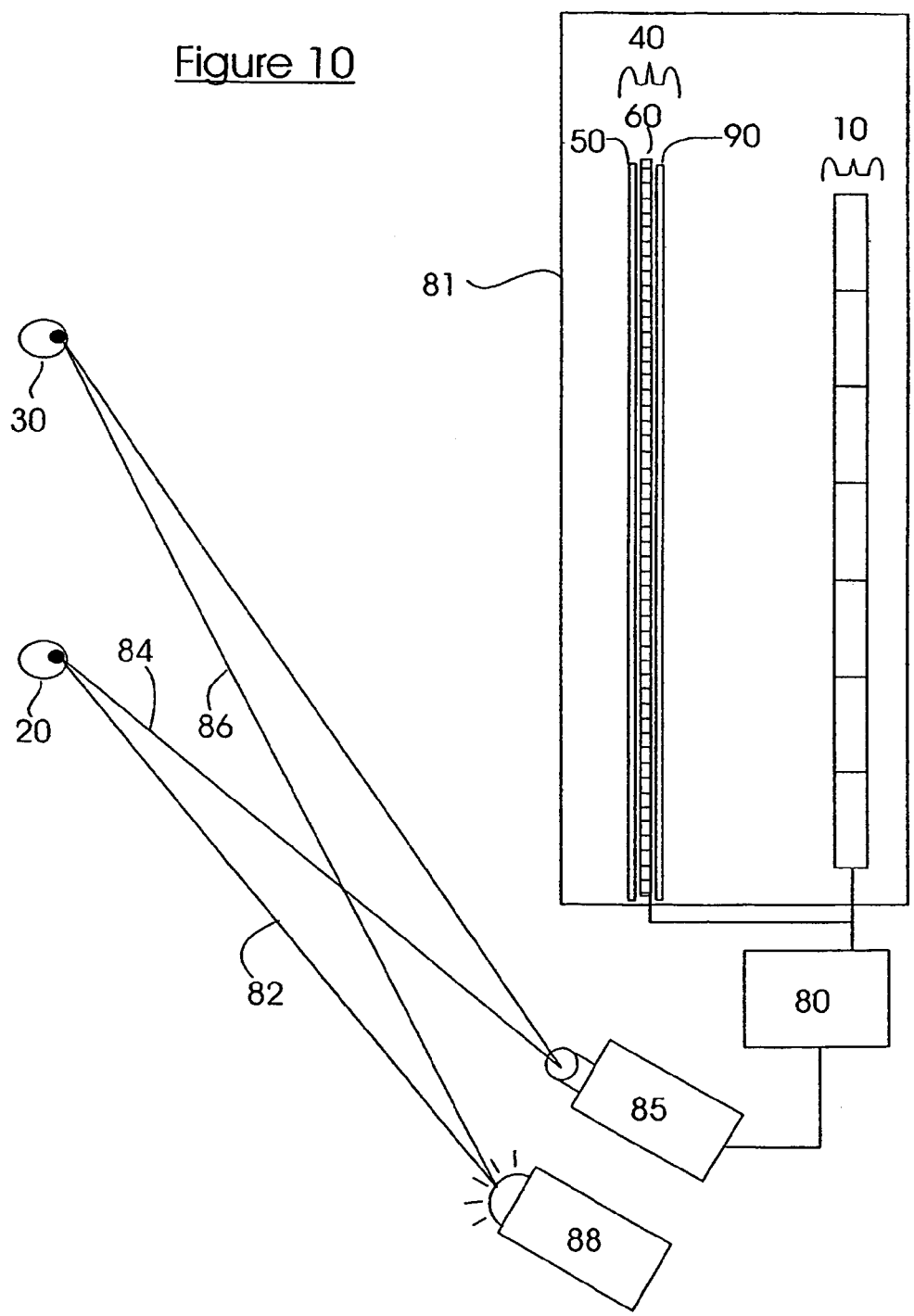
FIG. 10 is a top view of a system capable of finding the position of a viewer's eyes using light reflected from the eye surface or retina usable with any system for autostereoscopic viewing and other systems.
Figure 15:
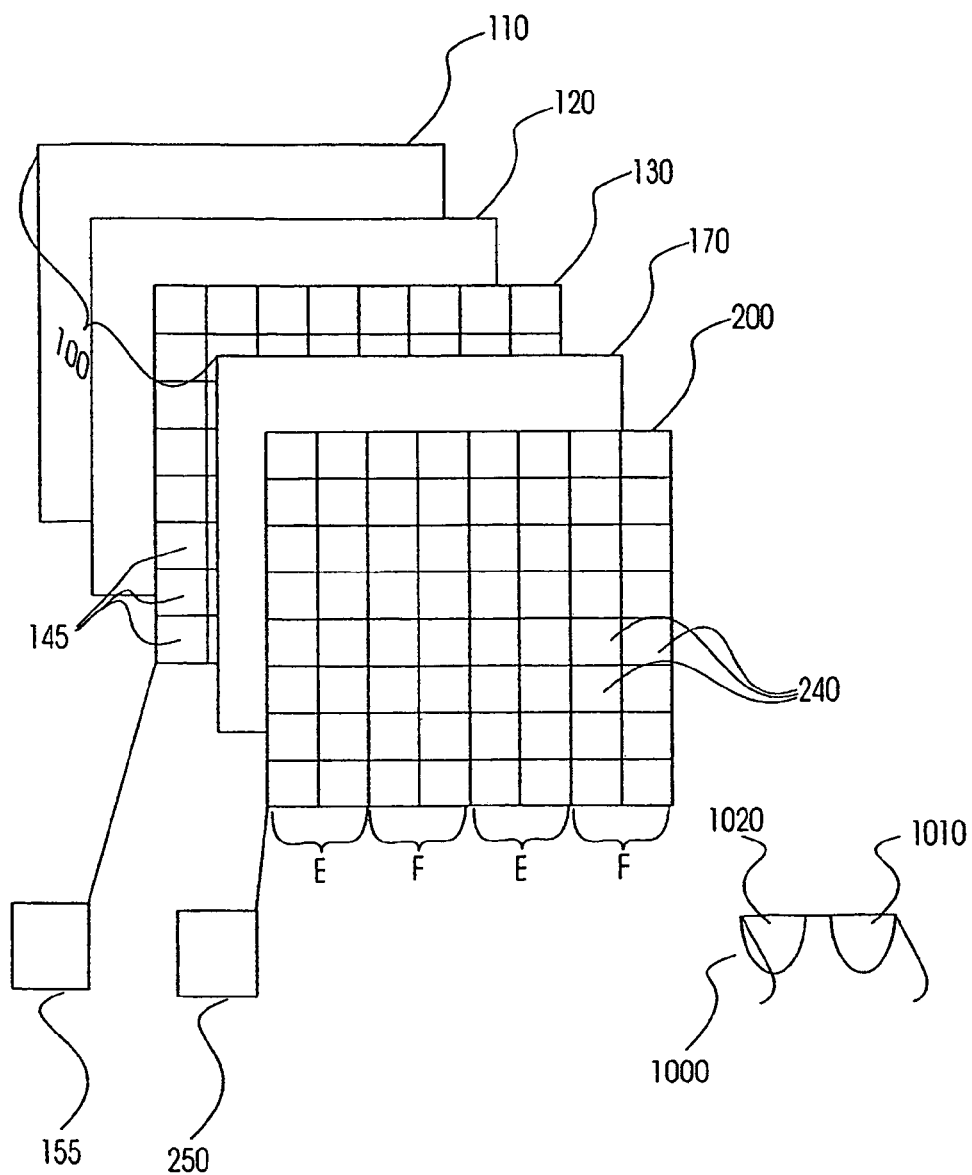

In FIGS. 8, 10 and 15 are display sources such as CRT displays. 90 and 95 are uniform polarizing filters, orthogonal to each other. That is, if light originating from display 10 and passing through filter 90 is polarized in Orientation A, then light originating in display 15 and passing through filter 95 will be polarized in Orientation B, 90 degrees from A.

115 is a beam splitter, such as a partially transparent and partially reflective surface, e.g., a partially silvered mirror. It allows some of the light (typically approximately half the light) from display 10 to pass through it to layer 190, and it reflects some of the light (typically approximately half the light) from display 15 onto layer 190. Surface 115 either preserves the polarization orientation of light passing through it and reflected from it, or else transforms the orientations of reflected and of transmitted light by an equal degree, or else there is a predictable relationship between the degree to which it turns transmitted light and the degree to which it turns reflected light, in which case the orientations of filters 90 and 95 can be adjusted so that light from display 10, after passing through surface 115, is in an orientation orthogonal to that of light from display 15 after being reflected from surface 115.

One of the two displays 10 and 15 displays a left image, the other a right image. The image on display 15 will need to be reversed left-to-right, since the viewer sees a "mirror image" of that image, with the areas originally on the left side of the screen as would normally be seen by the viewer transposed to the apparent right side of the screen by the reflective process. Transposing the reflected image at the display source allows it to correspond appropriately with the non-reflected image from display 10.

In one embodiment layer 190 is a fixed layer alternating active in light rotation with areas inactive in light rotation.

In another embodiment layer 190 is a birefringent layer with individually switchable elements, under control of control element 80 which receives information from head-tracking sensor 85. The birefringence of areas of layer 190 is switched is the same manner, and with the same function, as that described in the context of layer 65 of FIG. 5.

In both cases, layer 190 presents areas active in light rotation, marked as shaded areas 192, and areas inactive in light rotation, marked as unshaded areas 194.

Assume that the left image arrives at 190 in an orientation B. Then shaded areas 192 will turn it to an orientation A, orthogonal to B, and unshaded areas 194 will leave it in orientation B. Or, by the definition of "active/inactive in light rotation", areas 194 will turn it to B+n, and areas 192 will turn it to A+n, which is to say B+n+90 degrees. For simplicity, the following discussion will assume that the areas inactive in light rotation have no birefringent effect, nevertheless, the description should be taken to include all the cases described by the definition of "active/inactive in light rotation", with the obvious necessary changes implied.

The right image arrives at layer 190 in orientation A, orthogonal to orientation B. Passing through the same shaded areas 192, the right image is turned to orientation B. Passing through unshaded areas 194, the right image is unchanged and remains in orientation A. Note that the invention is essentially unchanged if light passing through the unshaded areas is rotated by some amount m degrees, and light passing through the shaded areas is rotated by m+90 degrees.

The result of this arrangement is that the image passing through layer 190 presents the characteristics described for Rehorn's "image B", and described above in the context of FIG. 7. Layers 130, and 140, and optional layers 150 and 160, and elements 80 and 85 refer to the same elements as were depicted in FIG. 7 and provide the same functionality and advantages. The apparatus as a whole provides the advantages of the electronic head-tracking and movement-permissive systems, provides full resolution for both images, does not flicker, and in the case of the embodiment where layer 190 is a birefringent layer with individually switchable elements, can adapt to changes in the viewer's distance from the apparatus as well. As noted above with respect to FIG. 7, if a static layer of orthogonal polarizing strips were used instead of the active combination of layers 130 and 140, the resulting system would not be capable of full distance head-tracking (and if layer 190 were not a birefringent layer with individually switchable elements it would not be capable of head-tracking at all), yet the system would still have the advantages of full resolution and non-flickering autostereoscopic display.

One should also note that if the light from displays 10 and 15 is already polarized (as would be the case, for example, with light from an LCD display), then filters 90 and 95 would be unnecessary. Should it be desired to construct the apparatus based e.g., on two LCD displays of identical orientations, then a birefringent layer turning light by 90 degrees could take the place of either filter 90 or filter 95, and the second filter would be unnecessary. In any case, the polarizing elements associated with the displays are regarded in the claims below as forming a part of the displays.

One should note also that alternative constructions are possible, and would produce essentially the same effect. Layer 190 could be placed parallel to surface 115 and contiguous to it, and polarizers 90 and 95 could have identical orientations rather than orthogonal orientations. Then light moving from display 10 towards the viewer would pass once through layer 190, and light from display 95 would pass twice through layer 190 (once while moving towards surface 115, once, after reflection, while moving from surface 115 towards the viewer). Alternatively, a layer constructed like layer 190 could be placed near polarizer 90—and a second similar layer placed near polarizer 95. The net effect of these alternative constructions would be the same as that described above: an "image B" would be produced.

Autostereoscopic Apparatus Using Two Projectors in Back Projection

Figure 9:
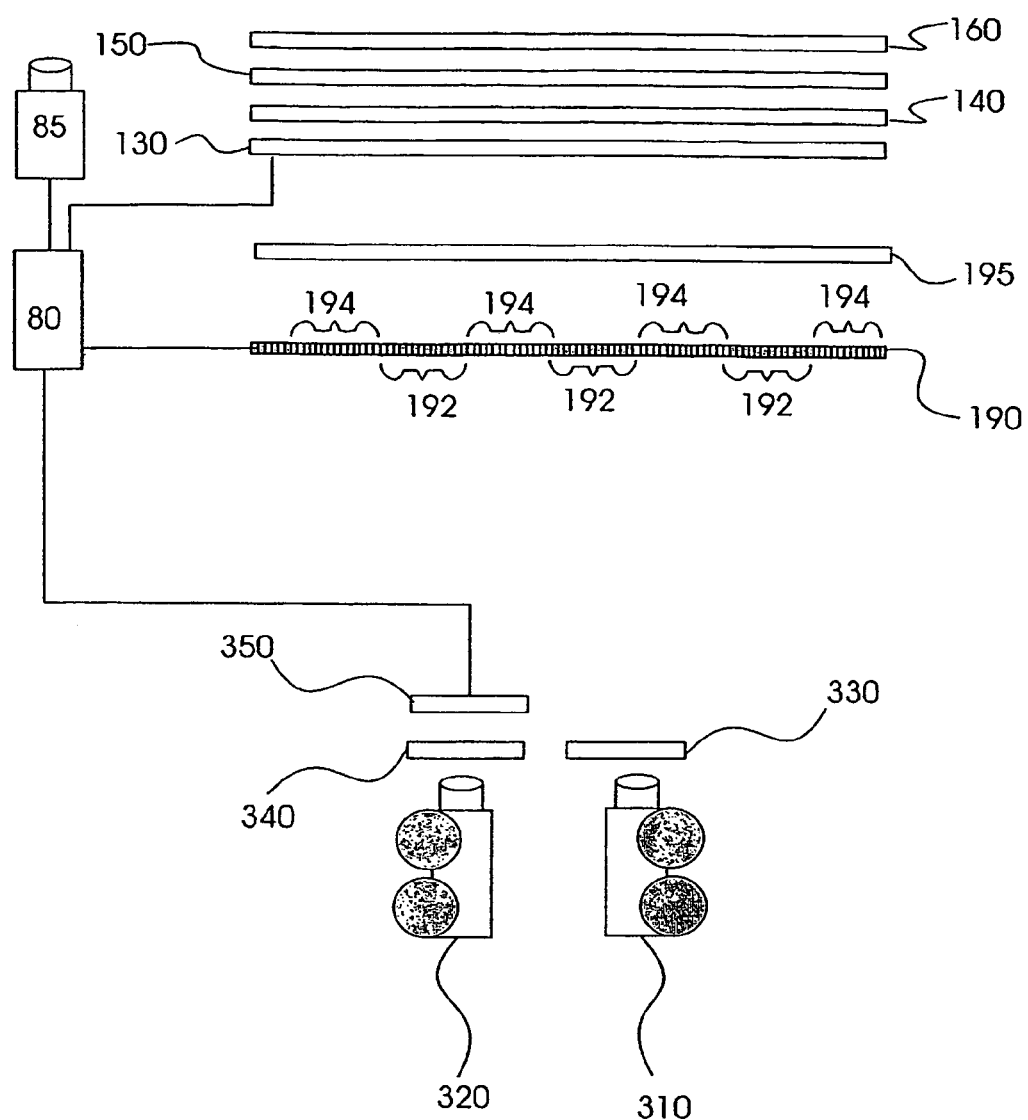
FIG. 9 is a top view of an autostereoscopic apparatus using one or two projectors in back projection generating a full-resolution, non-flickering autostereoscopic display.

FIG. 9 presents another method for achieving the required configuration for the display on layer 500 of FIG. 7, an "image B". In FIG. 9, 310 and 320 are projectors, one projecting a left image and the other a right image. 330 and 340 are uniform polarizing filters, oriented 90 degrees from each other. If light from projectors 310 and 320 is already polarized, as would be the case if 310 and 320 were LCD projectors, then 330 might be a light-retarding layer rather than a polarizer, and 340 might be unnecessary. Alternatively, 330 and 340 might both be light-retarding layers. In either case, the required effect is that light passing through 330 be polarized in some orientation A, and light passing through 340 be polarized in some orientation B orthogonal to A. Consequently, light from the left and from the right images arrives at layer 190 with polarization orientations orthogonal to each other. Filters 330 and 340 are referred to in the claims below as parts of the projectors, resulting in light polarizing projectors.

Layer 195 is a translucent screen on which an image can be projected, and which is capable of transmitting light while preserving its polarization orientation, or which transmits light in a manner which modifies that orientation in a systematic way, such that the differences between the orientation of the first image and that of the second image is preserved.

Layer 190 is the same as the layer 190 described for FIG. 8.

The effect of layer 190 on light reaching it from the displays is identical to that described in the context of FIG. 8, and will not be repeated here. The resultant configuration corresponds to that defined by Rehorn as "image B" and is described above. Layers 130, 140, 150 and 160 and elements 80 and 85 are as defined for FIG. 8. Consequently this arrangement as well constitutes an autostereoscopic system with full resolution and no flickering.

Some alternative methods of construction can also be used. Layer 190 may be moved closer to the projectors than to the viewers, with an additional lens arrangement used to refocus the image on layer 195; this would allow layer 195 to be smaller and less expensive. Alternatively, layer 195 might be placed between layer 190 and the projectors, rather than between layer 190 and the viewer.

Autostereoscopic Apparatus Using a Single Projector in Back Projection

FIG. 9 also presents yet another embodiment. As before, 320 is a projector, and 340 is a uniform polarizing filter. Layers 195, 190, 130, 140, 150, and 160 and elements 80 and 85 are as described with respect to FIG. 8. In this embodiment, however, projector 310 and filter 330 are not used. Instead, uniform switchable birefringent element 350 is used, and is controlled by control element 80. The purpose of this embodiment is to produce most of the functionality of the previous embodiment, while reducing its cost by requiring only one projector rather than two.

This is a time-multiplexing system. In time T1, element 350 is inactive in turning light, and one of either the left or the right image is projected from projector 320. Light from this image behaves just as was described in the previous embodiment.

In time T2, element 350 is activated by control element 80 and timed to coincide with the projection of the other image (left, if right was previously projected, or right, if left was previously projected). Since element 350 turns the polarized light by 90 degrees, the net effect is that the light of the other image arrives at layer 190 polarized just as light from projector 310 was in FIG. 8, and undergoes the same processes as were previously described for that light in the context of FIG. 8. In other words, in time T1 a first image is presented, it is entirely visible to its appropriate eye and not visible to the inappropriate eye. In time T2, the other image is presented and it is also entirely visible to its appropriate eye and not visible to its inappropriate eye. While this arrangement does have the disadvantage that it is based on time-sharing of the apparatus and hence has some potential for flickering, it does have the advantage of full resolution for both images, and of lower cost since only a single projector is required. The switching birefringent element 350, since it can be placed near the projector, can be quite small and consequently inexpensive. Note also that 350 might itself be a birefringent layer with individually switchable elements, and be used in such a manner that some areas are initially projected in one orientation and other areas are initially projected in the other orientation, and then in a second phase those orientations are switched. This would have the advantage of making some areas of each image visible to each eye in each phase, and consequently reduce the impression of flickering.

A Head-tracking System Using Light Reflected from the Eye Surface or Retina

Various embodiments of autostereoscopic systems described above, and various other autostereoscopic systems available in commerce or currently under development throughout the world, rely on some form of head-tracking sensing. Yet presently, no inexpensive head-tracking sensors which reliably report the exact position of the users' eyes are currently available. FIG. 10 describes such a system. Control element 80 controls various aspects of a display apparatus 81. By way of example, display apparatus 81 is here represented as one of the embodiments presented hereinabove, specifically the embodiment described by FIGS. 1a–b and 2a–b, but this is intended merely as an example; for present purposes, apparatus 81 may be any display apparatus, including projection, which uses information about the position of the viewers' eyes to control some aspect of the functionality of a display apparatus or other apparatus.

88 is a light source. It is positioned somewhere in the area of the display, and shines light in the direction of the viewer or viewers. Light from source 88 is reflected from left eye 30 and right eye 20 of the viewer, and detector 85 captures the reflection. For simplicity of the drawing, 88 and 85 are displaced to the bottom of the drawing, i.e., to the right of the display. In practice it would probably be most convenient to place these objects in some central position, such as just above and near the center of the display.

Detector 85 is a light detector capable of recognizing light reflected from the viewer's eyes, and reporting the position, or the direction, of the origin of that reflection (i.e., the relative position of the eyes) to control element 80.

One way to accomplish this is for source 88 to provide light to be reflected from the eyes, and for detector 85 to be sensitive to that light. In a presently preferred embodiment, light from light source 88 will be of an intensity and frequency which makes it either invisible to the viewer or unobtrusive to him, and it will also be characterized by some pattern or quality which makes it easy to recognize and easy to distinguish from all other light which may be captured by detector 85. For example, light from source 88 might be characterized by some particular frequency not likely to be found in the area of the viewer's eyes, or it might be characterized by a particular pattern of frequencies varying over time, or by a particular pattern of intensities varying over time, or by a particular form or shape of the light-emitting source 88 which would be recognizable in the source's reflected image, or by any combination of the above, or by any other means which will make the image of source 88 reflected from eyes 30 and 20 easily recognizable.

In such an embodiment detector 85 could be, for example, a video camera connected to digitizing hardware and to computing means capable of scanning the digitized image presented by the camera and recognizing that particular part of the picture which represents light with the recognizable characteristics of light from source 88. More simply, 85 might be such a digitizing video camera, sensitive to a particularly light frequency, combined with a light filter which passes only light of approximately that frequency. This combination would make the process of scanning the image to recognize the reflected light relatively easy, since such light, and only such light, would reach the camera. An additional method would be to modify the intensity or frequency of the light from source 88 during a period when the light emanating from the display itself is not changing substantially, or is changing in some predictable way. Then comparison of the image seen by detector 85 before the change to the image seen by detector 85 after the change (e.g. subtraction of one image from the other) would yield an image in which the reflection from the eyes would be easily detectable. The essential characteristic of detector 85 is that it can recognize the light from image of source 88 reflected from the eyes of the viewer, and report to control element 80 the angular direction or apparent position of each of the eyes of each of the viewers of the apparatus.

To the extent that light reflected from the eye can be distinguished from other ambient light, the fact that light originates from source 85 is unimportant. Thus, an adequate implementation of this invention would be constituted by a detector 85 capable of recognizing light reflected from the viewer's eyes, which light originated from the display itself, rather than from source 88.

The reader can easily verify the principle upon which this embodiment is based, by looking into a mirror above which stands a naked light bulb. The image of the bulb reflected from his eyes will be more intense than other light reflected from his face, will more clearly reflect any variations in color or intensity of the light source, and will in fact be seen to consist, on close inspection, of an actual image of the originating light bulb. Thus the problem of "finding the eyes" within the image received by detector 85 is rendered considerably simpler than would be the case by any other means of interpretation of the image of the viewer's face, or by any method of approximating the position of the eyes by detecting or approximating the position of the head.

Several additional advantages of this system may be noted. One is that because the surface of the eye is curved, the angle subtended by the image of source 88 will tend to be quite small even if source 88 is somewhat large. Consequently not only are the eyes easy to locate, but the relative position of the center of sight within the area of the eye is also pinpointed. Of course, if source 88 is displaced somewhat to the side of the display the point of reflection will be displaced somewhat sideways from the center of sight, but this displacement will be a function of the position of source 88 and of detector 85, and an appropriate correction to find the exact center of sight can either be calculated, or can be supplied by manually adjusting the aiming of the device during a once-per-session setup procedure.

An additional advantage of this embodiment is that it provides accurate real-time information about the position of both eyes independently, as distinguished from devices which track the position of the head, or which track the position of some object attached to the head. Since the position of each eye is tracked independently, the device as a whole is immediately responsive to differences in interpupillary distance from one viewer to another, and it is also capable of responding to tilting of the head (which causes a shortening of the horizontal component of the interpupillary distance, which is the component relevant to most of the uses of head-tracking sensors mentioned herein, and in, for example, U.S. Pat. No. 5,822,117 and PCT Publication WO97/26577. Of course, the apparatus can also provide accurate information about the vertical position of each eye as well, to any apparatus for which that information is of use.

A minor modification of the detection procedure may be called for when the viewer is wearing glasses. Depending on their type and their angle, the viewer's glasses may also reflect a strong and recognizable image of light source 88. The computing means used to analyze the image collected by detector 85 and report the eyes relative positions will in some cases need to take into account the fact that there may be several reflected images of source 88, including one set from the eyes, one set potentially reflected from the front surface of the eyeglasses, and yet another reflected from the back surface of the eyeglasses. This is a relatively small computing problem, however, since the images are distinguishable from each other by their intensity, by differing rates of change in position as the viewer moves from side to side (due to curvature of the glasses), and differences in the size of the image of source 88 (due to greater curvature of the eyes). These and other differences in the images reflected from eyeglasses and those reflected from the eyes themselves will make it possible to distinguish which are the image positions to be reported to control element 80. In the case of particular eyeglasses whose nature and whose angle make it particularly hard to distinguish, the system can simply try reporting one set of reflections, or the other, and query the user as to which one (the upper or the lower, the bigger or the smaller, etc.) worked successfully. Better still, during a setup procedure the viewer wearing glasses can simply turn his head, facing slightly left, then slightly right, while watching the screen. When he does this, the reflections from his eyeglasses will move considerably, while the reflections from his eyes will move very little. This should provide sufficient information to allow even a very simplistic and primitive pattern recognition system to distinguish between the two. Yet another possible solution to the problem of distinguishing between reflections from the eyes and reflections from eyeglasses is to use more than one light source 88, one to each side of the display for example. Reflections of those sources from the eyes will typically be relatively close together, because of the curvature of the eye. Reflections of those sources from the glasses will typically be relatively far apart or (depending on the glasses' positions and the positions of the multiple sources 88) not appear simultaneously at all. In any case, if light source 88 is far to the side of the display rather than close to it, it will tend to reflect from the eyes, which are relatively curved, and not from the eyeglasses, which are typically relatively flat when compared to the surface of the eye.

FIG. 10 can also be used to describe another embodiment of this aspect of the present invention. In this case, the reflected light detected by detector 85 is light reflected from the retina of the viewer's eye, rather than that reflected from the surface of the eye. Here one utilizes the phenomenon often observed in home photographs taken with flash bulbs, in which a characteristic reflection from the retina (often called "red eye") can be observed in the photograph at the position of the eyes of the people in the photograph. Hence, in this embodiment detector 85 recognizes light according to the characteristics of light reflected from the retina, and provides that information to control element 80. Since the exact point of vision of the viewer is by this fully identified, there is no need to distinguish between reflected light which originated from source 88 and reflected light which originated from any other source, including that of the display itself.

System Which Helps Viewers Find the "Sweet Spot"

An additional aspect of this invention is an improvement on a system first described by M. P. Rehorn in U.S. Pat. No. 2,820,395. Rehorn's system addresses the difficulty experienced by viewers of autostereoscopic systems which require the viewer to view the systems from particular positions ("sweet spots"). In practice, viewers viewing such systems often find it difficult to know whether they are in fact in the correct position. Rehorn describes a system which provides the viewer with independent feedback (that is, feedback not dependent on the success or failure of the autostereoscopic viewing itself) on the correctness of his position.

Rehorn's method has, however, a disadvantage. Feedback from Rehorn's system is provided by color. When the viewer is in the proper position the viewer sees a pure color (in Rehorn's example, pure white or pure red) and when the viewer is in an improper position the viewer sees a mixed color (in his example, pink).

Unfortunately, it can be as difficult to distinguish between, say, white and slightly pink, or red and red with a slight admixture of white, as it is to distinguish between correct autostereoscopy and autostereoscopy with a slight degree of crosstalk between the images. Consequently it would be advantageous to have a method in which the difference between correct positions and somewhat incorrect positions is more clear. A system may be made that allows the viewer to see an easily recognizable geometric shape (instead of a color blend) when the viewer is in the sweet spot, and which displays a geometric form which is clearly altered or recognizably distorted when the viewer is outside the sweet spot. An example of such a system is now presented.

Figure 12:
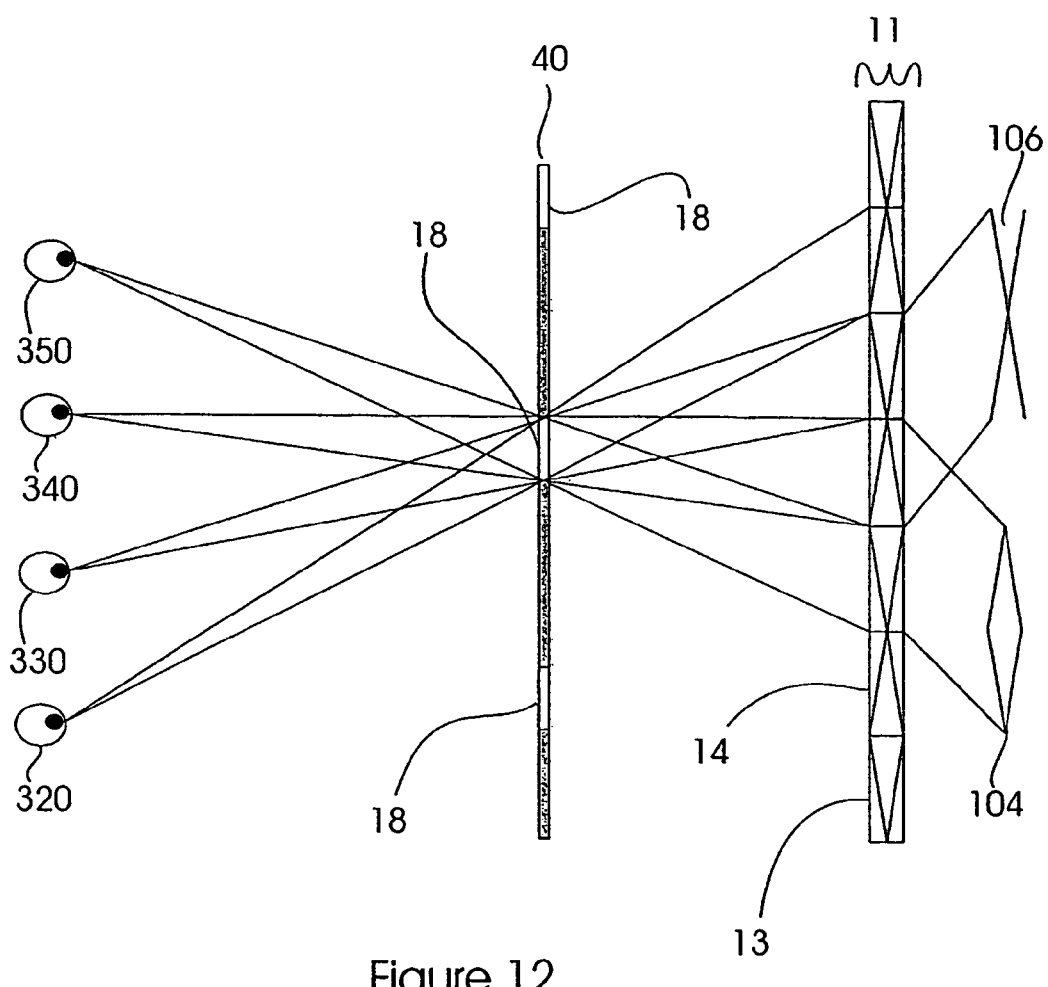
FIG. 12 is a top view of a system according to the present invention which helps viewers to find a "sweet spot" for autostereoscopic viewing.

Assume that the position pairs 320 and 330 of FIG. 12 are sweet spot positions of an autostereoscopic system, for the left and right eye respectively, as are 340 and 350. The pair 330 and 340 is not a sweet spot: if the left eye is at 340 and the right eye at 330, the viewer will see reverse stereoscopy, that is, his left eye will see the right image and his right eye the left image. Aside from that particular spot, if the viewer's left eye is positioned e.g., somewhere between 330 and 350, and the viewer's right eye positioned somewhere between 320 and 340, then each eye will see some light from its appropriate image and some light from its inappropriate image.

Layer 11 in FIG. 12 is a layer in a plane parallel to the plane of the display; in the preferred implementation, it would be in the plane of the display, perhaps surrounding the display surface. As shown in FIG. 12, layer 11 is divided into areas, each of which displays an image, e.g., a geometric form. There are two such forms, alternating along the width of layer 11. When two of these forms are seen together they combine visually to produce an easily recognizable composite form. In the example presented in FIG. 12, if form 13 is seen to the left and form 14 is seen to the right, then the composite form constitutes the shape of an "X" 106. If form 14 is seen to the left and form 13 is seen to the right, then the composite form is in the shape of a diamond 104.

Layer 40 is a layer placed between layer 11 and the viewer. It is opaque through most of its width, but provides a number of viewing apertures such as aperture 18, through which the viewer can see the forms presented by layer 11. The width of aperture 18 is such that if the viewer is in the sweet spot, the viewer is able to see, through that aperture, a portion of layer 11 equal in width to that of two of the forms of layer 11, which is to say, the width of one composite form.

The composite form visible from the sweet spot is chosen to be so as to suggest that the position is appropriate. In the example provided, the viewer viewing the forms on layer 11 through aperture 18 will see a series of diamond shapes. Circular or elliptical shapes might be provided instead, as might any other shape which is easy to see and, preferably, would suggest completion or appropriateness to a viewer. The viewer viewing the forms on layer 11 from, say, positions 330 and 340, on the other hand, will see an "X" shape, easily distinguished from a diamond or circular shape. Similarly, from any intermediate position between the positions mentioned, the viewer would also see an "X" shape, and a lopsided one.

Consequently using this system the viewer can see at a glance whether the viewer is in a "sweet spot", or is not. Note that though layer 10 may be in the plane of e.g., the display, and layer 40 may be in the plane of e.g., a parallax barrier, this is not a requirement: any arrangement which provides a clearly recognizable form when the viewer's position is correct, and is clearly invisible or distorted when the viewer's position is not correct, would suffice as well. Moreover there is no necessary relationship between the size of e.g., aperture 18 and the size of the areas on e.g., a parallax barrier creating the autostereoscopic system, except insofar as is required to make the points at which the viewer sees forms indicating that the viewer is in a sweet spot do in fact correspond to the positions of the sweet spot of the autostereoscopic system. Consequently the size of the aperture, and the size of the forms on layer 10, may be considerably larger than the intervals used in a parallax barrier or two polarizing layers based systems, and hence may be easily seen by the viewer.

Reducing Flicker by Combining Stereo Modulator Systems With Spatial Multiplexing, Using Polarizing Eyeglasses PCT Publication WO97/26577, in the discussion of FIG. 5 therein, teaches a system for overcoming certain disadvantages presented by various systems for stereoscopic viewing using eyewear incorporating polarizing filters and/or shutter means. To relate to specific systems currently being sold as examples of the problem to be solved, we here mention the "stereo modulator" systems currently sold by Nuvision Inc. and Stereographics Inc. which provides images which flicker somewhat, and the "uPol" system sold by Vrex Inc., which provides images of low resolution.

In FIG. 5 of U.S. Pat. No. 5,822,117 and PCT Publication WO97/26577 an approach is presented combining techniques similar to those used in the stereo modular systems, with techniques similar to those used in the uPol system, to produce a display system which would have full resolution and a substantially reduced impression of flickering. The reader is referred to columns 24 and 25 of U.S. Pat. No. 5,822,117 for that discussion.

Figure 13:
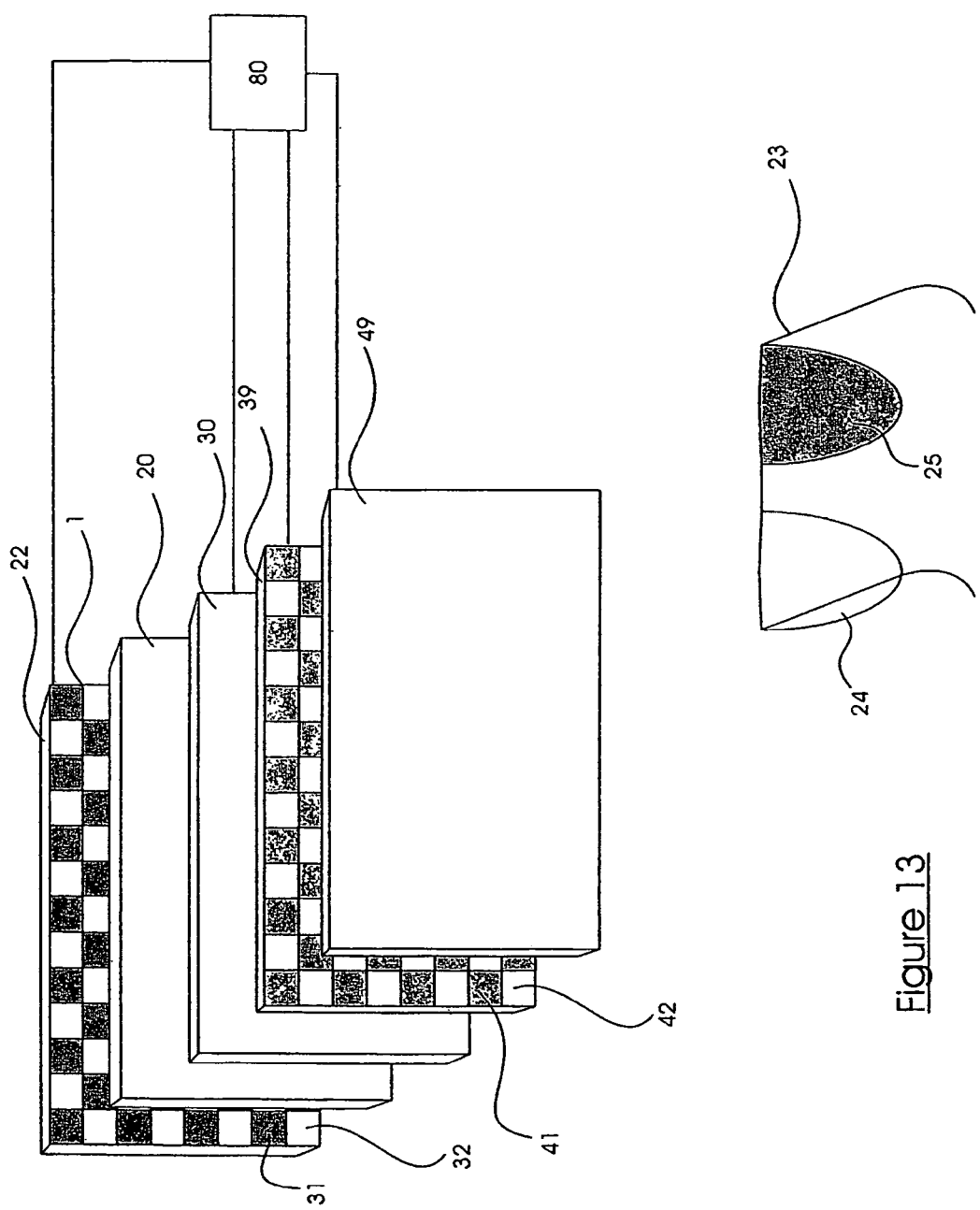
FIG. 13 is a perspective view of a system according to the present invention for reducing flicker by combining stereo modulator systems with spatial multiplexing, using polarizing eyeglasses.

FIG. 13, here, presents an alternative approach for constructing an apparatus which is similar in form and identical in purpose to that of FIG. 5 in PCT Publication WO97/26577.

At a time T1 a first image (either left or right image) is presented in subregions 31 of display 1, and a second image (either right or left image, correspondingly) is presented by subregions 32 of display 1. Polarizing filter 20 polarizes all light from display 1 uniformly. 30 is a "switcher" layer of switchable light rotating means. 39 is a layer including areas 41 active in light rotation, and areas 42 inactive in light rotation. Areas 41 of layer 39 are placed so as to be near to subregions 31 of display 1 and to correspond to them in size and position, and areas 42 of layer 39 are similarly sized and placed with respect to subregions 32 of display 1.

23 is a set of eyeglasses where one eyepiece 24 consists of a polarizing filter in some orientation, and eyepiece 25 consists of a polarizing orientation orthogonal to that of eyepiece 24. The orientations of the eyepieces are chosen in such a way that when switcher layer 30 is inactive in light rotation, light from subregions 31 passing polarized by layer 20, unaffected by switcher layer 30 and turned by areas 41 of layer 39 is visible only to a first eye and blocked from the second eye, while light from subareas 32, polarized by layer 20, unaffected by switcher 30 and not turned by areas 42 is visible only to the second eye and is blocked from the first eye.

At time T1, then, light from the first image will be visible only to a first eye, and light from the second image will be visible only to the second eye.

At time T2 switcher layer 39 is activated in light rotation, and the second image is presented in subregions 31 and the first image is presented in subregions 32. Since the polarization of the images is reversed by switcher 30, the first eye now sees light from subregions 32 instead of that from subregions 31, and the second eye sees light from subregions 31 instead of that from subregions 32.

Consequently, at both time T1 and time T2, the first eye sees light only from the first image, and the second eye sees light only from the second image. Yet at time T1 the first image is presented in subregions 31 and at time T2 it is presented in subregions 32, whereas at time T1 the second image is presented in regions 32 and at time T2 it is presented in regions 31.

As a result, each eye sees only its intended image at all times, yet the amount of light reaching a particular eye at time T1 is substantially similar to the amount reaching it at time T2. This result substantially reduces the impression of flickering, as contrasted to a system such as the "stereo modulator" systems in which at any given time one eye sees the entire screen and the other eye sees nothing. Moreover this system has an advantage over systems such as the uPol system, in that whereas at any given moment each eye sees only half the display surface (as is the case with the uPol system), yet over time each eye sees its appropriate image over substantially all the surface of the screen, which fact (due to persistence of vision) creates an impression of a more high-resolution, continuous image.

In an alternative construction, layers 30 and 39 may be combined: if layer 39 is e.g., an LCD element which has individually addressable areas whose activity/inactivity in light rotation can be individually switched, then the function of layers 30 and 39 are combined in a single layer.

In yet another alternative construction, a switcher layer 49 may be used in the place of switcher layer 30, to similar effect.

Stereoscopic Apparatus Using a Liquid Crystal Array

Figure 14:
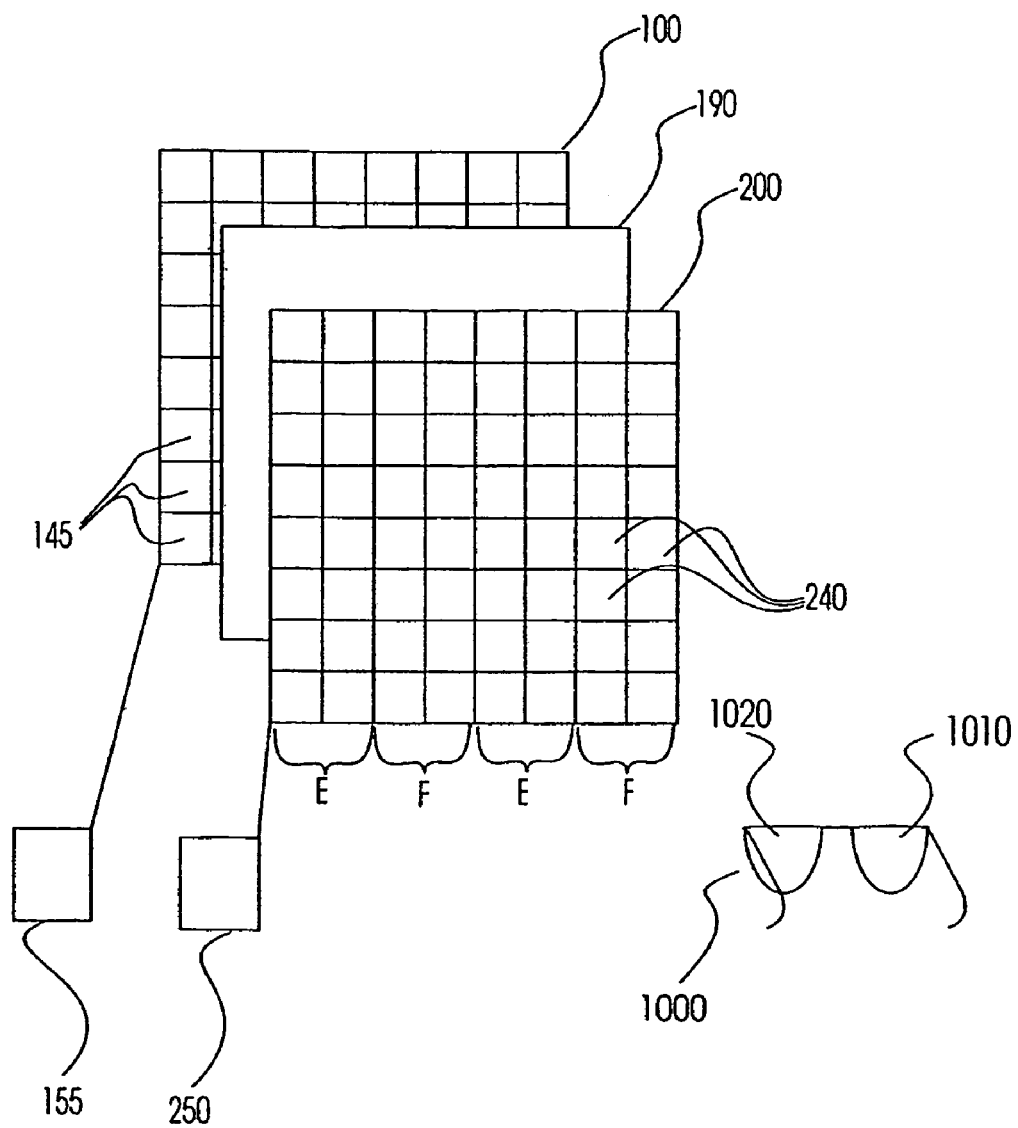
FIGS. 14 and 15 are perspective views of systems according to the present invention employing a liquid crystal array for full-resolution no-flicker stereoscopic viewing.

Yet another method for displaying stereoscopic images according to the present invention is described in context of FIGS. 14 and 15.

In the following text, subregions of the display are generally referred to as "pixels," but by use of the word "pixels" no limitation is implied regarding the size or nature of the subregions.

In particular, a subregion of the display may be further subdivided into individual color elements (as is the case, for example, in an RGB display). Individual color elements (e.g., red) of what are customarily referred to as "pixels" are also included in the definition of "pixel" as used in the descriptions of this embodiment of the invention.

In this context one notes that the effect of light rotating means such as liquid crystals is somewhat dependent on the wavelength of the light being rotated. In applications of the current system in which light from individual color elements (e.g., of an RGB display) are individually controlled, one notes that control of the degree of rotation of the individual colors (e.g., control of the voltages applied to the liquid crystal elements rotating light of particular colors) can take into account the relationship between the wavelength of the light being rotated and the degree of rotation desired. That is, in a system, for example, where red elements, blue elements, and green elements are desired to be rotated 30 degrees, the particular voltages applied to the liquid crystals controlling each color could be somewhat different, so as to compensate for the fact that under a given same voltage some wavelengths would rotate more than others.

Element 100 in FIG. 14 is a display source capable of producing an image. A CRT picture tube, a liquid crystal display, or any other source may supply the image of element 100.

In some implementations, an LCD display for example, element 100 is physically divided into subregions 145 (sometimes referred to hereinafter as "cells", or "pixels"). In some implementations (a CRT computer monitor for example), division into pixels may be a matter of areas of control as exercised by computing and control means 155, rather than a physical division of the display hardware itself. In yet other implementations (an analog device such as a standard broadcast television receiver for example), there may be no physical division into pixels. Nevertheless it will be convenient in the following exposition to refer to "pixels" 145, which may be thought of either as physical subdivisions of the display device, or else as relatively small subregions of the display device corresponding to small subareas of the displayed images, each such subarea being of known dimensions and position.

Note that if element 100 is a CRT or other display hardware not physically divided into subregions 145, there may be a need for a mechanism which ensures that each subarea is indeed of known dimensions and position, so as to enable coordinating operation between subregions of element 100 and subregions of element 200 described below. In the context of a CRT display this may be accomplished, for example, using an electronic feedback system such as was described above in the discussion of FIG. 3, discussing a feed-back device 83 feeding information to a control element 80, used to control and stabilize the position and size of the display. Another example of a method for accomplishing this would be to use available information about predictable systematic changes in the display (for example, systematic changes in the size of the displayed image on some CRT displays as a function of the amount of light displayed in the image) to compensate in advance for expected changes in the display. Alternatively, information about changes in the size or placement of picture elements on the display, whether from predictions based on known systematic changes or from observation using a feedback device, can be used to control the functioning not of display 100, but rather that of other elements of the apparatus, in particular that of subregions of element 200, whose function is described below.

Element 200 is an optical-element capable of rotating light, such as a birefringent layer with individually switchable elements. Each local area 240 of element 200 is capable of rotating light in varying degrees under electronic control, or of switching on and off their rotating effect under electronic control, or both. Local areas 240 are also sometimes called "cells" in the following. The signals controlling cells 240 of element 200 are provided by control and computational means 250.

Although FIG. 14 shows element 200 as being somewhat distanced from element 100, this is for clarity of the drawing only; in practice, element 200 will be close to, or contiguous to, element 100. Moreover each individual pixel 145 of element 100 is used in conjunction with a cell 240 of element 200; consequently they are to be of similar size and placement. In particular, the placement should be such that substantially most or all of the light emanating from a pixel 145 will pass through the corresponding cell 240 on its way towards the eyes of the viewer. In the preferred implementation, dimensions of the light emitting (or light transmitting) cells 145 may be made slightly smaller than the dimensions of the corresponding light-rotating cells 240, so as to ensure that substantially all the light from each cell 145 will enter the corresponding cells 240, even when the apparatus is viewed at an angle.

The following notation is used: if (a,b) designates the position of a cell in a two-dimensional array of cells, then $145_{a,b}$ designates the pixel from element 100 at (a,b), and $240_{a,b}$ designates the cell from element 200 which receives and transmits the light from $145_{a,b}$.

A left image and a right image are to be displayed by the apparatus, and it is assumed that the images can be expressed as an array of pixels whose dimensions correspond to the dimensions of the array of pixels 145 constituting element 100. As already mentioned herein, an actual division of the images into such pixels is not a requirement of the invention; the pixels are being referred to here merely as a means of expressing the relationships of intensities of light from various sources in small local regions, and their disposition.

The intensity of light of the left image at (a,b) is referred to as $L_{a,b}$, and the intensity of light of the right image at that point as $R_{a,b}$. The reader is reminded that the pixel $145_{a,b}$ may refer to a single color element within an RGB triplet. The sum of those intensities is $S_{a,b} = L_{a,b} + R_{a,b}$ In operation, the left and right images are combined into what is referred to herein as a CI (Combined Intensities) image, and that image is displayed by element 100.

The CI image combines the intensities of the left image and of the right image. That is, the intensity of the light emanating from any particular pixel $145_{a,b}$ is a function of the intensity $L_{a,b}$ of the light from the corresponding pixel of the left image and the intensity $R_{a,b}$ of the light from the corresponding pixel of the right image. Depending on the method used in element 200, the mathematical function ("$f_1$") that expresses the combined intensity may be the sum of the component intensities, the square root of the sum of the squares of the component intensities, or some other function.

Between element 100 and element 200 is an optional polarizing layer 190. If the light emanating from element 100 is already polarized (as would be the case for example if element 100 were an LCD display), then layer 190 is unnecessary. If the light emanating from element 100 is not polarized (as would be the case for example if element 100 were a CRT display), then layer 190 polarizes that light uniformly. In either case the light that reaches element 200 is uniformly polarized. Layer 190, when required, is referred to in the claims as a part of the display itself.

Element 200 has the task of re-dividing the light from pixels 145 back into the original left and right images where the new left image is substantially similar to the original left image, and the new right image is substantially similar to the original right image. Each cell of element 200 does this by partially rotating the light which passes through it, or by rotating the light during some portion of a time period T and not rotating the light during another portion of time period T (where time period T will typically be short enough to avoid producing an impression of flickering), or by rotating the light passing through some portion of the cell, or by a combination of these methods, or by some similar method.

Element 200 might, for example, be a standard LCD of the sort often used to produce notebook computer displays. Such an LCD is typically used in notebook computer displays together with a pair of polarizing filters, one before it and one after it, and the resulting configuration can display varying levels of light intensity ("grayscale") by rotating light to a selected degree or for selected durations.

Element 200 in FIG. 14 might be the same sort of LCD as is used in notebook computer displays and operate in similar manner with respect to its input signals, yet it is here used unaccompanied by the polarizing filters which usually accompany such an LCD in a notebook computer display. If, then, element 200 is provided with signals constituting an image, each cell 240 of element 200 can respond just as it does in the context of the notebook computer display responding to "grayscale" input, by rotating light to various degrees, between some minimum, and some maximum which is typically 90 degrees more than the minimum.

If the "grayscale" signal provided to cell $240_{a,b}$ is appropriately chosen, then the amount of light rotated into a selected orientation, A, can be proportional to $L_{a,b}$, and the amount of light unrotated, or rotated into a selected orientation, B, 90 degrees from A, can be proportional to $R_{a,b}$. Since what is herein described with respect to a particular pixel (a,b) can be true of all pixels, the overall effect is to construct a new left image in polarization orientation A, and a new right image in a polarization orientation B orthogonal to A.

As an aid to understanding, this principle may be restated as follows:

As mentioned above, each subregion 145 of element 100 displays a pixel whose intensity is a function ($f_1$) of the intensities of pixels in corresponding positions from the first image and from the second image. Each cell $240_{a,b}$ of element 200 receives a signal $G_{a,b}$ which also depends on $L_{a,b}$ and $R_{a,b}$, and that signal determines the amount and the manner in which light is to be rotated by cell $240_{a,b}$.

Signal $G_{a,b}$ is such that it causes the light from each pixel $145_{a,b}$ to be rotated in such a degree and at such times that, when averaged over a relatively short time period T, the intensity of the component of the light passed by $240_{a,b}$ in an orientation A is substantially proportional to $L_{a,b}/S_{a,b}$, and the intensity of the component of the light passed by $240_{a,b}$ in an orientation B is substantially proportional to $R_{a,b}/S_{a,b}$, where A is oriented substantially 90 degrees from B.

The signals $G_{a,b}$, over all elements 240 of element 200, constitute a kind of image, which we will refer to as the "Discriminating Intensities" image, or "DI".

In a first version of this embodiment, element 200, under control of the DI image, separates the Combined intentions Intensities image CI into reconstituted components which are similar to the original left image and original right image, where the new left image is emitted in a polarization orientation A and the new right image in a polarization orientation B, 90 degrees from A. If the viewer then wears polarizing eyeglasses 1000 which allow substantially only light of orientation A to reach his left eye and substantially only light of orientation B to reach his right eye, then each eye sees its appropriate image and stereoscopic viewing results.

In another version of this embodiment of the present invention, the DI image can be modified so as to express the reconstituted image in the format of Rehorn's "image B", which can then be used to produce an autostereoscopic system, as is described below.

FIG. 15 illustrates the methods of this embodiment in greater detail, by way of a specific example. In FIG. 15 element 100 is exemplified as a liquid crystal computer display including of a light source 110, a uniform polarizing filter 120, a liquid crystal 130 which is a birefringent layer with individually switchable elements 145, and an additional uniform polarizing filter 70.

It is further assumed in this example that cells 240 of element 200 divide the light passing there through by the simple expedient of rotating that light 90 degrees during some portion of a time period T, and not rotating it during the remainder of the time period T. Note however that these assumptions are chosen for purposes of illustration only, and the scope of the invention should not be limited to these exemplary choices.

Under these assumptions, operation of the system is as follows: for each physical pixel 145 at position (a,b), computing means 155 would calculate the CI image picture element as the sum ($L_{a,b}+R_{a,b}$), that is, by adding the intensity of the corresponding left image picture element at point (a,b) of the image to the intensity of the right image picture element at point (a,b) of the image. Of course, these values might be multiplied by some constant factor to avoid expressions of intensity greater than 100% of what the display hardware is equipped to display.

Computing means 250, which can also be the same physical computer as computing means 155, calculates the corresponding pixel of the DI image, which might be ($L_{a,b}/S_{a,b}$), that is the ratio of the intensity of the left image picture element at point (a,b) to intensity of the Combined Image picture element CI (a,b) at point (a,b), since under the assumptions the CI image picture element intensity is simply the sum of the left and right image picture elements' intensities at that point.

For each pixel 145, element 100 emits light corresponding in intensity to the CI image at that point. This light enters the corresponding cell 240 of element 200. Although for clarity of exposition FIG. 15 has shown elements 100 and 200 as being somewhat separated, actual construction would place them contiguous or nearly contiguous to each other, so that substantially all of the light emanating from pixel $145_{a,b}$ of element 100 would enter cell $240_{a,b}$ of element 200.

Under these assumptions, the light from each cell 145 enters the corresponding cell 240 which, under control of computing and control element 250, rotates it during some portion of time period T, which portion depends on the relative intensities of the pixels from the left and right images at that point. For example if, say, 100% of the light of CI at position (a,b) comes from the left image, then cell $240_{a,b}$ rotates the light 100% of period T, whereas if only 20% of the light of CI was due to the left image, then the cell $240_{a,b}$ rotates light only 20% of time period T. Of course, the directions could be reversed, so that a CI pixel 20% of whose intensity was due to the corresponding pixel from the left image might be rotated 80% of the time, and left unrotated 20% of the time.

The result for each cell $240_{a,b}$ is that an amount of light proportional to $L_{a,b}$, the pixel intensity of the left image, would be rotated into polarization orientation A, and an amount of light proportional to $R_{a,b}$, the pixel intensity of the right image, would be unrotated, and remain in polarization orientation B. Since for each pixel the intensity of the light which is divided is the sum of the intensities $L_{a,b}$ and $R_{a,b}$, it is clear that the effect, over all the pixels of element 200, is that the left image now being created is substantially similar to the original left image, and is rotated into orientation A, and the right image now being created is substantially similar to the original right image, and is transmitted in orientation B.

Note that the choice of which image is to be rotated is entirely arbitrary. If the rotated image is everywhere chosen to be the left image and the unrotated image is everywhere chosen to be a right image, and if a viewer uses polarizing eyeglasses 1000 with a filter 1020 in orientation A on his left eye and a filter 1010 in orientation B on his right eye, then stereoscopic vision of the images will result. Similarly, the right image might be rotated and the left image unrotated, and the eyeglass filters adjusted accordingly.

The details above are provided by way of example and are not intended to limit the scope of the present invention. It will be clear to one ordinarily skilled in the art that the arrangement described above can easily be modified to emit circularly polarized light, which the viewer would view using eyeglasses which analyze circularly polarized light, to similar effect.

It will also be clear that for "rotated" and "unrotated" we might substitute "rotated to degree N" and "rotated to degree N+90", and further that, as stated above, partial rotation by cells 240 (for example by application to the Kerr cell $240_{a,b}$ of a voltage which may be less than that required to create a 90-degree difference with the relaxed state) might be substituted for time-sharing of the Kerr cell $240_{a,b}$ as described above. Note that in this case, the intensity of the combined image picture element, $CI_{a,b}$ would be the square root of (($L_{a,b})^2+(R_{a,b})^2$) and the angle of rotation a for the pixel would be chosen with respect to the axes of orientation of the polarizers such that ($CI_{a,b}(\sin(\alpha))$) would equal Lab and ($CI_{a,b}(\cos(\alpha))$) would equal $R_{a,b}$. (These formulae of course neglect incidental light losses, etc. The essential feature is that the ratio ($L_{a,b}/R_{a,b}$) be equal to the ratio ($\sin(\alpha)/\cos(\alpha)$).

It is further clear that, in operation, the optimal means for sharing the light of a given pixel between two images might involve manipulating both the timing of the switching of the Kerr cell $240_{a,b}$ and also its voltage, and would further take into account such factors as the time delays involved in the switching operation itself, the behavior of the cell during the time of the switching, and so on. In general, the invention contemplates any method for dividing the light between the two images in such a manner that, when the transmitted light is viewed through polarizing filters such as 1010 and 1020, the pixel elements transmitted by the apparatus are similar to the pixel elements of the original left and right images and the new left and the new right images are displayed in differing polarization orientations.

It is further clear that the computing means 155 and 250 referred to above need not be physically contiguous to the rest of the apparatus. It would be possible, for example, to have computing means 155 and 250 make the requisite calculations to transform a left and a right image into the CI and DI images at a remote site, and then broadcast or otherwise transmit the CI and DI images to an apparatus which would display them, an element 100 displaying the CI image as transmitted, and an element 200 'displaying' the DI image as transmitted, with effects as described above.

The arrangement described above can further be used to produce an autostereoscopic display.

This can be done simply by modifying the choice of rotated and unrotated images across the face of element 200 in such a manner that Rehorn's "image B" results. As shown in FIG. 15, one might, for example, alternate areas E and areas F across the face of element 200, where in areas E the left image is rotated and the right image unrotated, and in areas F the right image is rotated and the left image unrotated. Since the selection and placement of areas E and F is under electronic control of computing and control element 250, they may be placed on element 200, resized, and moved, in any manner convenient to the overall operation of the apparatus. In particular, their dimensions and positions can be modified in real time according to the distance and the position of the viewer or viewers, in order to conform to the requirements of the head-tracking systems described elsewhere in this document and in PCT Publication WO97/26577.

In other words, the apparatus pictured in FIGS. 14 and 15 can be taken as a whole to be the display apparatus referred to as "display layer 500" in FIG. 7 which is described hereinabove, where areas "E" and "F" of FIGS. 14 and 15 correspond to areas 510 and 520 of FIG. 7 respectively.

An alternate arrangement for accomplishing stereoscopic display is to use the apparatus pictured in FIG. 14 in the context of a projection system. An arrangement such as that described in FIG. 14 may be used in the place of the liquid crystal plus polarizers used in liquid crystal based projection systems. For example, the arrangement of FIG. 14 could be used in the place of the liquid crystal "projection panels" sometimes used together with ordinary overhead projectors which normally project transparencies. Similarly, a combination of layers 100 and 200 as described in FIG. 14 could be used in the place of the image-forming elements used in today's liquid-crystal-based projection systems. In both cases layers 100 and 200 are used as described above, layer 100 creating the CI image and layer 200 modifying it according to the DI image. The result would be projected, and the projected image would include the left and right images substantially recreated, and in different polarization orientations.

If that projected image is projected onto a non-depolarizing projection screen, for example an aluminized screen, then a viewer using polarizing glasses can observe the projected stereoscopic image.

If on the other hand the projected image is divided as described above, with alternating areas E and F across the face of the image, and that image is projected onto the back face of a translucent material suitable for a back projection system, which material also has the ability to preserve the polarization orientation of the light projected on it, then the image visible on the front face of that material would constitute Rehorn's "image B". Such a projected image would meet the definition of layer 500 of FIG. 7. The projection system here described, together with an arrangement such as is described by FIG. 7, would then constitute an autostereoscopic back-projection system.

Thus, the present embodiment, when combined with the various methods described above and in PCT Publication WO97/26577 for utilizing Rehorn's "image B" in autostereoscopic systems, will have all the advantages described above for the use of such systems (e.g., full resolution without flicker), plus the additional advantage that the apparatus itself will be relatively flat and relatively simple, and thus constitute an attractive and convenient autostereoscopic display system.

In the above paragraphs and in FIGS. 14 and 15 it is described how an arrangement of polarizing elements and birefringent layers with individually switchable elements can be used to constitute both an autostereoscopic system which does not require eyeglasses and a stereoscopic display system which does use polarizing eyeglasses, and the advantages of the system both for stereoscopic and for autostereoscopic display were pointed out.

It would clearly be further advantageous for a single system to be able to present both the stereoscopic and the autostereoscopic displays in alternative use. For example, the same apparatus can be used to provide autostereoscopic display to a single user (or to several users, utilizing techniques described in PCT Publication WO97/26577), yet when it was desired for multiple users to observe the display, the glasses-based stereoscopic mode might be used to advantage.

Two ways in which this can be accomplished are shown in FIG. 16, which includes elements 80, 85, 130, 140, and optional 150 and 160 from FIG. 7, and elements 100, optional 190, and 200 from FIG. 14 which serve to fill the role of display 500 of FIG. 7. That is, the arrangement described in context of FIGS. 14 and 15 produces an image with the characteristics described by Rehorn as "image B", and the discussion of FIG. 7 explains how that image can then be viewed in autostereoscopic viewing, with the various advantages of the various systems described above.

FIG. 16 shows alternative configurations which allow the system to be used for stereoscopic viewing with eyeglasses, for autostereoscopic viewing without glasses, or both.

For viewing with glasses, as described above, the distribution of images on layer 200 is effected such that viewers with glasses 1000 can see the new (redivided) left image with the left eye and the new (redivided) right image with the right eye. Layers 140 and optional 160, however, are polarizing layers, and would interfere with the process of viewing with glasses 1000. Consequently a system designed exclusively for viewing with glasses would use layers 100, possibly 190, use 200, use glasses 1000, and not require layers 130, 140, 150, nor 160.

If it is desired to make a system which can function in both modes, one possible arrangement is to construct the apparatus in such a way that layer 140, and optional layers 150 and 160 if present, are removable. Note that if layers 150 and 160 are not in use, then the only layer which needs be removed for viewing with glasses is layer 140, which is a unified polarizer with no electronic connections to the system, consequently an arrangement which contemplates frequently installing it and removing it is not impractical. Layer 130, which is not required for glasses viewing, will nevertheless not hinder glasses viewing if it is inactivated in light rotation. In other words, while layer 140 must be removed, the light turning activity of layer 130 can simply be turned off.

Nevertheless, it can be further advantageous to have a system which requires no gross physical change, such as physically removing layers, when converting from glasses viewing to autostereoscopic viewing. Such an arrangement is presented by the addition of layer 165, which is an additional liquid crystal layer, a birefringent layer with individually switchable elements, similar to layer 200.

In operation as a display for glasses viewing, layers 200, 130, and 150 are either inactive in light rotation, or activated in such a way as to transmit the CI image through to layer 165 substantially unchanged, or changed in a uniform manner which does not destroy the CI image. Layer 165 is then used as described in the discussion of layer 200 above (that is, layer 165 is used as if it were layer 200), and the viewer can use glasses 1000 to view the stereoscopic image.

To use same arrangement for autostereoscopic viewing, all that needs to be done is to switch layer 165 to be inactivated in light rotation; this done, the apparatus functions as described above for autostereoscopic viewing, and layer 165 does not substantially influence the process.

One further advantage of the system may be noted: if display 100 displays a single image (rather than a left and a right image), all the switching layers (200, 130, 150, 165) are inactivated, or activated only as required to allow light best to pass the polarizing layers (190, 140, 160), then the apparatus can be used to display normal non-stereoscopic images as well.

Thus herein described is an apparatus which provides a glasses-based stereoscopic display with the advantages of full resolution, no flicker, and not requiring particularly fast switching liquid crystals, and which also provides an autostereoscopic display with the advantages of full resolution, no flickering, head-tracking both sideways and with respect to depth and which can compensate for some degree of head tilting and which can be constructed as a flat screen, and which further provides the advantage of converting between glasses-based viewing and autostereoscopic viewing by electronic switching and without moving parts, and which has the further advantage of being able to display normal non-stereoscopic images.

Another embodiment of this system is now described, having substantially the same functionality as that of the versions described above, but having the advantage of being in some respects easier to manufacture.

One possible disadvantage of the system described above is that it may be difficult to construct from readily available parts. Referring again to FIGS. 14 and 15, the system requires an array 200 of liquid crystal cells 240, each individually controllable, and each cell physically very close to, and exactly registered with, a physical pixel or with a picture element 145 from display 100. Cells 240 must be close to pixels 145 because substantially most or all of the light from each pixel $145_{a,b}$ must enter a cell $240_{a,b}$. If cells 145 and 240 are contiguous this is easily accomplished. If they are distant from each other, then the difference in the angular direction of the lines of sight from the left eye to a pixel $145_{a,b}$ and from the right eye to the same pixel $145_{a,b}$ would prevent both eyes from viewing pixel $145_{a,b}$ through the same cell 240.

To manufacture systems in which array 200 is contiguous to display 100 would require techniques not in popular use today, and tooling up for such a manufacturing process might be expensive. In any case, the requirement that the arrays be contiguous or immediately close to each other makes it difficult or impossible to manufacture the system using currently available off-the-shelf components.

Modifications of the system are now described, which address this problem.

For the first modification assume that there will be some non-negligible distance between the surface of display 100 and layer 200. If this is the case, line-of-sight between the left eye and a given pixel $145_q$ on display 100 will pass through some cell $240_q$ on layer 200, while the line-of-sight from the right eye to the same pixel $145_q$ will pass through a different cell $240_r$ of layer 200. For the same reason, the line-of-sight from the right eye through cell $240_r$ arrives at $145_q$ but the line-of-sight from the left eye through $240_r$ will reach some other pixel $145_s$ of display 100. One solution then is to use the head-tracking sensor 85 and control element 80 (shown in FIG. 16) to calculate the angular direction from each pixel to each of the eyes, and to calculate the CI and DI intensities of each pixel in such a way as to compensate for the displacements and arrive nonetheless at the desired results.

This solution, however, requires extremely accurate head-tracking and suffers from the problem that at certain positions of the eyes, several pixels 145 might be visible through portions of a given cell 240. Consequently a preferred implementation would avoid this problem, while yet not requiring actual contiguity of display 100 and layer 200.

Figure 17:
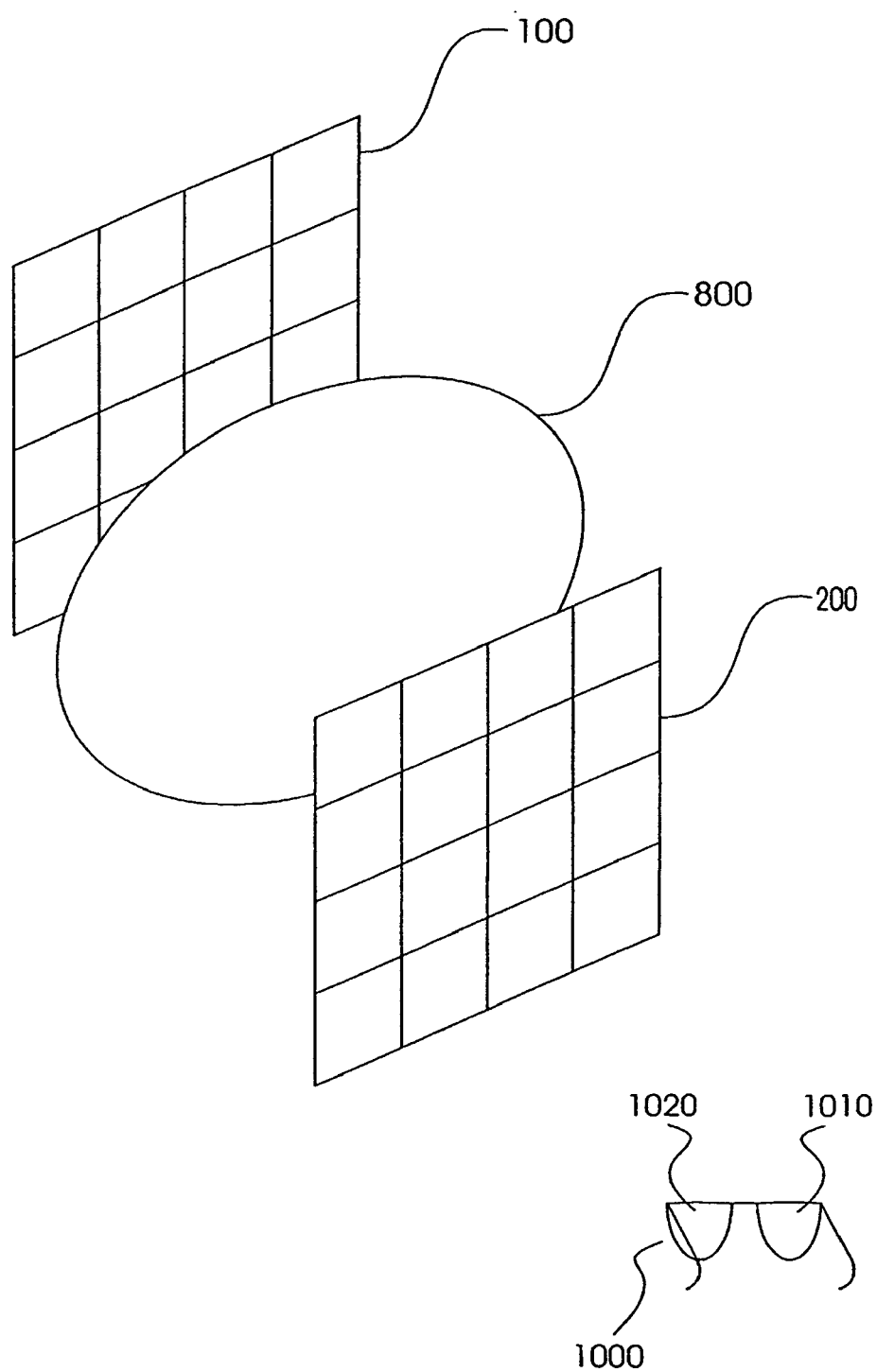
FIG. 17 is a perspective view of optional systems according to the present invention employing a liquid crystal array and a lens element for stereoscopic viewing, autostereoscopic viewing and/or normal (non-stereoscopic) viewing.

FIG. 17 describes such an implementation. This embodiment essentially preserves the relationships described above between pixels $145_{a,b}$ and cells $240_{a,b}$, but rather than requiring that display 100 and layer 200 be contiguous, it solves the problem by interposing an optical element such as a lens or a plurality of lenses between display 100 and layer 200 in such manner that the CI image created by display 100 is focused on the plane of layer 200 and a substantial proportion of the light generated by each pixel of display 100 reaches an appropriate cell 240 of layer 200.

FIG. 17 shows a single lens 800 (or its equivalent in the form of a compound lens, or of a Fresnel lens, or other equivalent optical element) interposed between display 100 and layer 200. If the focal length of lens 800 is appropriately chosen and display 100 and layer 200 are appropriately placed, the CI image created by display 100 will be focused on layer 200. The image will of course be inversed, but a one-to-one relationship is preserved between pixels 145 and cells 240. If arrays 100 and 200 were n cells wide and m cells high, then pixel $145_{a,b}$ would be projected onto cell $240_{(n-a),(m-b)}$. Other than that, however, the general operation of the system would be as described above in the context of FIGS. 14, 15, and 16. Inversing the CI image on display 100, and handling cells $240_{(n-a),(m-b)}$ as described above for cells $240_{a,b}$ would bring about the results described above, yet permit a construction which does not require that display 100 and layer 200 be contiguous. For certain applications, a polarization-preserving dispersion layer (translucent screen) may be placed near layer 200, so as to widen the angle from which the apparatus may be viewed.

The configuration shown in FIG. 17 and described above might be particularly useful in the context of a liquid-crystal-based projection system, where a light source sends light through a polarizer, a liquid crystal array and a second polarizer (the combination constituting a display 100), the resultant image being focused by a lens 800 onto a second liquid crystal array 'displaying' the DI image, and the resultant image then being refocused by another lens or set of lenses onto a polarization-preserving reflective screen such as an aluminized screen, where it could be viewed using polarizing glasses, or onto a polarization-preserving back-projection screen, where it could be viewed using either polarizing glasses or using the autostereoscopic methods discussed above.

A modification of the idea shown in FIG. 17 is to use techniques similar to those used in the manufacture of lenticular stereoscopic displays to provide a lens for each pixel $145_{a,b}$ of display 100, which lens would focus the light from that pixel onto the appropriate cell $240_{a,b}$ of layer 200. Here again, elements 100 and 200 would no longer be required to be contiguous, most of the light from each pixel 145 would reach the appropriate cell 240 of layer 200, and the apparatus (in the various versions described above) would function as previously described. Of course, it would also be possible to combine this version and the previous one, by putting a multiplicity of lenses 800, but not necessarily one per pixel, between display 100 and layer 200, and dealing with inversed images wherever appropriate.

A similar technique to accomplish the same purpose is to use an array of micro-lenses to concentrate the light from a back-lighting source through the central areas of each cell of a liquid crystal array. This technique has been used in other contexts (e.g., to widen the angle from which an LCD can be viewed and increase the light efficiency). Concentrating the light in this manner would cause substantially most of the light passing through pixels of a first liquid crystal array to reach the corresponding pixels of a second array. Placing the micro-lenses before the first array rather than between the arrays might simplify construction, while accomplishing the same purpose.

Figure 18:
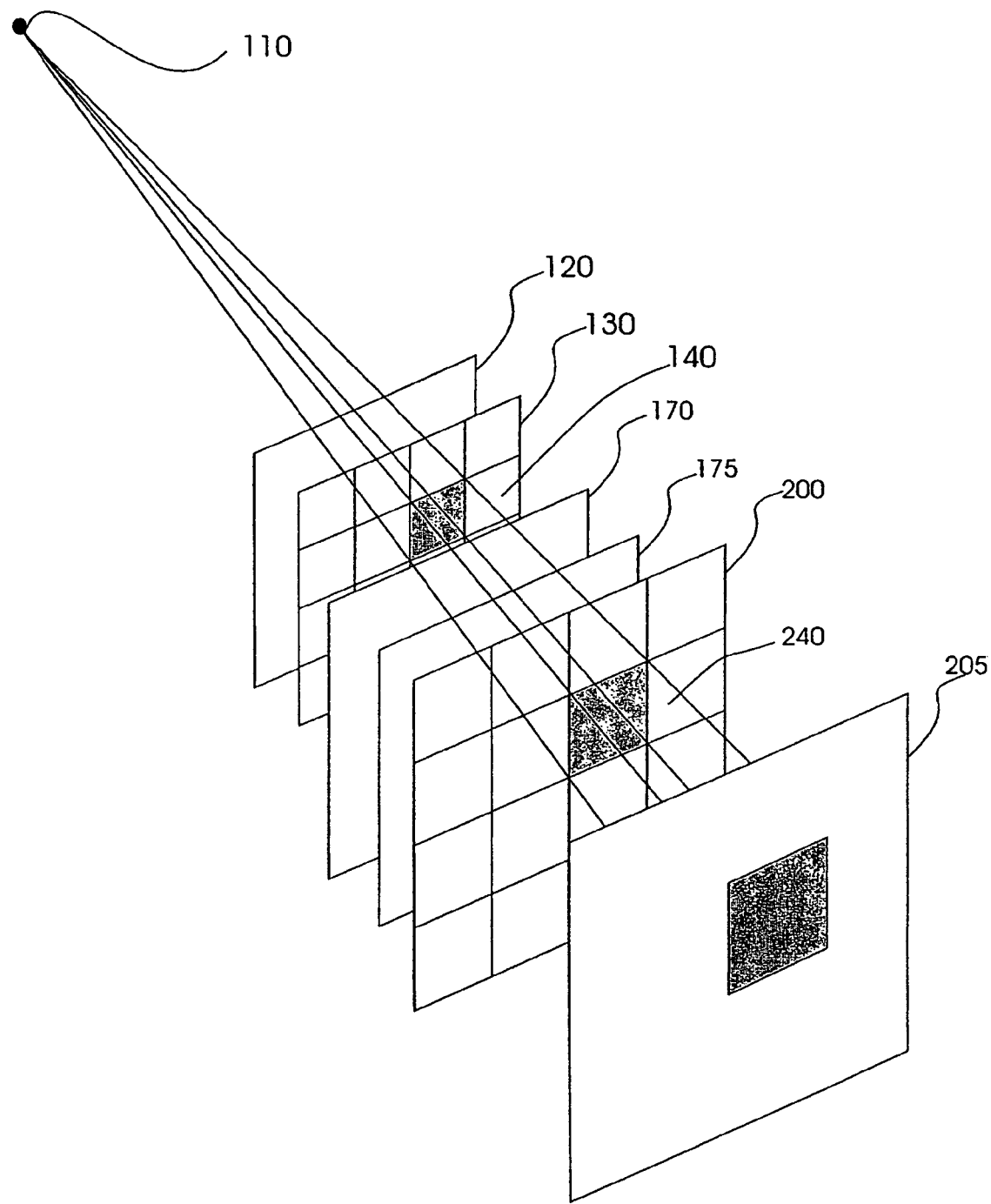
FIG. 18 is a perspective view of optional systems according to the present invention employing a liquid crystal array and a rear light source characterized by homogeneous rather than heterogeneous and diffuse light rays for stereoscopic viewing, autostereoscopic viewing and/or normal (non-stereoscopic) viewing.

Another method allowing the apparatus to be constructed without layers 100 and 200 being contiguous is demonstrated by FIG. 18. Elements in FIG. 18 with numbers appearing in FIG. 15 have the same meaning and function in FIG. 18 as they have in FIG. 15.

The idea here is to provide a light source 110 such that the direction of the light rays emanating from it is homogeneous and organized rather than heterogeneous and diffuse, and to use this fact to cause the image (i.e., the shadow) of elements $145_{a,b}$ to fall on the appropriate cells $240_{a,b}$, for the reasons and with the effects described above.

One version is shown in FIG. 18, where light source 110 is a relatively small and intense source of light approximating a point source. The source might either emanate from a very small area approximating a point source, or else be focused in such a manner as to pass through a small area approximating a point source.

Light from source 110 is projected through polarizer 120, liquid crystal array 130, and polarizer 170, and reaches layer 200 in such manner that the light controlled by each pixel $145_{a,b}$ of layer 130 arrives at the appropriate cell $240_{a,b}$ of layer 200. Of course in this case the array of cells of layer 200 must be somewhat higher and wider than the array of layer 130, as shown in the Figure. Optional layers 175 and 205 are light defusing layers, one or another of which might be used (depending on the application) to break up the directionality of the light rays from source 110 and make the image visible from a variety of angles. If used, these layers must be selected so as to preserve the polarization orientation of the light while diffusing it. Thus, a material must be used which is similar to that required by the back-projection systems described above.

A similar solution depends on light source 110 being a source of collimated light. In this case, simply aligning same-sized arrays 130 and 200 appropriately would ensure that the projected image (i.e., the shadow) of each pixel $145_{a,b}$ would fall on the appropriate cell $240_{a,b}$.

Both in the embodiment of FIG. 17 and that of FIG. 18, the advantages of the system as described with respect to FIGS. 14, 15, and 16 are preserved, yet there is the additional advantage that display 100 and layer 200 may be placed at some distance from one another, providing for relative ease of construction and permitting construction of the system from more readily available components.

An additional element may be added to the systems just described. The problem to be solved in this case is that light from one liquid crystal cell and intended for the corresponding cell on the second liquid crystal may leak into a neighboring cell. Several solutions are proposed below to solve this problem.

If the first (display) layer is an LCD with a color mask, as is characterizing most LCD displays which have a built-in RGB color mask, then the second layer can also have an RGB color mask. Since it would be filtering the same colored light twice, the loss of correct light (e.g., red light from the first layer passing through the appropriate red-filtered cell of the second layer) would be minimal. The advantage is that light from adjoining cells will (typically in the horizontal direction) be of a different color (the sub-pixel cell next to a red sub-pixel cell will typically be green on one side and blue on the other). So, the use of a color filter on the second layer as well as on the first layer will prevent leakage of light from adjoining cells, at least in one (typically the horizontal) direction.

Another method to avoid leakage is to polarize the light emanating from the first (display) layer in stripes (if used together with a color filter as above) or in a checkerboard pattern (if color filtering not used), and to filter the light in a similar pattern as it passes into the second layer. In this manner, light passing from a display cell to the appropriate cell of the second layer will have the same orientation, and will pass, whereas light from cells adjoining the appropriate source cell will have opposite orientations, and will not pass. Note that if the display is an LCD, the light will already be uniformly polarized, so to produce a striped or checkerboard pattern one would interpose not a polarizing filter, but an element which is birefringent (in a striped or checkerboard pattern), so the result would be to turn the light in certain areas and not turn the light in adjacent areas. Of course, if this method of preventing leakage is used, the behavior of each cell 240 of layer 200 would need to be adjusted so that it will output light of the correct orientation (as described above) despite this possible modification of the orientation of the cell's input light.

Color Barrier System for Autostereoscopic Viewing

PCT Publication WO97/26577 described (in FIGS. 40 and 41 and with respect to various other Figures) the use of a color filtration barrier in an autostereoscopic system. A system similar to that described therein, but with certain additional advantages, is described in the following sections. The term "color filtration systems" is used below as a general term to refer to the system described in PCT Publication WO97/26577 with respect to FIGS. 40 and 41 therein, and to the systems described herein which use an optical construction which includes a composite color filter to create autostereoscopic systems, as described in particular with reference to FIG. 11, and to similar systems. The term "composite color filter" is also used to refer to such systems.

FIG. 40 of PCT Publication WO97/26577 shows a situation in which a plurality of RGB triplets (1020) display at least a part of a left image, and these alternate a plurality of RGB triplets (1030) displaying at least a part of a right image. This arrangement is convenient to many types of displays, which display colors by showing combinations of primary colors combined in selected intensities. Moreover, many types of displays incorporate display pixels which actually consist of several distinct primary-color components, such as RGB triplets.

The system as described in PCT Publication WO97/26577 has the advantage of providing movement-permissiveness, yet requires less blocking of light than was called for by the approaches described in PCT Publication WO97/26577, e.g., in context of FIGS. 32 and 33a therein. Nevertheless, that system has the disadvantage that each of the images, as seen by each of the eyes, is discontinuous: adjacent to each image picture element there is a dark area of at least equal size, which provides no light from that eye's image. The image consequently appears to be of relatively low resolution and low quality.

Figure 11:
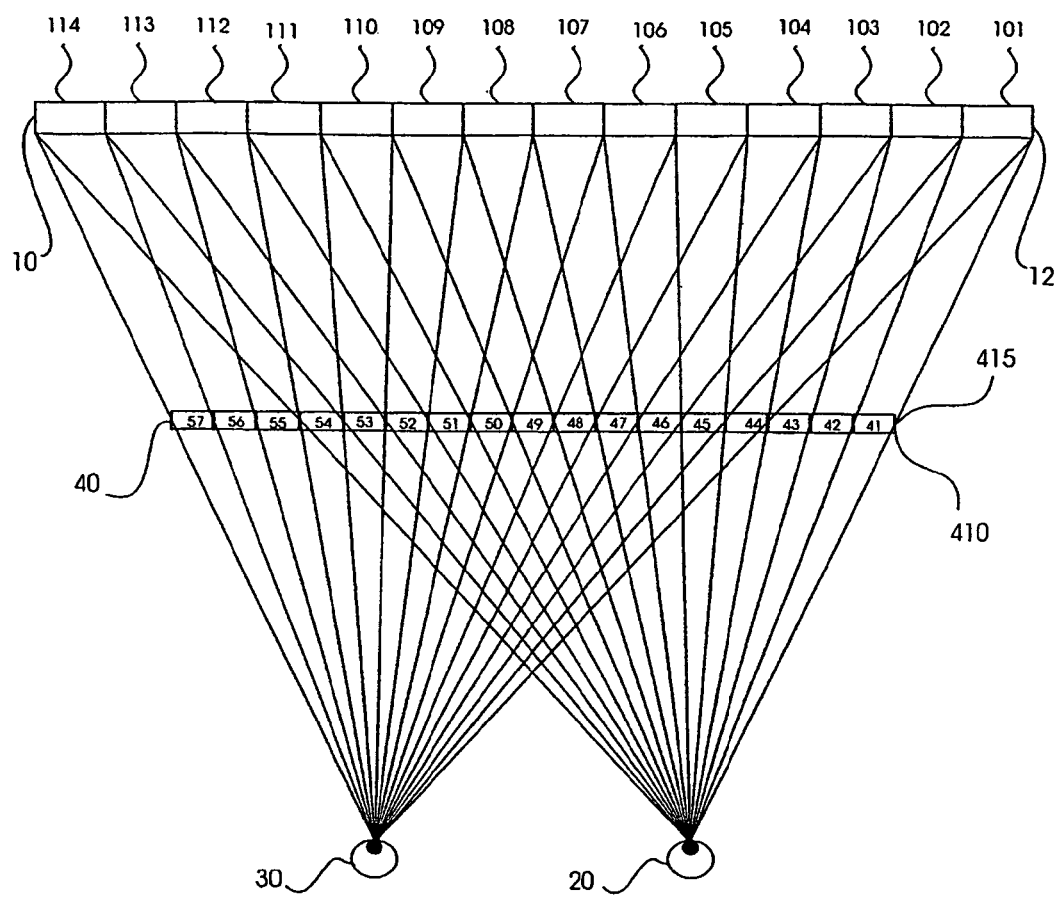
FIG. 11 is a top view showing several embodiments of a system according to the present invention which employs a dedicated color filter for effecting autostereoscopic viewing.

FIG. 11 provides an arrangement which avoids this disadvantage, and which is consequently superior for many applications. It is characterized by the fact that light from the two images is distributed over the display in such a way that small areas of the display surface present light from the left image in some color ranges, and also presenting light from the right image in some other color ranges. In this manner, light from both images is spread across the display in a more evenly distributed manner, thereby minimizing the size of, or eliminating entirely, the areas of the display which do not present some light from any given image.

The system described may be contrasted to the classical parallax barrier system in which transparent segments alternate with opaque blocking segments to form a barrier layer, and the blocking elements of the barrier layer line up in relation to the pixel elements of the display in such a way that the right eye sees pixels from the right image and the left eye sees pixels from the left image, in a manner well known in the art. The arrangement described by FIG. 11 uses a barrier technique in a novel way. In this embodiment the barrier does not include transparent areas alternating with opaque areas, but rather a layer 40 which combines two or more color barriers, each of which has areas blocking light of a particular spectral range alternating with areas transparent to that spectral range. When the light of various spectral ranges is distributed throughout the display as described above, and barriers to each spectral range are placed appropriately on layer 40, the result is that the visibility, to each of the eyes, of light from each color range, is controlled by a parallax barrier arrangement, yet light from the appropriate image from at least some part of the color spectrum is visible to each eye throughout the entire surface of the display.

FIG. 11 can be used to illustrate a number of embodiments of this idea. In the following paragraphs the embodiments are described in terms of the example of three-color displays, such as RGB displays, yet it should be understood that the specific example is for illustrative purposes only and that the invention is not limited to those particular colors, nor indeed to systems of three colors in particular. Equivalent implementations might be made with two, four, five, or more color ranges. Moreover, in the examples given in the following, elements which filter colors are discussed as if they were physically fixed. Elements of variable optical characteristics with respect to color filtration could be used as well, on condition that at any given time their behavior approximates that described in the following with respect to fixed color filtration systems. For example, elements which block the passage of light of certain color ranges when the light is polarized and in a particular polarization orientation, yet pass light of that color range when the light is of a different polarization orientation, could be used.

For the description of a first embodiment, the reader shall consider a case where display 10 is capable of displaying all colors from either image at all points. If then display 10 were to display light of a first color range (e.g., red) from part of a right image in areas 102–104 and 108–110, and light of that color range from part of a left image in areas 105–107 and 111–113, and if areas of 42–44, 48–50, and 54–56 of layer 40 are transparent to light of that first color range, while areas 45–47 and 51–53 of layer 40 block light of that color from traversing them, then insofar as light of that first color range is concerned the arrangement constitutes the classic parallax barrier system for autostereoscopy. Indeed, if all colors, rather than only the particular first range of color, were displayed, transmitted, and blocked in the aforementioned areas, then this would in fact be identical to the classical parallax barrier system.

Other color ranges are also displayed on display 10 and transmitted or blocked by portions of layer 40, but according to this embodiment the blocking areas on layer 40 which block the several color ranges do not everywhere coincide. Similarly, on the display, for the left image and for the right image, at least some areas of the display displaying at least a second color range will not display a first color range, and at least some areas of the display displaying the second color range will not display the first color range. In a simple example according to this principle, red light from display 10 might be blocked by certain areas of layer 40, and green light from display 10 might be blocked by certain areas of layer 40, and the positions of the red-blocking areas and of the green-blocking areas would be different, in at least some areas of layer 40. Moreover there will be areas of the display which display red light from, say, the left image, and do not display, say, green light from that image, though they may display green light from the right image.

In the preferred implementation, the arrangement would incorporate the greatest possible differences in the placement of the various color ranges on display 10. Thus for example in a three-color display, if light from the first color range is displayed as stated above, then light from a second color range (e.g., green) from the right image might be displayed in areas 104–106 and 110–112 and light from that color range from the left image might be displayed in areas 101–103, 107–109 and 113–115, while light from a third color range (e.g., blue) from the right image would be displayed in 106–108 and 112–114 and light of that color range from the left image would be displayed in 103–105 and 109–111.

Of course, on any part of layer 40 in which more than one color range is required to be blocked, then at that point either individual filters may be placed one behind another to achieve this effect, or else a single filter which is opaque to both color ranges could be used.

On barrier layer 40, for each of the color ranges, areas which are transparent to that color range alternate with areas which block that color range, the pattern being repeated along the width of layer 40. The placement of the specific areas with respect to each particular color range is such as to constitute the classical parallax barrier system with respect to that particular color range, as was illustrated above for the first color range. Thus, given the placement of colors from the two images as stated in the previous paragraph, areas 44–46, 50–52 and 56–58 would be transparent to light of the second color range and areas 4143, 47–49, and 53–55 would be opaque to that color range, and areas 46–48 and 52–54 would be transparent to light of the third color range, and areas 4345, 49–51, and 55–57 would be opaque to that range. The placement of blocking areas on layer 40 specified in this and in the preceding paragraph will be referred to in the following as "filter arrangement A".

Thus, with respect to each color range, layer 40 presents a parallax barrier, yet the barrier elements of the various color ranges are placed differently on layer 40. Consequently, while each eye sees all the light from the image appropriate to it and does not see any light from the image inappropriate to it, yet there are no "holes" in the picture, no area of the display which fails to display at least some light from both left and right images. Such a display will be called a "dense" display in the following.

Of course, the technique just described may be combined with a movement-permissive system as described above. That purpose might be accomplished in the manner described in PCT Publication WO97/26577 (see FIGS. 32–33a therein), by using opaque areas on layer 40, or areas which do not display light from either image on display 10. However a preferred implementation can be accomplished simply by reducing the width of each area of display 10 displaying each particular color range to an area smaller than the areas named above.

FIG. 11 also illustrates this implementation. Consider a case in which the right image light of the first color range is displayed only in areas 103 and 109 (rather than in areas 102–104 and 108–110), while light of that color range from the left image is displayed only in areas 106 and 112 (rather than in areas 105–107 and 111–114). Similarly, right image light of the second color range is displayed at 105 and 111, left image light of the second color range is displayed at 102, 108, and 114, and light of the third color range of the right image is displayed at 107 and 113 and that of the left image and the third color range is displayed at 104 and 110. This arrangement of display colors is called "display arrangement B" in the following. Consider also that the color filter elements of layer 40 are as stated above with respect to the first embodiment, that is, layer 40 is constituted as described in "filter arrangement A."

It can be seen that reducing in size the display areas of each color range for each image, while leaving unchanged the size and placement of each of the areas on layer 40 which blocks light from a particular color range, creates precisely the situation described in U.S. Pat. No. 5,822,117 (FIG. 32 therein) teaching the movement-permissive system. Inspection of FIG. 11 demonstrates that for each numbered area of display 10, its displayed color can be seen by the appropriate eye and not seen by the inappropriate eye, because areas of layer 40 transparent to that color stand between that particular area of the display and the appropriate eye, and areas of layer 40 which block that color stand between that area of the display and the inappropriate eye. For each numbered area of display 10, since three contiguous numbered areas of layer 40 permit the passage of light from that display area to the appropriate eye and three contiguous numbered areas of layer 40 prevent passage of light from that display area to the inappropriate eye, consequently considerable movement of eyes 20 and 30 could take place, left and right and forward and back, without that movement reducing the appropriate eye's ability to see all the light emanating from the particular display area, and without increasing the inappropriate eye's ability to see light from the particular display area. Similarly, movement permissiveness can also be accomplished by the opposite sort of arrangement: wide areas (e.g., of a given color) on the display matched with narrow areas on the filter produce an effect similar to that of wide areas on the filter matched with narrow areas on the display. If two or three contiguous numbered areas from display 10 are matched with only one numbered element of filter 40, for example, then movement permissiveness is also achieved, in a manner similar to that described in PCT Publication WO97/26577 (FIG. 33a therein).

Since the discussion of the preceding paragraph relates to any random numbered area of display 10, it is clear that it applies equally well to display 10 as a whole. In other words, since it is true for each eye with respect to each numbered area of display 10, that eye can see light from the image which is appropriate and not see light from the inappropriate image, and that this continues to be the case when that eye moves moderately left and right and forward and back, then it is true for the arrangement as a whole that throughout the width of display 10 each eye of the viewer sees its appropriate image and only its appropriate image, and continues to do so while moving moderately to the left and right and forward and back. Thus, FIG. 11 describes an autostereoscopic system which inherently results in a form of a movement-permissive system in which the display presents no large gaps (none as large, for example, as an entire RGB triplet) in the displaying of the right and left images.

The specific configuration presented above is merely an example of the way in which a color display and color filter system can provide an autostereoscopic view without large gaps in the display of light from both images, while allowing for some freedom of motion on the part of the viewer. The arrangement might relate to two or four or five or more color ranges rather than three, and the display area displaying light from each color range might be either wider or narrower than that specified in the example.

The particular selection of color ranges and image sources described above does however present an interesting feature. If the first color range is taken to be red, the second green, and the third blue, then the situation described corresponds closely to popular types of RGB display frequently used in televisions and liquid crystal displays (e.g., notebook computers), as well as in color monitors, where the "shadow mask" system used for displaying color in many CRT displays inherently divides the display area into areas of discrete color, which could then be directly aligned with a filter layer 40 at an appropriate distance and with appropriately placed and sized subdivision.

In any case, for any display system with RGB characteristics, the embodiment can be implemented by providing a layer 40 at appropriate distance with appropriately placed and sized blocking areas, and by displaying display pixels which mix the light from different color ranges from the left and right image picture elements in an appropriate manner. For example, the display might present (in order) red from the left image, green from the right image, blue from the left image, red from the right image, green from the left image, blue from the right image, then again red from the left image, and so on, the pattern repeating itself across the width of the display. Stating the same thing in terms of RGB triplets, a first triplet would combine red from the left, green from the right, and blue from the left image, and the following triplet would combine red from the right, green from the left, and blue from the right image. Similar combinations could of course be made for systems based on two colors, four colors, or more.

In contrast to some displays (RGB displays, for example) which always present particular colors in a set of particular positions, some other types of displays using other technologies are not limited to presenting particular colors in particular positions. Such a display is called a "full color display" in the following. The embodiments described above can also be applied to a full-color display, however generated, if that display is first filtered to provide for regions of particular color ranges, as described in FIG. 41 of PCT Publication WO97/26577.

These embodiments can similarly be applied to a full-color display if the display is used in such a manner that selection and placement of the colors actually presented on the display is done in a manner appropriate to the embodiment. Thus, whereas one might filter the light from a full-color display to create a situation where only, say, the red component from a right image arrives at a particular area of a display screen, one might also simply project (e.g., under computer control) only red light from a right image onto that particular segment of the projection screen.

The techniques described above can be used in the context of any technique used to create an impression of continuous color ranges by combining elements of particular color in controlled amounts. Many printing processes, for example, are of this nature. That is, the system is also applicable to contexts in which pigments are used to absorb color ranges from ambient light, and reflect back particular ranges of color. In particular, the arrangement described above can be applied to contexts such as the printing of books and magazines, billboard-type advertising displays, and so on. Printed pictures, having absorbed certain color ranges from the ambient light and reflected the unabsorbed color ranges, are seen by observers as having color in much the same manner as are displays which generate light, on condition of being well illuminated. Thus a printed image may display much the same color characteristics as a light-generating display source, and the method described above will work on it as well. In the case where the light illuminating the printed picture must pass through the color filters to reach the printed matter, a light source which is both diffuse and sufficiently powerful will be required, but if such a light source is available the arrangement described will provide an autostereoscopic image as well. Specifically, a printed autostereoscopic image may be achieved by printing an image in two-layers, with a first layer corresponding to display 10 in FIG. 11, with colors from the left and right images distributed across the printed page as described with respect to display 10, then a transparent overlay of appropriate thickness (corresponding to the appropriate distance of layer 40 to display 10, which depends in turn on the width of the areas into which display 10 is divided, as described in FIG. 24 of U.S. Pat. No. 5,822,117) placed on the image (display), and on that transparent layer, filter elements blocking particular colors, (described above as layer 40) are printed with transparent inks, or provided through any other printing or photographic or similar process.

In another example, the first layer might be produced as a transparency. Then both the image and the filter are tinted and transparent. The two layers, positioned appropriately one with respect to the other, can then be backlit, creating a striking autostereoscopic printed display.

In either case, front illumination as well as back illumination can be employed to autostereoscopically view the printed (displayed) image.

In another embodiment, these principles can be applied also to the case of a stereoscopic projection system. FIG. 38 of PCT Publication WO97/26577 demonstrates that it is possible to project a pair of full-color images through a color filter subdivided into areas filtering particular colors, and view an autostereoscopic image as a result, on condition that the projectors and the viewers are positioned appropriately. Referring again to FIG. 11 here, consider a situation in which a full-color left image is projected from eye position 30 and a full-color right image is projected from eye position 20, both projecting towards a projection screen 12 placed in the position of display 10. It can easily be seen that if areas 43, 49, and 55 of layer 40 transmit only light of the first color range, areas 45, 51, and 57 transmit only light of the second color range, and areas 41, 47, and 53 transmit only light of the third color range, and all the even-numbered areas of layer 40 transmit no light at all, then the image projected onto the projection screen in the place of display 10 will have precisely the characteristics described above as "display arrangement B". In the following this arrangement of layer 40 will be called "filter arrangement B".

As we have seen above, an arrangement consisting of a display in display arrangement B, when seen through a layer 40 arranged as described in "filter arrangement A", is exactly the construction of the embodiment described above. Thus, if we project a pair of full-color images from appropriate positions through a layer 410 which is layer 40 arranged as "filter arrangement B" onto a projection screen 12, and then view that projection screen, again from appropriate positions, through a layer 415 which is layer 40 arranged as "filter arrangement A", one has a forward projection system with all the advantages of the embodiments described above, including a "dense" display as defined above, as well as the advantages of our movement-permissive system. As shown in FIG. 38 of PCT Publication WO97/26577, the geometry of these arrangements creates "sweet spots", and projectors of left and right images may be placed at any left and right eye positions.

Note that the light allowed to pass through filter arrangement B is everywhere a subset of the light allowed to pass through filter arrangement A. That is, there is no light allowed to pass by filter arrangement B which would be blocked by filter arrangement A. Consequently it is possible to implement a projection system in which a layer 410 (layer 40 in filter arrangement A) substantially covers the projection screen (in a movie theater, for example), and to provide a layer 415 (another layer 40 in filter arrangement B) which filters light from the pair of projectors which are placed in positions comparable to eye *Digital Image Processing*, Prentice Hall, Englewood Cliffs, N.J. 06732, which is incorporated by reference as if fully set forth herein), then the method is the same as described above for adaptation to electronic display screens (appropriately modified, of course, to accommodate the specific pattern of color elements used by the particular printing system). In some printing systems (for example, the system used by Panorama Ltd. of Jerusalem, (using a Symbolic Signs Laser printer, on Infoclear film), which creates transparencies by 'printing' with laser activation of film pigments, two or more colors can be presented in the same area at the same time. This allows for other filter arrangements, since in that case there is no need to put e.g., only red into one area, only green into another etc. This allows, for example, a full-color system with only two filter areas, similar to the system described in PCT Publication WO97/26577 and relating to a color projection system, but in print medium. That particular system would have the advantage of high pixel density (hence a high quality image).

Other Methods of Getting Narrow Strips Behind a Wide Filter in Projection, in Order to Get the Movement Permissive System Above there is described one method, that of projecting through a filter with narrow color strips, then through a filter with wider color strips, with viewers viewing the projection through the wider filter only. This was to produce the movement permissive situation, where wide filter strips are used to view narrow color pixels. Note that in that situation, the first filter, through which the image is projected, accomplishes the color separation of what may have originated as a full-color image. If a full-color section of an image is projected through, say, a red filter, then a red 'pixel' results.

Here are some other ways to accomplish the same purpose, and get to the situation that narrow color elements are viewed through relatively wide filter areas. As seen above, that situation creates a wide viewing window in all of which the viewer can see the appropriate image without losing any light as he moves around, and from which he cannot see any light of the inappropriate image.

A first method is simply to project narrow image picture elements through the wide filter areas. In the method mentioned above it contemplates projecting a full-color image through color filter strips to get individual color pixels projected onto particular parts of the screen. In the method presented now, one causes the projection system to simply project color pixels as desired through the color filter and onto the projection screen, in predetermined positions with respect to the filter. This is easiest to implement in a computer-generated display. If, for example, to accomplish the stereoscopic representation of a scene, a particular area of the screen is required to have, say, a red pixel element of some particular intensity, then the computer-generated projector simply projects that pixel onto that spot. The invention here is the idea of coordinating that projection with the position of the various color strips on the filter, so as to generate the desired situation, namely a situation producing autostereoscopic vision with a high level of movement permissiveness of the viewer.

Another method of accomplishing this, which can be used independently or in conjunction with the previous method, is to project a full color picture onto a screen with colored stripes on the screen. The idea is that if the screen is in color it will reflect only that color, so, e.g., if one projects red through a wide red filter onto a surface with red, green and blue strips, the red will reflect it and the green and blue should absorb it. Therefore, given a projection screen with relatively narrow colored strips, coordinated with a color filter layer with is relatively wide color filter strips as described above, one can project colors through a filter area which is wider than the pixel size one desires to have on the screen, yet the pixels reflected from the screen will be of the desired size. One application of this technique would be to project two full-color images from two projectors through a color filter as described above. One positions two projectors as described with respect to FIG. 38 of PCT Publication WO97/26577, using a color filter with 'relatively wide' color filter regions as described above. Using a normal projection screen this would produce a full-color autostereoscopic image (as described in PCT Publication WO97/26577), yet would not create movement permissiveness, since the size of the projected color strips on the screen would be similar to the size of the filter areas through which they are viewed. If, however, one uses a projection screen with colored strips relatively narrow in size and appropriately placed with respect to the areas of the filter, then a permissive system as described above would be obtained.

For example, referring to FIG. 11, if areas 52, 53, and 54 of filter layer 40 were areas permitting the passage of red light (with 49–51 and 55–57 preventing the passage of red light), then if a left image is projected from position 30 and a right image is projected from position 20 (as explained with reference to FIG. 38 of PCT Publication WO97/26577), then if layer 10 is a normal projection screen, red light from the left image would be projected onto areas 109–111 and red light from the right image onto areas 112–114. This would produce a relatively bright image, but a non-permissive system: any movement of the viewer's eyes from the appropriate viewing positions would cause crosstalk (an eye seeing light from an inappropriate image) and also would cause a reduction in the amount of light that eye receives from the appropriate image.

The solution now proposed is for layer 10 to be a reflective projection screen which itself has colored strips, each strip appropriate to reflect light of some color range and absorb (or otherwise not reflect) light of other color ranges. In our example, if areas 110 and 113 are red-reflecting strips, but areas 109, 111, 112, and 114 are strips which do not reflect substantial amounts of red light, then the full-color images projected from positions 20 and 30 will result in a red strip from the left image appearing at 110 and a left strip from the right image appearing at 113. Since the right eye position will view area 113 through filter areas 52 and 53 and 54 (or the equivalent, elsewhere on layer 40), and the left eye position will view area 110 through filter areas 52 and 53 and 54 (or the equivalent, elsewhere on layer 40), each eye will see the appropriate image and the permissive system described above is in effect. In this paragraph the effect is described with respect to a particular color, but as described above, the same can be simultaneously accomplished with respect to other colors as well. Areas of color filtration on filter 40 can be made to overlap (as described above, for example with red-permissive filter areas at 52–54 and, say, green permissive areas at, say, 54–56. Similarly, areas that reflect particular colors and do not reflect other colors can also be combined in similar fashion.

Another projection method is now described. In contrast to the previously disclosed methods, and other methods known in the art for producing stereoscopic (with glasses) or autostereoscopic (without glasses) displays using two projectors, the following method has the particular advantage of producing a color autostereoscopic display using only a single projector.

Figure 19:
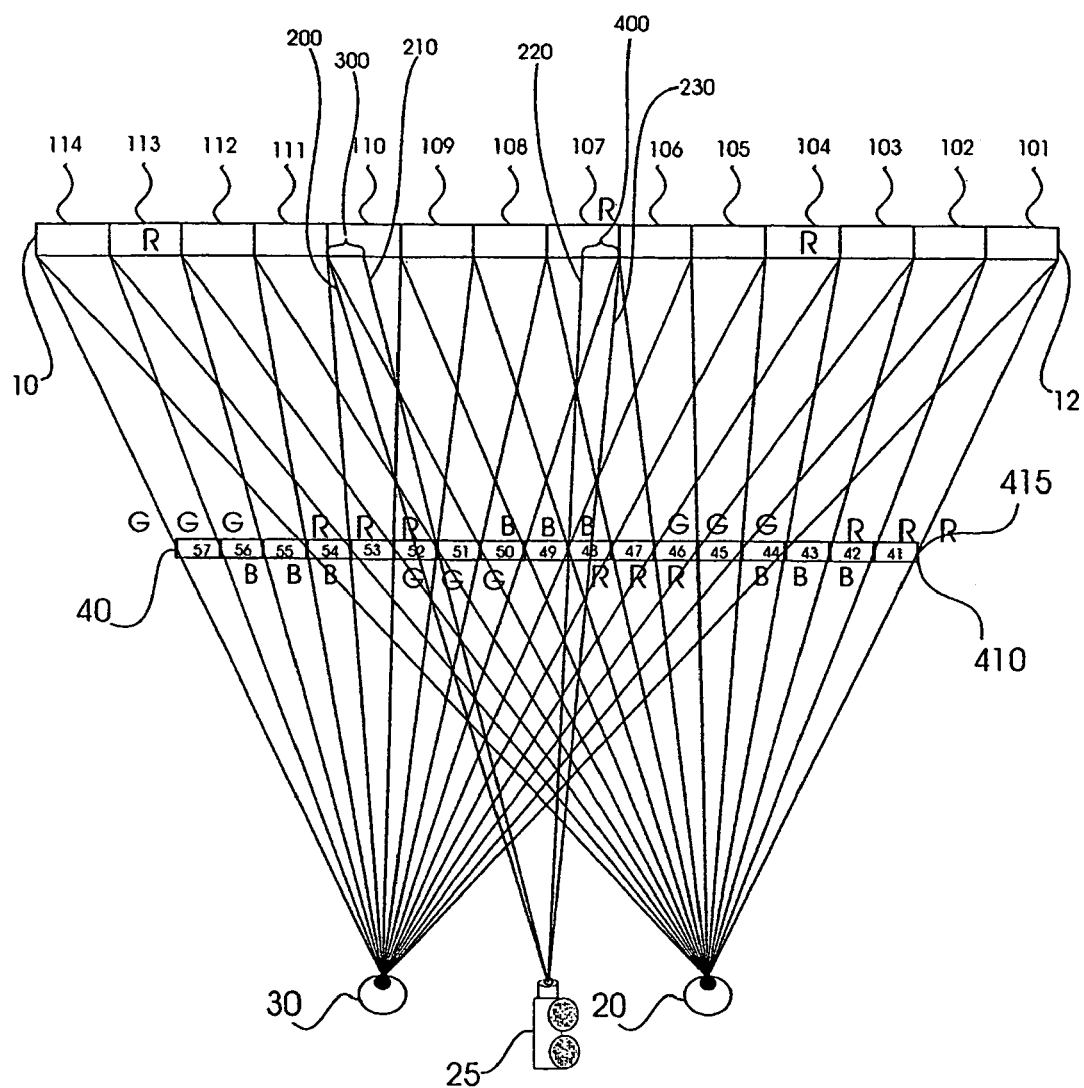
FIG. 19 is a top view of a system according to the present invention employing a color filter and a single projector to project an autostereoscopic view according to the present invention.

A single-projection autostereoscopic system is illustrated in FIG. 19. FIG. 38 of PCT Publication WO97/26577, and some of the discussion above, teaches a filter system (whether color or polarizing) at layer 40, projection of a left image from a left-eye position such as 30, and projection of a right-eye image from a right-eye position such as 20. The discussion in PCT Publication WO97/26577 demonstrates that for the filter systems under discussion there are multiple left eye and right eye positions, and that they are roughly equivalent with respect to projecting and viewing, so that if a left image is projected from a left-eye position then it is substantially visible from other left-eye positions and substantially not visible from other right-eye positions.

The present embodiment of the invention described herein contemplates projection of an image from a position which is neither the left-eye nor the right-eye position. In a preferred embodiment, the point of projection is equidistant from the two, and at the same distance from the screen. In FIG. 19 this is position 25.

In the discussion of various display systems using color filters above, a point was made that the 'viewing window', that is the area within which the user can move to the left and to the right without seeing any of the inappropriate images, was unusually large. Nevertheless there exist, in those systems, areas which are not within the viewing window, because they are positions from which a viewer's eye might see light from both the left and the right image. This fact is now utilized, by projecting an image from such a position.

FIG. 19 shows a projector at 25, equidistant from left eye position 30 and right-eye position 20. 40 is an optical construction which is a composite color filter. Areas 52–54, 46–48, etc., on filter 40 permit the passage of red light. Areas 50–52, 44–46, etc., on filter 40 permit the passage of green light. Areas 54–56, 48–50, 42–44, etc., permit the passage of blue light. As elsewhere in this document, the number and selection and order of the particular colors in the example are chosen as examples of the general principle, and the invention is not limited to these particular examples.

As shown above, a display system using filter 40 and presenting red light from a left image at 110 and 104, and red light from a right image at 107 and 113, and similarly green light from a left image at 114, 108, and 102, and green light from a right image at 111 and 105, and blue light from a left image at 112 and 106 and blue light from a right image at 109 and 103, would have the qualities discussed above, namely autostereoscopic viewing of a full-color image with a high degree of movement permissiveness of the viewer.

Lines 200, 210, 220, and 230 demonstrate how one produces that situation. A projector at 25 projects a single image towards screen 10. The image is subdivided in such a way that, for a given color, pixels from the left image are projected alongside pixels from the right image, alternating across the screen. Using red as an example, one sees a red pixel from the left image projected between limits 200 and 210, and a red pixel from the right image projected between limits 220 and 230. The result is a red pixel from the left image on screen 10 in area 300, and a red pixel from the right image on screen 10 in position 400. In moving between the projector and the screen the left image picture element passes through the red-permissive area of filter 40 at 54, and the right image picture element passes through the red-permissive area of filter 40 at 48. Note that some inaccuracy is allowable, because any small extension of the left pixel to the right of area 300 will not affect the outcome, as it would be blocked by the red-blocking area of the filter at 49, 50, and 51, and any extension of the right pixel to the left of area 400 will similarly be blocked by the same red-blocking areas of filter 40.

Note that area 300 is entirely contained within area 110, and area 400 is entirely contained within area 107. This means that all the permissive characteristics described for this configuration of a color display system are in effect. Indeed, the fact that area 300 is smaller than area 110, and area 400 is smaller than area 107, actually increases the permissiveness of the system over and above that described earlier.

Note also that one might encounter a situation in which the projected pixels extend somewhat in the other direction, that is area 300 might be expanded to cover the right-hand side of area 111, and area 400 might be expanded to cover the left-hand side of area 106. This might occur because of inaccuracy in the projection, or it might be done intentionally to increase the light intensity and color saturation of the projected image. In either case, the result would not be the destruction of the image and it's autostereoscopic features, but merely some reduction in the degree of permissiveness presented by the system.

In the preceding discussion red pixels were used for demonstration. Clearly similar projection of appropriate green and blue pixels can be accomplished at the same time and in the same manner. A green pixel from the left image would be visible to a left-eye position if it were projected through filter area 50 onto a part of screen area 108. A green pixel from the right image would be visible to a right-eye position if it were projected through filter area 46 onto a part of screen area 105. A blue pixel from the left image could be projected through filter area 54 onto screen area 112, etc.

Thus, by dividing color pixels from the two images appropriately and projecting them into the correct areas of the screen through the areas of the filter allowing passage of light of that color, a full-color image visible in auto-stereoscopic mode is produced.

"Head-tracking": Aiming the Apparatus at the Eyes of the User in Movement-permissive Systems U.S. Pat. No. 5,822,117 to Kleinberger et al. and PCT Publication WO97/26577 as well as this application describe various systems for head-tracking, systems which aim the 'sweet spot' (the area from which an eye can see the appropriate image and only the appropriate image) to adapt it to the changing position of the viewer in front of an autostereoscopic display. Also described (both above and in U.S. Pat. No. 5,822,117 to Kleinberger et al. and PCT Publication WO97/26577) are movement permissive systems based on blocking light from a display, or on blocking light within a parallax barrier, and systems which achieve a large amount of movement permissiveness using a color filtration layer.

Various systems which combine movement permissiveness together with head-tracking are described hereinafter. As will be shown, systems which allow a large degree of movement permissiveness can produce efficient and useful head-tracking behavior in a number of simple and efficient ways, thereby providing relatively inexpensive and robust head-tracking solutions. The color filter systems are a particular example of systems permissive enough so that using them, competent head-tracking can be achieved without need of great accuracy, nor fine movements, nor subtle changes, nor a multiplicity of possible positions.

A simple method for aiming the apparatus towards particular eye positions as the viewer moves with respect to the display, using a movement permissive barrier system, is now presented. This method will be described in the context of the color filter systems described above, yet the reader should note that the essential characteristic of the system, in the current discussion, is its movement permissiveness. The method is presented in the context of the color filter system by way of example, but the invention described should not be understood as being limited to that system only, but rather it is appropriate to any barrier system presenting similar characteristics of movement permissiveness.

The viewing window of the color filter system as described above is extremely wide, on the order of 67% of the interpupillary distance ("IPD"), or more. This means that if a viewer's eye is exactly in the center of the viewing window (i.e., in the center of the "sweet spot"), the viewer can move about a ⅓ IPD to the left, and a ⅓ IPD to the right, without leaving that window, without diminishing the amount of light the viewer sees from the appropriate image, and without seeing any light from an inappropriate image. In the following this sweet spot is referred to as viewing window "region N". This is the area from which the viewer enjoys normal stereoscopic viewing.

If the viewer continues to move sideways with respect to the display, and passes beyond the boundaries of the sweet spot, the viewer first enters a small region ("region M") where the view is mixed: each eye can see some light from both images. If the viewer continues to move in the same direction the viewer enters a third region, "region R", where the parallax is reversed. In region R each eye again sees light from only one of the images, yet this time the light reaching each eye is from the inappropriate image. One might say that in region R, the viewer's left eye is where his right eye should be, and his right eye is where his left eye should be. The situation where each eye sees light from the inappropriate image is called "reversed parallax" in the following. Further movement in the same direction will cause the viewer to enter another relatively small region M where the viewer again sees mixed (double) images with each of the eyes, and finally he will enter another region N, and again see a correct autostereoscopic image. In the color systems described above, region M is relatively small, but region R is approximately the same size as region N.

Since, in the color filter systems as described, regions N and R can be much wider than regions M, if the viewer's IPD is close to that for which the filter was designed, and if the viewer is at an appropriate distance from the display, then most of the positions from which the viewer views the display will not produce double images; rather, most positions will produce either a correct autostereoscopic image, or a reversed parallax image.

An extremely simple aiming system can consequently be achieved by (a) detecting when the viewer is at a position in a region R from which the viewer would see reverse parallax images, and when this situation is detected (b) switching the positioning of the left and right images on the display. That is, if the system detects that the viewer is in a region R from which the viewer sees inappropriate images, it modifies the display so that each pixel position which would normally have displayed imagery data from the left image will instead display imagery data from the right image, and vice versa. This has the effect of converting each region R into a region N, and vice versa, and is referred to as the "alternately positioned image" in the following. To restate: the system, having detected that the viewer entered a region R, displays the left image on the pixels or subpixels which had been showing the right image, and displays the right image on the pixels or subpixels that had been showing the left image. As a result of this change, the viewer, without moving from his position in what had been a region R, finds himself in a region N from which the viewer can see the appropriate images of an autostereoscopic display.

Of course this simple head-tracking solution has the disadvantage that it simply ignores the viewer's passages through the relatively small regions M, in which the viewer sees mixed double-images (i.e., some appropriate light, some inappropriate light). Yet the system has the advantage of great simplicity; from most positions the viewer sees the appropriate images, the viewer never sees inappropriate pure reversed parallax images, and the system functions with eye is from the inappropriate image. One might say that in region R, the viewer's left eye is where his right eye should be, and his right eye is where his left eye should be. The situation where each eye sees light from the inappropriate image is called "reversed parallax" in the following. Further movement in the same direction will cause the viewer to enter another relatively small region M where the viewer again sees mixed (double) images with each of the eyes, and finally he will enter another region N, and again see a correct autostereoscopic image. In the color systems described above, region M is relatively small, but region R is approximately the same size as region N.

Since, in the color filter systems as described, regions N and R can be much wider than regions M, if the viewer's IPD is close to that for which the filter was designed, and if the viewer is at an appropriate distance from the display, then most of the positions from which the viewer views the display will not produce double images; rather, most positions will produce either a correct autostereoscopic image, or a reversed parallax image.

An extremely simple aiming system can consequently be achieved by (a) detecting when the viewer is at a position in a region R from which the viewer would see reverse parallax images, and when this situation is detected (b) switching the positioning of the left and right images on the display. That is, if the system detects that the viewer is in a region R from which the viewer sees inappropriate images, it modifies the display so that each pixel position which would normally have displayed imagery data from the left image will instead display imagery data from the right image, and vice versa. This has the effect of converting each region R into a region N, and vice versa, and is referred to as the "alternately positioned image" in the following. To restate: the system, having detected that the viewer entered a region R, displays the left image on the pixels or subpixels which had been showing the right image, and displays the right image on the pixels or subpixels that had been showing the left image. As a result of this change, the viewer, without moving from his position in what had been a region R, finds himself in a region N from which the viewer can see the appropriate images of an autostereoscopic display.

Of course this simple head-tracking solution has the disadvantage that it simply ignores the viewer's passages through the relatively small regions M, in which the viewer sees mixed double-images (i.e., some appropriate light, some inappropriate light). Yet the system has the advantage of great simplicity; from most positions the viewer sees the appropriate images, the viewer never sees inappropriate pure reversed parallax images, and the system functions with electronic switching (modifications to the image) alone, with no mechanical movement of any kind.

Moreover it seems to be the case that when a viewer is moving a great deal (as the viewer might tend to do if the viewer were, e.g., the player of an active stereoscopic computer game), the mind's gestalt-based perceptual mechanisms seem to tend to make it 'forgive' and ignore brief passages with double images, if the overall impression is one of clear stereoscopy most of the time. Consequently, the system herein described is appropriate for certain applications.

One may note here a related option in the design of such systems: if the light-blocking or color-blocking areas of layer 40 are made relatively larger, and the light-transmitting or color transmitting areas made relatively smaller, then it is possible to eliminate entirely regions M, in the sense that regions where an eye can see light from both images would be replaced by regions where the eye would see no light from either image. Such an arrangement, particularly when used in conjunction with the presentation of alternately positioned images that avoid reverse parallax, will in itself be an adequate solution for some applications, yet for other applications a higher degree of movement permissiveness is preferable, and such systems may have regions M as described above.

One may further note in this context an additional technique for adapting this and other autostereoscopic systems to rapid movements of the viewer. Certain stereoscopic display contexts, interactive stereoscopic graphic games for example, may elicit frequent and very rapid (instinctive) movements of the viewer. It may be difficult for some head-tracking systems to rapidly accommodate in real time to such movements. For this case, the following solution is presented: there are indications that during rapid or violent movement stereoscopic perception may be naturally interrupted in any case, by the behavior of the viewer and by the natural limitations of the human perceptual system (when one ducks to get away from a virtual monster, for example, one is likely to move and to turn one's head in a way that naturally interferes with stereoscopic vision. There also seems to be some relevant limitation in the ability to absorb such rapidly changing perceptual information at real-time speeds. This being the case, the display system, discerning that rapid movement taking place, may briefly put itself into a non-stereoscopic mode, and transmit a monoscopic image to the viewer. The advantage of this in the context of a barrier-based autostereoscopic system is clear: during display of the monoscopic image, there is no sweet spot: any pixels seen by any eye from any position will be appropriate. While in monoscopic mode the head-tracking system does not need to headtrack. Reversed parallax (which might destroy or interfere with the viewer's on-going 3D gestalt) is avoided because no parallax information is presented. When the viewer's movements become slower and more normal, stereoscopic display can be resumed and the head-tracking system used to discern the viewer's then-current position and movement, and adapt to it.

"Head-tracking": Aiming the Apparatus at the Eyes of the User in a Lenticular Autostereoscopic System A head-tracking system similar to that described above can also be implemented in the context of a lenticular autostereoscopic display.

Lenticular systems are one of the classic methods of stereoscopic display, and have been popularly available for many years. Lenticular systems typically do not require head-tracking because they produce a number of distinct views, and as the viewer moves in front of the display, the viewer's left and right eyes encounter a variety of compatible left and right views from various positions in front of the display. However, this effect is accomplished at the cost of low resolution, since many areas of the display are not being viewed by either eye of the viewer at any particular time. If a lenticular system is used not to present a large multiplicity of possible views, but rather to present a restricted number of views (at the limit, a pair of views only), then the resolution of the image it produces, while less than the maximum resolution possible to the display in non-stereoscopic viewing, is nevertheless much higher than that typically presented by classical lenticular displays. When used in this way, the lenticular system's functionality is comparable in many respects to that of a parallax barrier system.

Such a system, however, would also have a disadvantage similar to that of parallax barrier displays, namely that from some positions (regions N) the viewer would see an appropriate 3D image, from other positions (regions M) the viewer might see mixed views, and from some positions (regions R), the viewer would see reversed parallax (each eye seeing an inappropriate image).

The problem can be solved for a lenticular system in a manner similar to that described above for a color filter barrier by the use of alternately positioned images: A head-tracking sensor can inform the system when the viewer's eyes approach or enter a region R where they will see elements of the inappropriate images, and at that time the control element can direct picture elements to alternative parts of the display, thereby restoring a situation in which the viewer will again see proper parallax view, each eye seeing the appropriate image. Thus the combination of this simple electronic head-tracking method with a lenticular autostereoscopic display constitutes an effective electronic head-tracking solution with no moving parts. This solution is particularly interesting in the context of lenticular autostereoscopic systems, because in such systems the regions M where the viewer would tend to see a mixed image (each eye seeing both appropriate and inappropriate light) can be made relatively small.

Methods for Preventing the Seeing of Double Images by Displacing a Filter or Barrier: Generalities Various modifications of the system which are directed at solving the problem of the regions M where viewers see mixed (double) images will now be described. Here again, advantage is taken of the fact that in a viewing system with high movement permissiveness, (a large viewing window), the viewer can move considerably to the right and left and forward and back without encountering inappropriate images and without losing any light from the appropriate image.

PCT Publication WO97/26577 teaches options in which a filter is continuously moved with respect to an image, so as to keep a viewer's eyes within the 'sweet spot' viewing zone as the viewer moves with respect to the display. A disadvantage of such systems is that they require fairly exact movement of the filter or the display and fairly accurate determination of the viewer's eye positions.

Using a movement-permissive filter system such as described above, the need for exact placement of the filter is somewhat relaxed: so long as the filter is in approximately the correct place, the system will allow each eye of the viewer to see only the appropriate image. This fact makes it possible to employ a variety of relatively simple systems for moving the filter. Such systems, simple in conception and in execution when compared to complex arrangements for controlling filter movement, have the great advantage of being easy and inexpensive to make and maintain, require simpler parts and construction, yet nevertheless provide adequate autostereoscopic head-tracking for some applications.

The basic idea of these systems is to utilize only a small number of possible positions for the filter. If the display system has a degree of permissiveness on the order of that described above for the color filter systems, then as little as two alternate positions for the filter will suffice to provide a competent head-tracking solution which avoids reversed parallax (regions R) and also avoids mixed views (double images, regions M). It is sufficient to provide a system in which the color filter (or parallax barrier, or lenticular layer, or other layer with similar function) has two appropriately-chosen possible positions, and is designed to switch rapidly and simply between them.

The essential idea is that when the viewing window is very wide, whether through the use of the color filter described above, or through the use of the permissive system described in FIGS. 31–33a of PCT Publication WO97/26577, or through the use of a lenticular system, or through any other means of producing an autostereoscopic system with a sufficiently large viewing window, it is then possible to switch to an alternately positioned image when necessary, thereby avoiding reverse parallax (i.e., turning regions R into regions N), and also to avoid positions where the viewer would be able to see both images rather than only the appropriate image, by flipping the filter position between two alternative positions when necessary, thereby turning regions M into regions N.

Figure 20:
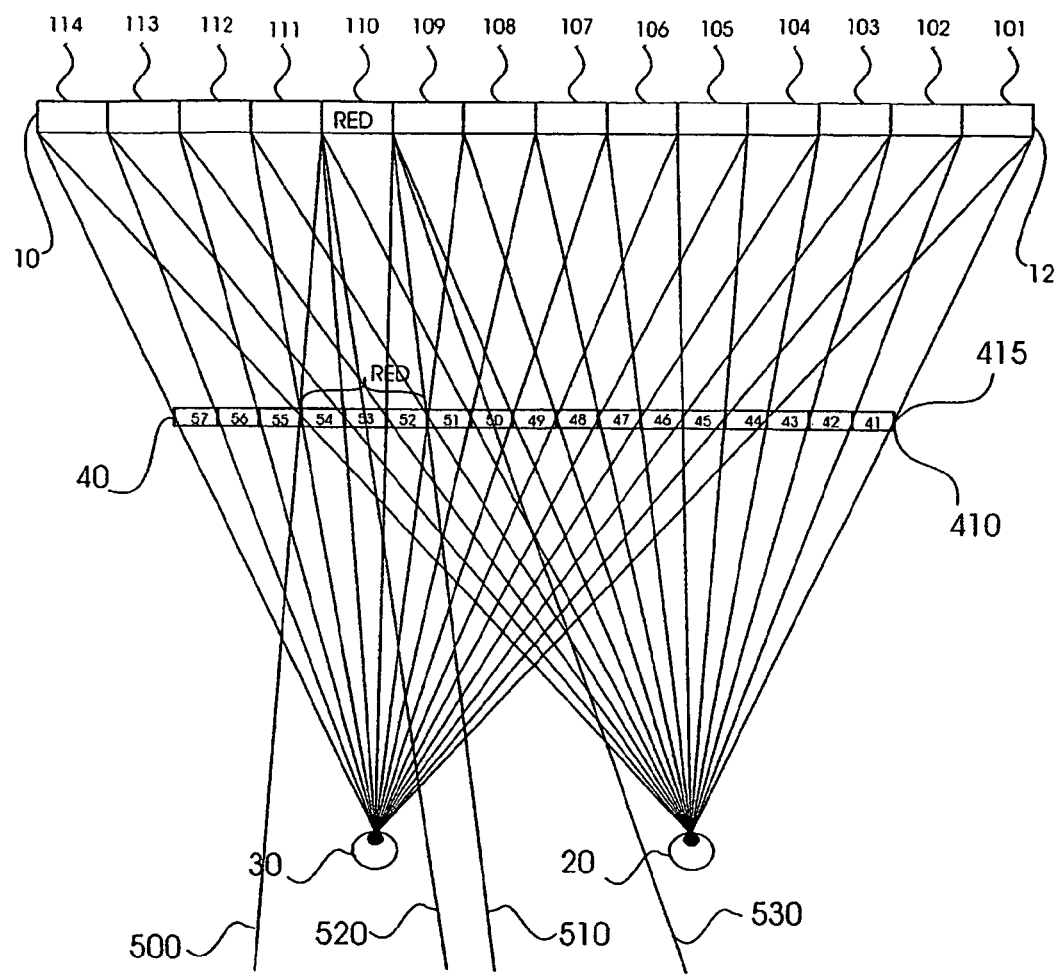
FIG. 20 is a top view of a system according to the present invention employing a single filter layer for showing an autostereoscopic view, utilizing lateral filter motion for head-tracking according to the present invention.

This principle is illustrated in FIG. 20, which is similar to FIG. 11 which illustrated various aspects of the color filter systems of the present invention. In the discussions of FIG. 11 it is taught that if a viewer's left eye, say, were at position 30, a red subpixel from a left image were displayed at 110, and areas 52, 53, and 54 of layer 40 were filter elements passing red light, then lines 500 and 510 would delimit the borders of the viewing window within which the viewer's left eye could move without losing any of the light from pixel 110.

Again, following the logic previously explained in the context of FIG. 11, having red filtering elements on layer 40 at 52, 53, and 54 would also make it appropriate to have a red right-image pixel displayed at 113. If the viewer were to move to the right to such an extent that his left eye 30 were displaced all the way to position 20, then, as described above, the apparatus could re-establish the viewing of appropriate images by simply displaying a red subpixel from the left image at 113, and a red subpixel from the right image at 10.

The transition of the viewer's left eye from position 20 to position 30, however, is problematic. As that eye passes line 510, it enters a region in which, looking through the filter area 52–54, it can see some light from left-image subpixel 10 and also some light from right-image subpixel 113. This is a "region M". The system can prevent this partially-inappropriate viewing from regions M if, as the viewer's left eye approaches line 510, filter 40 moves to the right.

As stated above, one might, with a certain amount of effort and expense, move the filter by distances which are some fraction of the length of a single filter area, that is, a fraction of the length of e.g., area 52, and thereby continuously track the viewer's eye position accurately. The point here is that with the large sweet spot produced by the system, such accurate aiming is not necessary.

Consider what would be the effect if filter 40 (or the filtering elements of filter 40) were to move the length of one and a half filter units to the right. The red-permitting area which had been at 52–54 would now be positioned from the middle of 50 to the middle of 53. In that case the left eye's viewing window, the area previously delimited on FIG. 20 by lines 500 and 510, would now be delimited by lines 520 and 530.

Note that there is some overlap: the viewing zones are wide enough so that there is an area (between line 510 and line 520), which is within the sweet spot before the change in filter position, and which is also within the sweet spot after the change of filter position. This is very convenient: it means that as the viewer's left eye transits from position 20 towards position 30, there is a period of time (after the eye passes line 520 and until it reaches line 510) during which the filter can be in either position, or indeed in transition between one position and the other, and the left eye during that time will enjoy an uninterrupted view of its appropriate pixel.

Imagine, then, a viewer's left eye starting from position 30 and moving towards the right. At any time within the period when the viewer's eye is between 510 and 520, the filter is moved to the second position. The viewer's eye can now move all the way to line 530 without leaving the sweet spot. As the viewer approaches line 530, the filter can be moved back to the first position and the alternately positioned image displayed, as explained above in the discussion of the avoidance of reverse parallax. In this manner the viewer can move continuously to the right, with the filter simply flipping back and forth between its first and second positions, and the image flipping between the original image and the "alternately positioned image". Under this system both eyes see the appropriate image at all times.

Moving the Filter Layer Mechanically

One option for moving filter layer 40 (or its filtering elements) is to do so mechanically. The requirements of such a system are simple: in contrast to a system which tracks the eyes position with great exactitude, requiring, say, a stepper motor or similar device, the requirements of the current system can be satisfied with an arrangement consisting of a few biasing springs and a couple of attracting/retracting electromagnets. Note that the movement required is approximately only the width of half an RGB triplet, which in most applications is likely to be less than a millimeter. The mechanical implementation is simple because there are only two possible positions for the filter, and the distance to be moved is small and always the same.

One possible utilization of the system described might be to not move the filter during rapid lateral movement of the viewer, but rather to move it only for adapting the apparatus to the viewer's position once that is relatively stable. During major movement, if the alternately positioned image is displayed when appropriate, the preponderance of the time the viewer will be seeing the appropriate image only, and during only a small fraction of the time the viewer will be seeing a double image (with each eye). The option of whether to adapt the apparatus to the viewer's eye positions while the viewer is moving rapidly might depend on the specific application, and indeed it might be left to the choice of the individual viewer, some viewers and some applications requiring a simpler or quieter operation, others requiring 100% stereoscopy at all times.

Modifying the Position of Filter Elements Electronically

Although it is shown that for some applications it may be practical, inexpensive and convenient to construct a head-tracking system using a filter moveable by mechanical means, it will clearly be preferable for many applications to achieve the same effect using a system which effectively 'moves' a filter, or filtering elements, using electronic switching and having no moving parts. We now present an example of such a system.

There exist materials (called "polarization orientation sensitive color filter materials" in the following) which have the characteristic of providing color filtration (being transparent to certain color range(s) and opaque to certain color range(s)), yet they have this characteristic only to components of light with a particular polarization orientation, while being substantially transparent to light components of another polarization, for all color ranges. Stereojet Inc. of California uses such a material to produce and display 3D images, and Tektronix Inc. some years ago used a similar material in the production of color CRT displays which did not use a shadow mask.

Figure 22:
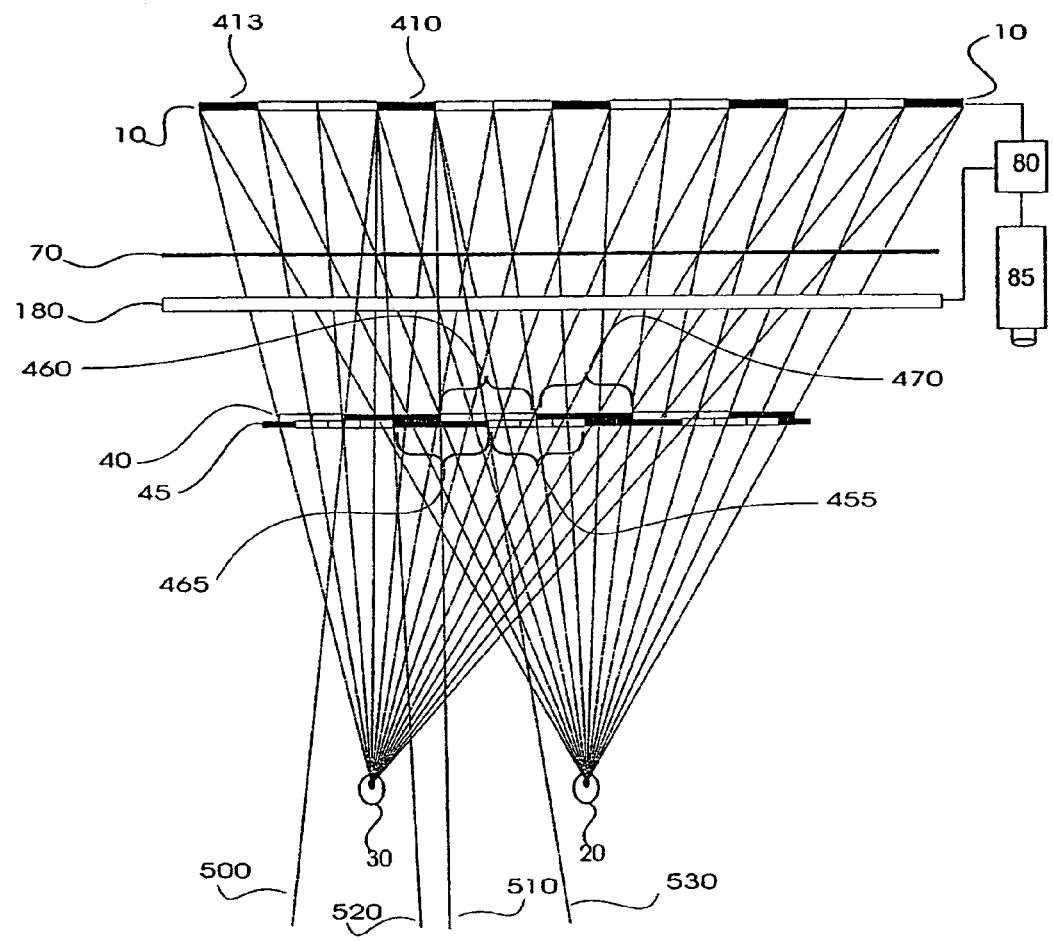
FIG. 22 is a top view of a system for electronic switching of a color filter used in an autostereoscopic display system with head-tracking according to the present invention.

FIG. 22 shows a way in which such material can be used in an autostereoscopic head-tracking system, producing the desired effect of effectively 'moving' the filter elements of a color filter layer, while not physically displacing any parts of the apparatus. Note, though, that whereas the following discussion is couched in terms of the color filter systems described hereinabove, the method here presented is also applicable to use in an appropriately movement permissive system without color filtration. In particular, if the discussion of "red-permissive" and "red-blocking" filter areas in the following paragraph is read as applying to "light-permissive" and "light-blocking" filter areas such as can be produced using well-known polarization and switchable light retardation technologies, then it constitutes an explanation of how (with appropriate modifications such as placing the filter/barrier in the appropriate position, in a manner well known in to the art), a 'moveable' parallax barrier (without color filtration) can be constructed. If that parallax barrier is made to be sufficiently permissive, then it too can be utilized to produce an autostereoscopic system with head-tracking and with no moving parts.

FIG. 22 is similar to FIGS. 11 and 20. On display 10 pixel 410 may be thought of as displaying a red sub-pixel from a left image, and pixel 413 may be thought of as displaying a red sub-pixel of a right image. If the light emanating from display 10 is polarized (as would be the case if display 10 is, e.g., an LCD), then polarizer 70 is unnecessary. If the light from display 10 is not polarized then polarizer 70 polarizes it. Layer 180 is an element of switchable light rotating means such as a PI cell, controlled by control element 80 which receives information from a head position sensor 85.

Layer 40 is a color filter layer such as that described above in the discussions of FIG. 11, yet made of polarization orientation sensitive color filter materials. The color filtering capabilities of layer 40 are taken to be active with respect to light in a polarization orientation A, and inactive (i.e., the material is transparent to all colors) with respect to light in a polarization orientation B, which is orthogonal to A.

Layer 45 is similar to layer 40 with two differences: (a) the color-filtering capabilities of layer 45 are active with respect to light in orientation B, and inactive with respect to light in orientation A; and, (b) the specific pattern of colors filtered by layer 45 is identical to that of layer 40, but is transposed (as shown by the drawing), a distance to the right equal to one quarter of the length of the repeating color pattern. Thus, if 470 is an area on layer 40 which passes e.g., red light, and it is followed on the layer by an area 460 of equal length which blocks red light, and this pattern is repeated across layer 40, and similarly 465 is an area on layer 45 which passes red light, and it is followed on the layer by an area 455 of equal length which blocks red light, then the left extremity of area 455 is placed even with the middle of area 460. The two layers 40 and 45 are contiguous, substantially in the same plane. Of course, for simplicity of construction layers 40 and 45 might also be produced as a single layer with the appropriate characteristics.

For simplicity of exposition, filter areas only for red light are shown in the Figure and discussed in the preceding sentences. It should of course be understood that the discussion is intended to describe a method applicable to all color ranges, such as that used in the color filtration systems described above in reference to FIG. 11.

Assume that the light produced by display 10 is in A orientation, or else is polarized into A orientation by optional polarizer 70. When layer 180 is inactive in light rotation, the light arrives at layer 40 unchanged, consequently it is in A orientation, and layer 40 behaves like the color filter layer 40 described in the discussions of FIGS. 11 and 20. At this time layer 45 is inactive in color filtration, and has substantially no effect on the light from the display. In other words, the apparatus functions as if layer 40 were a standard color filter as described above with reference to FIG. 11, and as if layer 45 were transparent or absent. However when control element 80, in response to information about the user's position from head-tracking sensor 85, causes layer 180 to become active in light rotation, the effect is to cause layer 45 to act as a color filter, and layer 40 to act as if it were transparent or absent.

Since the position of the color filter elements on layer 45 are displaced sideways when compared to the corresponding elements on layer 40, the behavior of the apparatus when layer 180 is switched active in light rotation will be equivalent to that described above in connection with the mechanical movement of a filter layer or barrier when such a layer is mechanically moved from one position to the other.

In use, when the viewer's left eye is at 30, the apparatus creates a viewing window (sweet spot) extending from line 500 to line 510. As the user moves to the right, at some time between the moment his left eye passes line 520 and before it reaches line 510, control element 80 causes layer 180 to switch its activation state, layer 45 becomes active in color filtration, and the sweet spot comes to be between line 520 and line 530, permitting the user to continue his rightward movement without losing his view of the appropriate autostereoscopic images.

Use of Similar Techniques to Achieve Full Resolution in a Color System

A similar technique may be used to achieve full resolution in an autostereoscopic display system based on color filters. This system is described by FIG. 24, where the meaning and operation of all elements of the Figure are as defined in the discussion of FIG. 22 above, with the exception of layer 45 as is further detailed below. In the present embodiment the specific pattern of colors filtered by layer 45 is identical to that of layer 40, but in this case it is transposed a distance to the right equal to one half of the length of the repeating color pattern, as shown in FIG. 24 (as compared to a distance of one fourth of the length of the repeating color pattern in the preceding embodiment shown in FIG. 22). Thus, if 470 is an area on layer 40 which passes e.g., red light, and it is followed on the layer by an area 460 of equal length which blocks red light, and this pattern is repeated across layer 40, and 465 is an area on layer 45 which passes red light, and it is followed on the layer by an area 455 of equal length which blocks red light, then the left extremity of area 455 is, in the current embodiment, placed even with the extreme left of area 460. The two layers 40 and 45 are contiguous, substantially in the same plane, or might be constructed as a single layer with the appropriate characteristics.

Thus, if layer 180 is inactive in light rotation and a viewer is placed with respect to the display and filter layer 40 in such a position that the viewer sees an autostereoscopic display in a first time, with a left image displayed on a first set of pixels and a right image is displayed on a second set of pixels, and then in a second time layer 180 is switched to be active in light rotation and the left image displayed on the second set of pixels and the right image displayed on the first set of pixels, then in the second time the viewer will continue to see an autostereoscopic image without changing his position, yet each eye will be seeing an appropriate image during the second time which is displayed by areas of the display which were blocked from that eye's view during the first time. If the system alternates rapidly between these two states, the phenomenon of persistence of vision in the human perceptual system will create the illusion that each of the viewer's eyes is seeing its appropriate image at full resolution. That is, the left eye will seem to see the left image on both the first and the second set of pixels, and the right eye will also seem to see the right image on both the first and second set of pixels. This system is then an autostereoscopic display with a large viewing window (high movement permissiveness) as is the case in general with the color filter systems previously described, yet in contrast to them has the advantage of providing full rather than half resolution of the displayed images.

Moving the Image with Respect to a Filter on a Sub-pixel Basis

As is pointed out elsewhere herein, head-tracking can also be accomplished by moving the image with respect to a filter or barrier, rather than, or in addition to, moving a filter with respect to an image.

One difficulty in moving an image with respect to a filter or barrier is more conceptual than practical: many display devices being constructed on the "RGB" model, both for physical and for historical reasons images tend to be thought of, and handled, as arrays of discrete pixels, each pixel being an RGB triplet, a combination of a red, a green, and a blue element. Since much display hardware is built on this principle, there is a natural tendency to display images in such a manner that a three-color pixel element of the image is physically displayed by a three-color display element of the display hardware.

Consider the case of an RGB display seen through a standard parallax barrier, a barrier which alternates opaque areas with transparent areas. As traditionally used, such a system presents one pixel (e.g., an RGB triplet) from a left image, and then one pixel (another e.g., RGB triplet) from a right image, and the barrier is arranged to be of such a size and position and orientation that the left eye sees the left-image pixel and the right-eye the right image pixel.

Under these conditions, however, there is no simple way to move the image with respect to the filter in something approximating continuous motion. In the embodiment now presented, however, an advantage is taken of the fact that many modern displays present the RGB triplets side by side in continuous or semi-continuous fashion, or in some other similar repeating pattern of three colors. It is therefore possible to relate to the sub-pixels (the individual colors) individually, rather than necessarily as sub-units of an RGB unit of fixed form. Doing so, it is then possible to move the image sideways in a relatively gradual manner.

Thus, if in the following the upper-case letters "R", "G", and "B" are taken to represent colors from a left image and the lower-case letters "r", "g", and "b" represent colors from a right image, and the vertical lines "|" indicate the division into pixels as presented to the display hardware in e.g., a standard personal computer display system, then the traditional manner of presenting the pixels is

|RGB|rgb|RGB|rgb|RGB|rgb|      (a)

It is, however, equally possible to display an image each of whose "pixels" (i.e., the units as presented to the display hardware) are composed of some color elements taken from a left image and other color elements taken from a right image. Thus for example:

RGb|rgB|RGb|rgB|RGb|rgB|      (b)

or

Rgb|rGB|Rgb|rGB|Rgb|rGB|      (c)

Note now that if one alternates among the presentation methods (a), (b), and (c) above, the net effect is to move the image slightly sideways. Though neither the display hardware nor the barrier physically moves, the portion of the display showing, e.g., a left-image pixel (i.e., a triplet of colors taken from a left image) moves slightly to the left as one proceeds from presentation (a) to presentation (b) to presentation (c). In a display such as the Sony "Trinitron" display, for example, the sideways displacement would be approximately that of a third of a pixel each time. If such an image is behind a parallax barrier or similar barrier, the net effect is that the viewing position from which the, e.g., left-image pixel, may be seen by an eye of the viewer has moved slightly to the right. Yet the amount of movement is considerably less than would be the case if one had 'moved' (i.e., substituted on the display) an entire RGB triplet. Consequently, the change in method of delivery of RGB pixels described above constitutes a method by which parallax barrier systems and other systems, including color filter systems, can produce aiming (head-tracking) with no moving parts.

This principle is of course not limited to the specific example of RGB triplets, and can be applied to any display system based on presentation of color images using sub-pixels of discrete colors, regardless of the particular colors used (i.e., not necessarily red, green and blue), and regardless of their number (i.e., not necessarily triplets).

The principle is now further expanded with respect to a specific example, with further advantages for head-tracking systems. This example refers to a classical parallax barrier (i.e., one in which transparent areas alternate with opaque areas). This example uses the principle described in the preceding paragraphs, and further provides some movement permissiveness, the combination producing a simple and efficient barrier-based head-tracking system with no moving parts. An additional aspect of this example is that it uses a barrier whose transparent areas are of a size and placement such as to allow the viewer to see strips of approximately the width of an RGB triplet on the display, yet the method assigns one or more additional sub-pixel elements to the display of, e.g., a left-image pixel.

Figure 23:
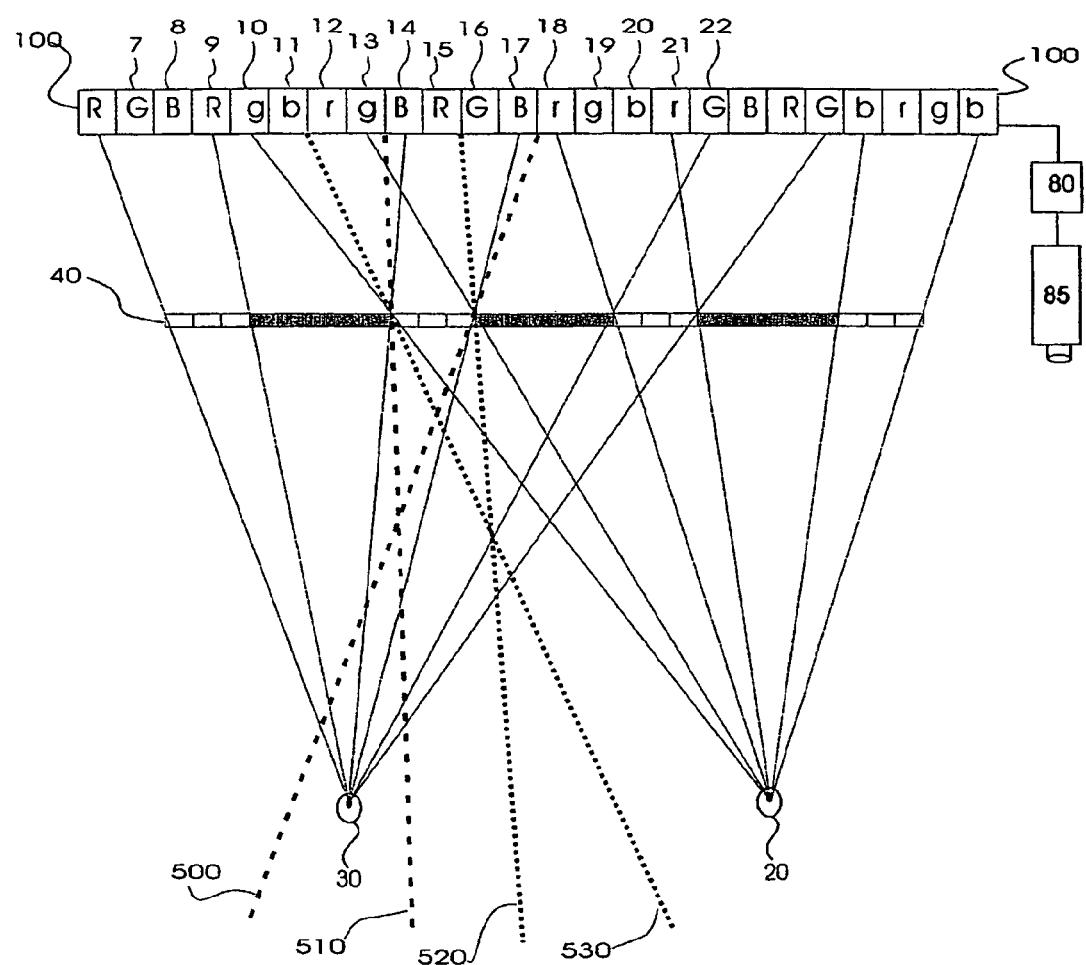
FIG. 23 is a top view of an autostereoscopic display system with head-tracking using RGB quadruplets according to the present invention.

Referring now to FIG. 23, layer 100 is a triplet-based display screen. In the traditional use of such a display, an image pixel is made up of 3 sub-pixels, for example areas 15, 16, and 17 of layer 10, which constitute an RGB triplet. Layer 40 is a parallax barrier, made of opaque strips that substantially block light from the display alternating with transparent strips that substantially permit the passage of light from the display.

In the embodiment now presented, pixel elements from each image are presented on more than three sub-pixels of the display, rather than on the traditional three sub-pixels. In the example presented in FIG. 23, four sub-pixels are used. The size and placement of transparent segments on barrier 40, however, are such as to allow the viewer's eyes (at 20 and 30 in FIG. 23) to see a segment of the display substantially corresponding to the width of an RGB triplet on the display. The width of the opaque areas on barrier 40 is larger than the width of the transparent areas, according the principles of the movement-permissive system. In FIG. 23, the ratio of the width of the opaque areas to that of the transparent areas is 5/3, as shown.

Note what happens if subpixels 14, 15, 16, and 17 are used to display information from a left image. The viewer's left eye 30 sees all of subpixels 15 and 16, and a portion of subpixels 14 and 17. Assume that subpixel 15 presents red light from the left image, subpixel 16 presents green light from that image, and both subpixel 14 and subpixel 17 present blue light from the left image. Since the width of the transparent area through which these pixels are viewed is selected so as to allow the viewing of an RGB triplet, the eye's total exposure to blue elements of the display in this area of the display (the eye's exposure to area 14 plus the eye's exposure to area 17) is substantially the same as that eye's exposure to area 15 and to area 16.

As eye 30 moves to the right, it sees less and less of the rightmost sub-pixel 17, but it also sees more and more of the leftmost sub-pixel 14. In this way, the eye always sees the two middle sub-pixels 15 and 16, and a constant amount of what amounts to a third sub-pixel, made up either of all of the right sub-pixel 17 and none of the leftmost one 14, or all of the leftmost sub-pixel 14 and none of the rightmost one 17, or else of a kind of composite sub-pixel made up of the parts of both 14 and 17 that are not hidden by the light blocking stripes of layer 40.

Note that if the width of the transparent areas were chosen so as to allow the viewing of an area somewhat wider than an RGB triplet, then an over abundance of blue light from the image would be visible in this area of the screen. Had the transparent areas been chosen so as to allow the viewing of an area somewhat narrower than an RGB triplet, then an under abundance of blue light from the image would be visible. In other words, if the area made visible to the viewer looking at the display through a transparent region of the barrier were substantially different from the width of an RGB triplet or of some whole multiplicity thereof, then the system would create color imbalances of various sorts in local areas of the display. Yet if the width of the transparent areas is chosen as described, no color imbalance is created.

Furthermore, the arrangement described constitutes a movement-permissive parallax barrier. Eye 30 can move between lines 500 and 510 and not see any significant change in the coloring or brightness of the pixel. As long as the viewer's left eye moves within the window defined by lines 500 and 510, the eye will see an appropriate pixel from the left image.

Thus, providing transparent areas of a width appropriate for the viewer's eye to see the width of an RGB triplet on the display, while also utilizing four (or more) rather than three subpixels to display light from e.g., the left image, has the effect of enlarging the sweet spot of the parallax barrier, without causing a degradation of the image's color, and without affecting the image's quality except for a minor reduction in resolution.

This arrangement is useful in itself, yet is most useful in the context of a head-tracking system. Control element 80, receiving information about the position of the viewer from head-tracking sensor 85, can move the image sideways one sub-pixel at a time as described above, thus accommodating for the movement of the viewer. Consequently, in any position, through each transparent area of layer 40, each eye of the viewer sees a space, 3 sub-pixels wide, that contains information corresponding to a single pixel of the image appropriate to that eye.

In other words, the apparatus combines the movement permissive system with a system for moving the image on the display on a sub-pixel basis, to form a competent head-tracking system for autostereoscopic display.

Consider eye 30 starting from its initial position as shown on FIG. 23, and moving to the right. So long as eye 30 remains between line 500 and line 510, it will see appropriate amounts of red, green, and blue light from the left image, as explained above.

When sensor 85 and control element 80 determine that the viewer's eye has arrived at line 510, control element 80 modifies the distribution of pixels on the display. Area 13, previously used to display green light from the right image, is made to display green light from the left image. Area 17, used until now to display blue light from the left image, is now used to display blue light from the right image. In corresponding fashion, the function of subpixels of display 10 is modified where appropriate, e.g., 17, 18, 19, and 20 display light from a right image, as do 9, 10, 11, and 12.

As the eye continues to move to the right, it continues to see appropriate light until it arrives at line 520. At that time, the function of the subpixels of display 10 is again changed, with e.g. areas 12, 13, 14, and 15 displaying light from the left image, areas 16, 17, 18, and 19 now displaying light from the right image, etc. (Of course, it is to be understood that the changes indicated here with respect to specific subpixels are to be generalized across the surface of the display.)

In this manner, the eye can move continuously in the sideways direction. Movement permissiveness permits small movements with no degradation of the autostereoscopic image. When the cumulative effect of the viewer's small movements becomes sufficiently great, alternation in functionality of the is subpixels of display 10 (the choice of which subpixels display light from the left image and which subpixels display light from the right image) allows the apparatus to adjust to the viewer's larger motion. The result is an apparatus which allows for head-tracking in an autostereoscopic display apparatus with no moving parts.

Additional Methods for Head-tracking in Autostereoscopic Systems by Moving the Image with Respect to a Barrier or Filter Many of the autostereoscopic systems with head-tracking described above are adapted to display devices in which individual color components (subpixels or sub-picture elements) are displayed discretely, and in particular locations. Typical of this sort of system is the well-known "RGB" type of display, currently used by most CRT color monitors, most CRT television screens, and most LCDs, including notebook computer displays. In those systems, red, green and blue subpixels are physically separated in the display hardware.

In such a system, changes in the position of images on the display takes place in a kind of "quantum" jump; whereas one might physically move the display a sideways distance equal to a small fraction (e.g., less than a third) of the width of a pixel, it is not possible to electronically do so, since e.g., red light, from whatever image and with whatever meaning, can only move from one discrete position (a given red subpixel) to the next available physically possible position, normally the closest red subpixel next to it, which subpixel will (at least in common CRT and LCD construction) be a pixel-width away.

Consequently, several of the systems previously discussed had as their goal the modification either of the manner in which images are displayed, or a modification of the position of barrier or filter elements in front of a display, and the utilization of systems with high degrees of movement permissiveness, to provide head-tracking in situations where continuous or nearly continuous sideways motion of the image is not possible.

As alternative or complementary technologies, several embodiments of the invention are described hereinbelow, in which continuous or nearly continuous sideways motion of the image on a display can be achieved in some systems, and that effect then can be used to provide head-tracking capabilities for those systems.

Appreciate that when a color filter is used as described above in the discussion of, for example, FIG. 11 to create an autostereoscopic display, or when a standard parallax barrier is used with a display to create an autostereoscopic display, or when a classical lenticular array, or any similar system which depends on vertical or approximately vertical strips of information based on two or more images (e.g., a left image and a right image) is so used, then sideways motion of the image with respect to the filter, or barrier, or e.g., lenticular array, creates a corresponding sideways motion in the viewing window from which the images presented by the display can appropriately be seen. If the image moves slightly to the left, the viewing windows (sweet spots) move slightly to the right, and vice versa.

Several methods are now presented allowing such an image to be moved slightly sideways, the sideways motion not being constrained to pixel-sized jumps, but allowing for continuous sideways motion, or nearly continuous sideways motion, or sideways jumps which are, nevertheless, smaller than a pixel size and which may also be smaller than a sub-pixel size.

One such system takes advantage of a popular form of construction for CRT displays, but utilizes it in a non-standard way. Many modern CRTs utilize a form in which red, green, and blue pixels (and their associated phosphors) are arranged on the CRT screen in the form of vertical strips. The Sony "Trinitron" and "Wega" screens are good examples of this arrangement. In these screens, the transition from one color to another in the sideways direction is discrete, that is, if one looks at a red subpixel on a screen and moves slightly to the right, there comes a point where the red phosphor ends, and shortly thereafter a green phosphor begins. Subsequently the green phosphor ends and the blue begins, then the blue ends and a red phosphor begins again.

In the vertical direction, however, the phosphor on these screens appears continuous, or nearly continuous.

The implication of this construction is that sideways motion of a particular color pixel on the screen is necessarily discontinuous: regardless of how the signal is applied to the screen's electronic driving mechanisms, a particular color can appear only where that color's phosphor is placed. If some modification of the voltage of a driving signal or some change in timing of that signal were to cause, e.g., a red pixel to move slightly sideways, the resulting red light would appear either in a first phosphor strip, or in a second phosphor strip, or perhaps not appear at all, but it could never appear in the area between those (non-adjacent) strips.

This is not the case, however, in the vertical direction. Minor modifications in the driving voltages can, in that dimension, effect minor and continuous or nearly continuous changes in the placement of a pixel dot on such a screen in the vertical direction.

In one embodiment, then, continuous or nearly continuous phosphor strips are used, which are similar to those used in the construction of, e.g., the Sony Trinitron screens, yet in those strips are arrayed not in the vertical direction, but in a non-vertical direction (in the preferred embodiment, they are horizontal). This might be implemented either modifying the construction of the display, or simply by using standard television or monitor hardware, and re-orientating the image displayed on that hardware by turning it sideways, so that the top of the image appears on what would normally be the side of the monitor, and the sides of the image appear on what would normally be the monitor's top and bottom.

Such a display system would now be capable of modifying the position of the image in a sideways direction continuously or nearly continuously, using digital and/or analog techniques similar to those which are currently used for adjusting the position of an image on a television screen or computer monitor. Given such a capability, it is an easy matter to place the mechanisms controlling the image position under the control of a control element which determines the appropriate position for the image, based on information supplied by a head-tracking system in a manner similar to that described with respect to various systems presented herinabove. Since the position of the image can be moved continuously or nearly continuously, this system does not need to be highly movement-permissive. If this system is used with a classic parallax barrier, then the preferred embodiment would be only slightly permissive, so as to maximize the amount of light transmitted, and would use only that degree of movement permissiveness as would be required to eliminate the need for extreme accuracy of the head-tracking system, and to allow for variations in inter-pupillary distances among viewers.

Another method for accomplishing this is now presented. Much of the previous discussion has focused on systems where the position of color elements of particular colors is fixed, and where each color can appear only in particular areas of the display, such as RGB display systems. There exist, however, other techniques for color display in which a variety of colors, or virtually any colors, can be positions in any region of the display. Such displays are called "full color displays" in the following. A film-based projection system such as that found in standard movie theatres is an example of such a system. Computer-driven projection systems based on simultaneous projection of three colored images through three independent liquid crystal arrays are also examples of such systems, as are computer-driven projection systems based on time-multiplexing of colors, that is projecting an image of one color on all of a display screen (or a large area of a display screen), then projecting an image of another color, then projecting an image of a third color, and alternating these images quickly enough so that the phenomenon of persistence of vision in the human perceptual system gives the impression of continuous viewing of all colors over all the screen.

There are a variety of ways in which full color displays can be utilized together with the techniques presented above, to produce autostereoscopic systems.

One method is simply to cause the display system, although it is capable of presenting all colors in all areas of the screen, to instead display distinct colors in distinct areas. One might, for example, cause such a system to perform as an RGB display, and to display red elements of an image in one set of areas, green elements in a second set of areas, and blue in a third set, where the sets might be completely different or might overlap to any desired extent.

The advantage of doing so would be that such a system could utilize the color filtration system such as those described above with respect to FIG. 11 and other Figures, thereby presenting an autostereoscopic display with a large viewing window (sweet spot). In this case, however, head-tracking can easily be provided, because in contradistinction to a typical RGB display, such a display system can move the image sideways to a distance which is less than the width of a single pixel, if by "pixel" we mean the traditional pixel consisting of an RGB triplet. Thus, for example if the display initially presents the red light from a pixel from, say, a left image in an area A of a display, and the green component of that pixel in an area B to the right of A, and the blue component in an area C to the right of B, then, say, the red light from a right-image pixel in an area D to the right of C, then whereas if one wanted to move those images over a classical RGB display, the smallest move that could be accomplished would be to move the red light of the left image pixel from A to D. Yet in the case of a full-color display which can present light of any color in any area, it is possible to move the red element from A to B, the green element from B to C, and the blue element from C to D.

Head-tracking and Full Resolution in an Autostereoscopic System

Methods are presented above for moving a barrier with respect to a displayed image, whether electronically or mechanically, and for moving an image electronically with respect to a barrier. In the discussions of FIGS. 20 and 22 methods are described of effectively displacing a filter or barrier layer sideways with respect to a displayed image. In the discussion of FIG. 23 and elsewhere, methods are described of displacing an image with respect to a filter or barrier layer.

It is now taught that a combination of two or more of these techniques, or of similar techniques, presents further advantages for an autostereoscopic system, by providing means for both head-tracking and for full resolution in an autostereoscopic display.

Recall that in the discussions of FIGS. 20 and 22 methods are described of achieving a lateral displacement of a filter or barrier layer, or of the filtering elements of such a layer. The displacement contemplated in those discussions was of a quarter of the length of a "cycle" of the repeating pattern of the filter. Thus, if the red-permissive portion of filter 40 of FIG. 20 were initially in areas 54, 53, and 52, with a red-blocking portion in areas 51, 50, and 49, followed by another red-permissive portion in areas 48, 47, and 46, etc., then in the earlier discussion it was contemplated to displace the filter the equivalent of the length of one and one half such areas, such that the left extremity of the red-permissive area initially starting with the left side of area 54 would move to the center of area 52.

It is clear that a similar solution (whether mechanical or electronic) could be provided to move that area the length of 3 such areas, so that it began at the left side of area 51, or 4 and a half such areas, so that it began at the center of 49.

In the following paragraphs the initial position is referred to as position P, its position when displaced 1 and a half area lengths to the right is referred to as position Q, its position 3 area lengths to the right is referred to as position R, and its position 4 and a half area lengths to the right is referred to as position S. By these assumptions, a filter shifted 6 area lengths to the right would again be in position P.

It is also clear that one might combine the mechanical movement system presented in the discussion of FIG. 20 above with the electronic movement system presented in the discussion of FIG. 22. The combination would be a system capable of rapidly presenting the filter in any one of the four possible positions P, Q, R and S, as these positions are defined hereinabove. For example, the mechanical solution might be used to shift back and forth one and one half area lengths (e.g., between P and Q, or Q and R, or R and S, or S and P), while the electronic solution might be used to shift 3 area lengths, e.g., back and forth between P and R, or between Q and S. Thus, with both systems in their unshifted state, the apparatus would be, say, in position P. Then shifting the mechanical system would put it into Q position, unshifting the mechanical but shifting the electronic would but it into R position, and shifting both systems would put it into S position.

Other methods might be employed to rapidly move the filter to these positions, or with some types of displays it would be possible to achieve the equivalent by moving the filter between two alternating positions and also moving the image between two alternating positions. The combination herein described, i.e., the mechanical method of FIG. 20 combined with the electronic method of FIG. 22, is presented by way of example only, and the invention is not limited to these particular methods of moving the position of the image with respect to the filter and/or the filter with respect to the image. The essential characteristic of the system is that it can be rapidly switched between the several possible positions (four, in the example given).

A system as herein described provides several advantageous capabilities. First, one notes that such a system (assuming it included an appropriate degree of movement permissiveness, as discussed above, and that a viewer is at an appropriate distance from the display) could adequately adapt itself to any lateral displacement of the viewer with respect to the display, and do so without requiring the use of the technique of the "alternately positioned image" as defined above.

This being the case, the technique of alternately positioned image can be used in this system for another purpose, namely that of providing for full-resolution viewing of the display. If, given some position of the viewer and the appropriate position of the color filter mechanism as provided by the head-tracking system, one then rapidly switches back and forth between the initial position of the image (e.g., presenting the left image on one initial set of display pixels and the right image on another set of display pixels) and the alternately positioned image as defined above, and one also rapidly (and in a coordinated manner) switches the filter position from its position as defined by the requirements of the head-tracking function to its opposite position (e.g., from P to R, or from Q to S, or from R to P, or from S to Q), then one creates a situation in which the viewer who first sees the left image on a first set of areas of the display and the right image on a second set of areas, now sees the right image on the first set of areas of the display and the left image on the second set of areas. If the system rapidly alternates between the original position of the image and the alternately positioned image, while in a coordinated manner also switching between the position of the filter determined by the requirements of the head-tracking system, and the opposite position of the filter, then the result will be that the viewer will see a rapid alternation of image pixels such that (a) each eye sees only light from its appropriate images at all times; and (b) each eye will see light from its appropriate image from all or almost all areas of the display. If this switching operation is done sufficiently rapidly (e.g., at 50 Hz or faster per eye), then the phenomenon of persistence of vision in the human visual system will create the impression of a full-resolution image, even though at any given instant each eye is actually receiving light from only 50% or less of the display's subpixels.

It is to be noted that the avoiding of an appearance of flickering, a common problem with time-sharing stereoscopic displays, is much easier in the system here described than it is in, say, a eyeglasses-based "shutter glasses" display, in that shutter glasses make the entire display simultaneously visible or invisible to any given eye, whereas the current system alternates between two states of the display in which the amount of light, and indeed also the gestalt of the image, is substantially extremely similar between the two states. Note also that the operations required to present the left and right images in this time-sharing full-resolution mode are independent of the requirements for operating the head-tracking function. Thus, the system herein described provides for full resolution, with a very minimal or no impression of flickering, and also provides for head-tracking, in an autostereoscopic display.

Full-resolution Head-tracking System Based on a
Color Filter System, with no Moving Parts An embodiment with much the same features and advantages as the previous embodiment, but with the added advantage that the system has no moving parts, is now presented.

It has been shown that in a color filter or parallax barrier system with sufficient movement permissiveness, the major advantages of the system (head-tracking, full resolution through timesharing) can be obtained if the filter (or barrier)

layer can be moved rapidly among several positions. The example now presented, exemplifying the current embodiment, will again refer to positions P, Q, R, and S, as these positions are defined hereinabove. A system based on a color filter will be presented, yet it may be seen that with some trivial modifications a system based on a movement-permissive parallax barrier might also be constructed.

Referring again to FIG. 22, the elements of FIG. 22 have the same meaning as previously defined, with the following exceptions:

Layer 40 is a color filter layer. Polarization orientation sensitive color filter materials are used in its construction, as described above. The color filter is represented here in simplified form: areas 460 may be taken to block e.g., red light when that light is in a particular orientation T, and not to block red light in the orthogonal orientation V. Areas 470 may be taken to block, e.g., red light when that light is in polarization orientation V, and to pass light in orientation T. It should be understood that this simplified representation of the color filter is intended to represent a filter capable of filtering substantially all the colors of the display, in the manner described above with reference to FIG. 11.

FIG. 22 can also be taken to describe an apparatus built around a parallax barrier: in this case areas 460 may be taken to block all light when that light is in orientation T, and not to block light in the orthogonal orientation V, while areas 470 may be taken to block all light which is in orientation V, and to pass light in orientation T.

Layer 45 is a color filter with the same characteristics as layer 40, with the difference only that areas 465 on layer 45 block color (e.g., red light) when the light is in orientation U, and areas 455 do so when the light is in orientation W, where U is 45 degrees from T, and W is orthogonal to U. Also, as shown in FIG. 22, areas 465 and 455 of layer 45 are displaced sideways in comparison of those of areas 460 and 470 of layer 40, as detailed in the earlier discussion of FIG. 22.

Light turning (light retarding) unit 180 is a unit capable of turning the orientation of the polarized light passing through it, so that the light reaching layer 40 is polarized in one of several orientations. In this example the light arriving at layer 40 will be in one of the four orientations T, U, V, and W. This can be accomplished in various manners, such as by using twisted nematic liquid crystals under controlled voltage, so as to turn the incident light to a desired degree, or alternatively by using an arrangement of PI cells in appropriate orientations such that, by selective activation and inactivation of the PI cells, light of the desired orientations can be obtained under electronic control.

For simplicity of exposition, the following descriptions of the behavior of the system with respect to "light" may be taken as if they referred to light of a particular color range, e.g., red light, with the understanding that behaviors true of a single particular color (red, in the example) can be generalized to other colors or color ranges (e.g., green and blue), and that the structure of the filter (the spacing and relationship of filter areas of different colors along the filter) are as described above with respect to FIG. 11.

Light reaching layer 40 in T orientation will be completely blocked by areas 470 and will pass substantially unhindered by areas 460. Light reaching layer 40 in orientation V will be completely blocked by areas 460 and will pass substantially unhindered by areas 470. Light in U or in W orientations reaching layer 40 is oriented at 45° with respect to the axis of orientation of both the areas 460 and 470, consequently, it will be somewhat diminished. (If incidental light losses are ignored, the theoretical amount of light to pass under those conditions is the original intensity I multiplied by $\sin(45°)$. The light will be diminished equally by areas 460 and 470. Light which successfully passes layer 40, then, will be in two different intensities: that which entered in T or V will have the original intensity, that which entered in U or W will have intensity ($I \sin(45°)$).

When that light reaches layer 45, the following occurs. The light in orientation U will be completely blocked by areas 465 and will pass substantially unhindered by areas 455. The light in orientation W will be completely blocked by dark areas 455 and will pass substantially unhindered by areas 465. Hence, of the light entering in U and W, some will be blocked by layer 45; the rest will pass through it substantially unchanged, and the intensity at which it entered, which is to say ($I \sin(45°)$).

As for the light arriving at layer 45 in T or V orientation, this light arrives at layer 45 (if it arrives there at all) in its original intensity I. However it now encounters the filter at areas 455 and 465, both of which are oriented at 45° from T and V. This light, then, will now also undergo a diminution from its original intensity, on the order (ignoring incidental losses) of ($I \sin(45°)$).

Thus, all the light which successfully passes both layer 40 and layer 45 will undergo the same standard diminution of intensity. The light will be somewhat less intense than it was to start, but the intensity will be uniform.

As for the portion of the light which is blocked, the following can be observed. Light arriving in the T orientation encounters a blocking barrier formed by areas 460. Light arriving in the U orientation encounters a blocking barrier formed by areas 465. Light arriving in the V orientation encounters a blocking barrier formed by areas 470. Light arriving in the W orientation encounters a blocking barrier formed by areas 455.

In other words, for all four orientations of the light (T, U, V, W), the result is a standard diminution not dependent on the initial orientation. A further result is that the light (originating in display 100) acts as if it had encountered a color filter (or, under a slightly different construction, a parallax barrier) in one of four possible positions, the same positions P, Q, R, and S which were previously shown to enable both head-tracking and full-resolution displays in an autostereoscopic system.

System for Producing Mixed-color Signals On-the-Fly from Two Signal Input

Several of the systems described above call for a particular distribution of pixels and/or subpixels (color elements of pixels, i.e., sub-picture elements) across the face of a display.

In a digital context this is trivial to produce: given a pair of images presented as arrays of pixels, computing means can easily create a new array that combines information from the two input arrays in the desired format.

But in an analog signal context (e.g., analog television signals) this is less trivial. One possibility is to convert to digital representation, combine the images, and reconvert to analog. But in the context of a CRT-based television or similar system, here is another possibility. Assume that there are two signal sources each representing one eye's viewpoint. Also assume using an oscillator powering a switch, which rapidly switches from one analog signal source to the other during the horizontal scan phase which puts the signal on the screen. Thus, at one moment the signal comes from the right image, at another from the left, then the right, then the left, etc. If the speed of the oscillator is set to correspond to the pixel density (e.g., the density of the dots on the CRT color mask, or the equivalent), then the result can be that each RGB triplet gets its information from a different image from that of its immediate neighbor. Further, if the color signals are available independently, then control of the phase relationships between the oscillators controlling the source of the signals of each individual color will make it possible to create the pattern of colors appropriate for the color filter system described above, as well as that appropriate to the alternating-color filter described in the context of FIG. 40 of PCT Publication WO97/26577.

Adaptations of the Head-tracking Techniques for Use in Projection Systems

In the head-tracking methods described in PCT Publication WO97/26577, the electronically active elements of the two layers have to be the size of the whole screen. This presents a problem when one wants to use this system on a very large screen. The cost of active elements of a very large size is relatively high. It would therefore be preferable to have a system which would create the desired functionality, yet which could be constructed using active elements of limited size.

Figure 21:
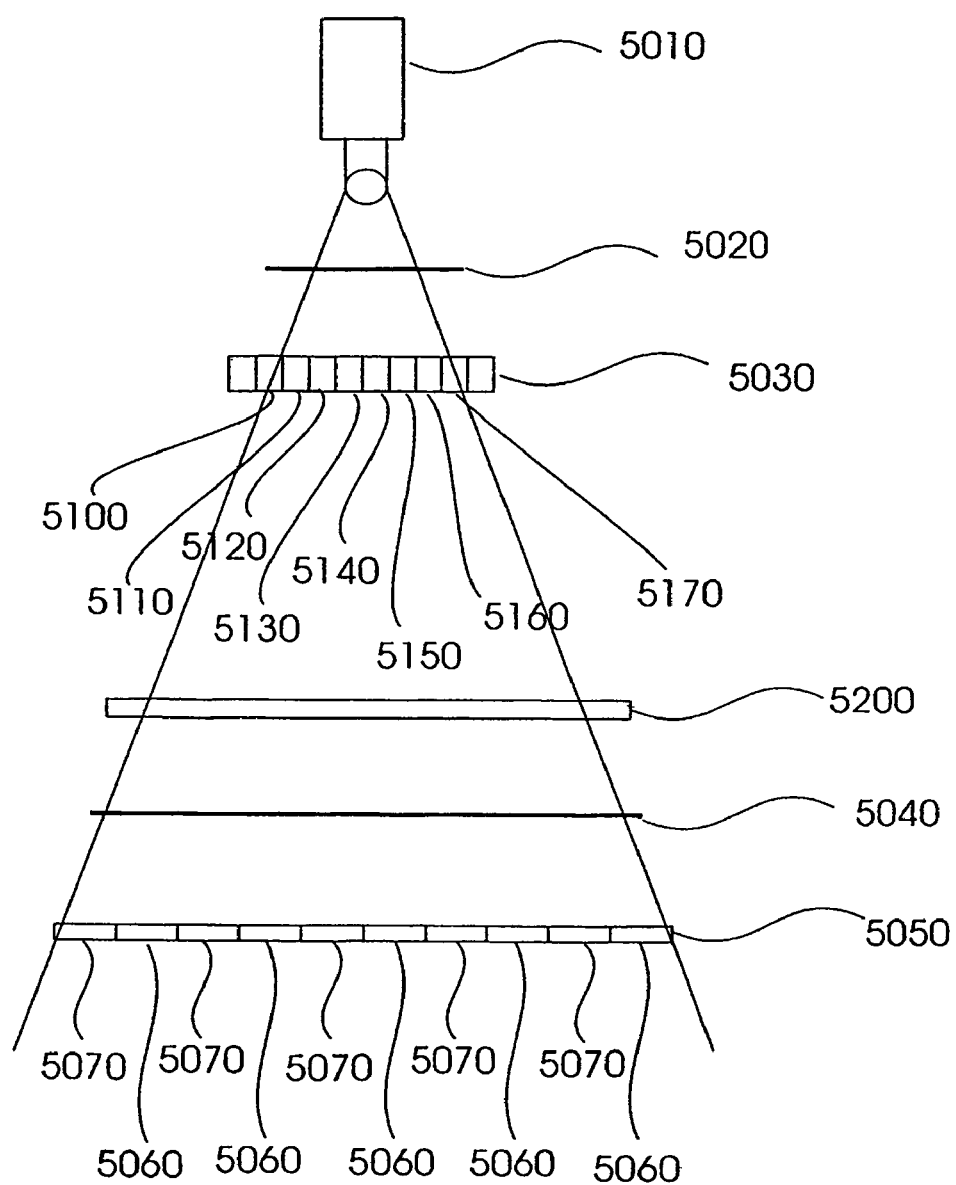
FIG. 21 is a top view of a system according to the present invention employing a rear projection display and small active elements.

FIG. 21 is an example of such a system. Shown in FIG. 21 is a rear projection display for autostereoscopic vision. The basic components of a rear projection system are projector 5010, a rear projection screen 5040, a static polarizing layer 5050, made of strips 5060 alternating with 5070, which have orthogonally oriented planes of polarization. Interposed between projector 5010 and the projection screen 5040, we will place two additional layers. The first layer, placed closer to the projector, is a uniform polarizer 5020. The second additional layer, placed between polarizer 5020 and projection screen 5040, is an active LC element with individually addressable pixels 5030 (similar to layers 55 and 56 in FIG. 5 and to layers 130 and 150 in FIGS. 6–9). Note that if projector 5010 is an LCD projector, it inherently includes a polarizer, and there is no need to use polarizer 5020. One last layer is a liquid crystal shutter 5200, which is placed between active layer 5030 and screen 5040, or between screen 5040 and static layer 5050. Although in FIG. 21 the elements are drawn far apart for clarity, in the preferred embodiment, elements 5030 and 5200 will be positioned relatively close to projector 5010, so that they can be of relatively small size and consequently relatively inexpensive.

Active layer 5030 is made of an addressable liquid crystal array and can be made into strips under software control. An alternative is to have active layer 5030 made of addressable strips, without vertical addressability. For an example, say that pixels 5100, 5140, 5150, 5160, are turned off and pixels 5110, 5120, 5130, and 5170 turned on. Light passing through polarizer 5020 is polarized uniformly in one plane. If it then passes through an active region of layer 5030 (e.g., pixels 5110–5130), its plane of polarization is not changed, and will create a polarized light region on the rear projection screen 5040, of the same orientation. If, on the other hand, it passes through a section of layer 5030 that is not activated (e.g. 5140–5160), light is turned by 90 degrees, and makes a light region on the screen of a plane of polarization orthogonal to the previous polarization. Thus, if one makes strips of pixels on layer 5030 that are active, alternating with strips of pixels that are inactive, one obtains a pattern of polarized light on the rear projection screen 5040 similar to the static layer 5050. If the planes of polarization of layers 5030 and 5050 are made to be of the same/orthogonal orientation, and the size of the strips on layers 5030, 5050 are set appropriately, one then obtains a system identical to the original system as described in the PCT Publication WO97/26577, where the system can track the viewer's movement and adapt so that the viewer can still see the image correctly, despite the viewer's movement. With the shutter layer, the system is able to switch which eye sees which part of the screen and this enables one to show the same parts of the screen to both eyes, in a sequential manner.

This system enables one (using information received from an external eye location device) to effect head-tracking by turning on a pixel on one side, and turning one off on the other. For example, one forms a 3 pixel strip by turning on pixel columns 5110, 5120, 5130, while leaving off pixels 5100 and 5140, 5150, 5160, etc. If the viewer moves to the left, one can turn pixel 5100, 5170 on and turn off pixel 5160. In effect, the strip was moved one pixel to the left, and the viewer is again in the right location.

Note that layer 5030 can be placed very close to projector 5010, and thus can be very small. This reduces significantly the manufacturing cost.

This system can also be constructed without shutter element 5200. This element has the effect of reversing the state of layer 5030 as described in detail in PCT Publication WO97/26577. If one desires to have this element removed from the system, layer 5030 will need to reverse it's state itself (e.g., in the first state, pixels 5100, 5140, 5150, 5160 are on, and pixels 5110, 5120, 5130, 5170 are off. In the second state, pixels 5100, 5140, 5150, 5160 are off, and pixels 5110, 5120, 5130, 5170 are on). In this way, the effect of the two-layers (the active layer 5030 as projected on screen 5040 and the passive layer 5050 (in which, e.g., one eye sees all the screen and one eye sees nothing, or any other combination) is reversed (e.g., in the first state the left eye sees the whole screen and the right eye sees nothing, and in the second state the right eye sees the entire screen and the left eye sees nothing)). The areas previously seen by the left eye are now seen by the right eye, and the areas previously seen by the right eye are now seen by the left eye. Similarly, the areas blocked from view by the left eye are now blocked from the view of the right eye, and the areas previously blocked by the right eye are now blocked from the view of the left eye. If layer 5030 is capable of switching fast enough, and it is switched in the same way as layer 5200 would be switched, (i.e., at the same speed and using the same source signal) both eyes would be able to see the whole screen in a sequential manner.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for autostereoscopic vision comprising:
(a) a first optical construction which comprises a display, a calculation module and a birefringent layer, wherein:
   (i) said calculation module is operable to calculate a combined image of left and right image picture elements of left and right images, such that light intensity of each picture element of said combined image is calculated as a first function of left-image light intensity at a corresponding position of a left image and of right-image light intensity at a corresponding position of a right image;
   (ii) said display is operable to display said combined image in uniformly polarized light;
   (iii) said calculation module is further operable to calculate a first intermediate image wherein intensity of each picture element of said first intermediate image is calculated as a second function of left-image light intensity at a corresponding position of said left image and of right-image light intensity at a corresponding position of said right image;
   (iv) said birefringent layer is positioned in front of said display and comprises an array of individually switchable elements each operable to rotate light passing therethrough to a selected degree, said birefringent layer being operable to re-divide said uniformly polarized combined image by controlled partial light rotation of light emanating from each of picture elements of said combined images, thereby constructing a second intermediate image wherein in said first regions intensity of a light component oriented in a first orientation A reproduces light intensity of a corresponding picture element of said left image and a light component oriented in a second orientation B orthogonal to A reproduces light intensity of a corresponding picture element of said right image, and wherein in said second regions a light component oriented in said second orientation B reproduces light intensity of a corresponding picture element of said left image and a light component oriented in said first orientation A reproduces light intensity of a corresponding picture element of said right image, and
(b) a second optical construction designed and constructed to be positioned between said first optical construction and a viewer and closer to said first optical construction than to said viewer, said second optical construction comprises first areas operable to block light components having said first orientation A and second areas operable to block light components having said second orientation B, said second optical construction being so positioned with respect to said first optical construction and said first and second areas being so sized and positioned with respect to said first and second regions that for selected positions of left and right eyes of a viewer said reproduced light intensities of said left image picture elements are visible to said left eye of a viewer and blocked from view by said right eye of a viewer, and said reproduced light intensities of said right image picture elements is visible to said right eye of a viewer and blocked from view by said left eye of a viewer.

2. The system of claim 1, further comprising
(c) an eye-tracking sensor for providing real-time information pertaining to positions of the left and the right eyes of the viewer; and
(d) a control element operable to receive said eye-position information from said eye-tracking sensor, to calculate appropriate sizes and positions for said first and second regions and for said first and second areas as a function of said eye-position information, and to issue successive configuration commands to said calculation module to position said first and second regions and first and second areas according to said calculated appropriate sizes and positions, thereby commanding positioning of said first and second regions on said first optical construction and commanding positioning of first and second areas on said second optical construction in a manner which enables a left eye of the viewer to continuously see left imagery data presented by said first optical construction and a right eye of the viewer to continuously see right imagery data presented by said first optical construction, and which substantially prevents said left eye from seeing right imagery data and substantially prevent said right eye from seeing left imagery data, while the viewer changes position with respect to said first and second optical constructions.

3. The system of claim 2, wherein said control element is further operable to communicate with said first optical construction.

4. The system of claim 3, wherein said control element is operable to command size and position of picture elements presented by said first optical construction.

5. The system of claim 4, wherein said first optical construction comprises a first pixilated liquid crystal panel and a second pixilated liquid crystal panel.

6. The system of claim 5, wherein said first optical construction further comprises a light source, a first uniformly polarizing layer positioned between said light source and said first liquid crystal panel, and a second uniformly polarizing layer positioned between said first liquid crystal panel and said second liquid crystal panel.

7. The system of claim 4, wherein said second optical construction comprises a uniform polarizer and a birefringent layer with individually switchable elements.

8. The system of claim 2, wherein said second optical construction comprises a liquid-crystal panel and a uniform polarizer.

9. A system for providing autostereoscopic viewing to a viewer, comprising;
(a) a pixilated display for displaying a uniformly polarized combined image of left and right image picture elements of left and right images;
(b) a first birefringent layer having individually switchable elements being positioned in front of said display and serving for re-dividing said uniformly polarized combined image by controlled partial light rotation of light emanating from each of picture elements of said combined images, thereby constructing a second intermediate image wherein in said first regions intensity of a light component oriented in a first orientation A reproduces light intensity of a corresponding picture element of said left image and a light component oriented in a second orientation B orthogonal to A reproduces light intensity of a corresponding picture element of said right image, and wherein in said second regions a light component oriented in said second orientation B reproduces light intensity of a corresponding picture element of said left image and a light component oriented in said first orientation A reproduces light intensity of a corresponding picture element of said right image;

(c) a second layer at least some portions of which are birefringent, positioned between said viewer and said first birefringent layer; and (d) a uniform polarizer positioned between said viewer and said second birefringent layer;

the system being operable to provide autostereoscopic viewing to a viewer at a position, each of said viewer's right and left eyes seeing, simultaneously, an appropriate image, at full pixel resolution of said display.

10. The system of claim 9, wherein said controlled partial light rotation is effected by controlled degree of light rotation.

11. The system of claim 9, wherein said controlled partial light rotation is effected by controlled time periods of light rotation.

12. The system of claim 9, wherein said controlled partial light rotation is effected by both controlled degree of light rotation and controlled time periods of light rotation.

13. The system of claim 9, further comprising a lens element for focusing light from said display onto said birefringent layer.

14. The system of claim 9, wherein said display includes a rear and remote light source producing homogenous light rays.

15. The system of claim 9, wherein each individually switchable element of said first birefringent layer is optically aligned with one and only one pixel of said pixilated display.

16. The system of claim 9, wherein said second birefringent layer comprises individually switchable elements, and further comprising (e) an eye-tracking module; and (f) a controller operable to control switchable elements of said first birefringent layer and of said second birefringent layer, based on information received from said eye-tracking module, the system being operable to provide autostereoscopic viewing to a moving viewer, each of said viewer's right and left eyes seeing, simultaneously, an appropriate image, at full pixel resolution of said display.

17. A system for autostereoscopic vision comprising:

(a) a first optical construction which comprises:

(i) a display for displaying a uniformly polarized combined image of left and right image picture elements of left and right images, wherein light intensity of each picture element of said combined image is a function of left-image light intensity at a corresponding position of a left image, and of right-image light intensity at a corresponding position of a right image; and (ii) a birefringent layer having individually switchable elements being positioned in front of said display and serving for re-dividing said uniformly polarized combined image by controlled partial light rotation; and (iii) a computing and control module operable to control functionality of said display and of said switchable elements of said birefringent layer, and thereby to construct an image wherein in first regions each pixel displays light of which a first component having a first orientation reproduces light intensity of a left picture element of a left image and a second component having a second orientation reproduces a right picture element of a right image, and wherein in second regions each pixel displays light of which a first component having said second orientation reproduces light intensity of a left picture element of a left image and a second component having said first orientation reproduces a right picture element of a right image.

18. The system of claim 17, further comprising:

(b) a second optical construction designed and constructed to be positioned between said first optical construction and a viewer and closer to said first optical construction than to said viewer, said second optical construction when so positioned enabling a left eye of the viewer to see left imagery data presented by said first optical construction and a right eye of the viewer to see right imagery data presented by said first optical construction, while substantially preventing each of the right and left eyes of the viewer from seeing light from an inappropriate image.

19. The system of claim 18, wherein said display includes a rear and remote light source producing homogenous light rays.

20. The system of claim 18, wherein said second optical construction is configurable to present a plurality of polarizing strips, each strip having a polarization orientation orthogonal to that of strips to which it is adjacent.

21. The system of claim 18, wherein said second optical construction comprises a birefringent layer with individually switchable elements.

22. The system of claim 18, wherein said second optical construction comprises a birefringent layer with individually switchable elements and a uniform polarizer.

23. The system of claim 17, wherein said display is pixellated, and wherein said individually switchable elements of said birefringent layer are each optically aligned with a respective pixel of said display device, and wherein each of said individually switchable elements is controlled to vary the polarization of output light from a display pixel with which it is optically aligned.

24. A system for stereoscopic or autostereoscopic viewing designed and controllable to present a combined image of left and right image picture elements of left and right images, comprising:

(a) a display for displaying a uniformly polarized combined image of left and right image picture elements of left and right images;

(b) a birefringent layer having individually switchable elements being positioned in front of said display and serving for re-dividing said uniformly polarized combined image by controlled partial light rotation; and (c) a computing module operable to compute said combined image of left and right image picture elements for display by said display, based on left and right picture elements of left and right images, and further operable to compute commands for driving said individually switchable elements of said birefringent layer, said system being operable to construct and display an image wherein pixels within first regions emit light having a component in a first orientation which component reproduces light intensity of a left picture element of said left image and further having a component in a second orientation orthogonal to said first orientation which component reproduces light intensity of a right picture element of said right image, and wherein pixels within second regions emit light having a component in said first orientation which component reproduces light intensity of a right picture element of said right image and a component in said second orientation which component reproduces light intensity of a left picture element of said left image.

25. The system of claim 24, further being operable to construct and display an image wherein pixels within both said first regions and said second regions emit light having a component in a third orientation which component reproduces light intensity of a left picture element of said left image and further, having a component in a fourth orientation orthogonal to said third orientation which component reproduces light intensity of a right picture element of said right image.

26. The system of claim 24, wherein said display is pixellated, and wherein said individually switchable elements of said birefringent layer are each optically aligned with a respective pixel of said display, and wherein each of said individually switchable elements is controlled to vary the polarization of output light from a display pixel with which it is optically aligned.

* * * * *